US011975800B2

(12) United States Patent
Nishino et al.

(10) Patent No.: US 11,975,800 B2
(45) Date of Patent: May 7, 2024

(54) DERAILLEUR FOR HUMAN-POWERED VEHICLE

(71) Applicant: Shimano Inc., Osaka (JP)

(72) Inventors: Takafumi Nishino, Osaka (JP); Satoshi Idogaki, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 18/115,345

(22) Filed: Feb. 28, 2023

(65) Prior Publication Data

US 2023/0348018 A1 Nov. 2, 2023

(30) Foreign Application Priority Data

Apr. 27, 2022 (DE) .................. 102022204093.7

(51) Int. Cl.
*B62M 9/122* (2010.01)
*B62M 9/124* (2010.01)
*B62M 9/1242* (2010.01)
*B62M 9/125* (2010.01)
*B62M 25/08* (2006.01)

(52) U.S. Cl.
CPC .......... *B62M 9/122* (2013.01); *B62M 9/1242* (2013.01); *B62M 9/125* (2013.01); *B62M 25/08* (2013.01); *B62M 2009/12406* (2013.01)

(58) Field of Classification Search
CPC ...... B62M 9/122; B62M 25/08; B62M 9/132; B62M 9/121; B62M 9/1242; B62M 9/125; B62M 2009/12406
USPC ....................................... 474/80, 82
See application file for complete search history.

(56) References Cited

U.S. PATENT DOCUMENTS

| | | | | |
|---|---|---|---|---|
| 10,239,579 | B2 * | 3/2019 | Pasqua ................... | B62M 9/122 |
| 2007/0037645 | A1 * | 2/2007 | Ishikawa ................ | B62M 25/08 474/70 |
| 2014/0087901 | A1 * | 3/2014 | Shipman ................ | B62M 25/08 429/100 |
| 2014/0102237 | A1 * | 4/2014 | Jordan ................... | B62M 9/132 74/473.12 |
| 2015/0111675 | A1 * | 4/2015 | Shipman ................ | B62M 9/122 474/82 |
| 2015/0353166 | A1 * | 12/2015 | Kuwayama ............ | B62M 9/135 474/82 |
| 2016/0221640 | A1 * | 8/2016 | Watarai .................. | B62M 9/122 |
| 2017/0066501 | A1 * | 3/2017 | Hilgenberg ............ | B62M 9/122 |

(Continued)

*Primary Examiner* — Henry Y Liu
(74) *Attorney, Agent, or Firm* — Global IP Counselors, LLP

(57) ABSTRACT

A derailleur basically includes a base member, a movable member and a linkage assembly. The base member includes a first base member connecting section and a second base member connecting section. The movable member includes a first movable member connecting section and a second movable member connecting section. The linkage assembly includes an inner link member and an outer link member. The outer link is pivotally coupled to the second base member connecting section about a third pivot axis. The outer link is pivotally coupled to the second movable member connecting section about a fourth pivot axis. The outer link member has a power source receiving part that is configured to be arranged such that the power source receiving part traverses a reference line extending between the third pivot axis and the fourth pivot axis.

16 Claims, 48 Drawing Sheets

(56) References Cited

U.S. PATENT DOCUMENTS

| | | | |
|---|---|---|---|
| 2017/0113759 A1* | 4/2017 | Watarai | B62J 43/30 |
| 2017/0120983 A1* | 5/2017 | Komatsu | B62K 25/30 |
| 2017/0197685 A1* | 7/2017 | Braedt | B62M 9/122 |
| 2018/0001960 A1* | 1/2018 | Pasqua | B62M 25/08 |
| 2018/0229803 A1* | 8/2018 | Wesling | B62M 9/132 |
| 2018/0237104 A1* | 8/2018 | Pasqua | B62M 9/122 |
| 2019/0100279 A1* | 4/2019 | Brown | B62M 9/127 |
| 2019/0100280 A1* | 4/2019 | Brown | B62M 1/36 |
| 2019/0144071 A1* | 5/2019 | Boehm | B62M 9/122 |
| | | | 474/80 |
| 2020/0223513 A1* | 7/2020 | Ho | B62M 25/04 |
| 2020/0247504 A1* | 8/2020 | Ho | H04W 76/14 |
| 2020/0298934 A1* | 9/2020 | Wu | B62M 9/132 |
| 2020/0339220 A1* | 10/2020 | Boehm | B62M 9/1242 |
| 2022/0081065 A1* | 3/2022 | Yamamoto | B62M 9/125 |
| 2022/0371681 A1* | 11/2022 | Lin | B62L 3/02 |
| 2022/0411017 A1* | 12/2022 | Braedt | B62M 9/125 |
| 2023/0093851 A1* | 3/2023 | De Poli | B62M 9/132 |
| | | | 474/80 |
| 2023/0094467 A1* | 3/2023 | Marangon | B62M 9/1246 |
| | | | 474/82 |
| 2023/0099532 A1* | 3/2023 | Pasqua | B62M 9/122 |
| | | | 474/82 |

* cited by examiner

DERAILLEUR FOR HUMAN-POWERED VEHICLE

CROSS-REFERENCE TO RELATED APPLICATIONS

This application claims priority to German Patent Application No. 102022204093.7, filed on Apr. 27, 2022. The entire disclosure of German Patent Application No. 102022204093.7 is hereby incorporated herein by reference.

BACKGROUND

Technical Field

The present disclosure generally relates to a derailleur for a human-powered vehicle.

Background Information

U.S. Patent Application Publication No. 2018/0237104 A1 discloses an example of a human-powered vehicle derailleur including a battery power source unit. In the derailleur, the battery power source unit is accommodated in a battery receptacle disposed on a linkage. The battery receptacle imposes limitations on the shape of a linkage assembly that can consequently hamper movement of the linkage.

SUMMARY

One object of the present disclosure is to provide a human-powered vehicle derailleur that allows a power source to be arranged at a preferred position while maintaining the movability of a linkage assembly.

A derailleur in accordance with a first aspect of the present disclosure is for a human-powered vehicle. The derailleur comprises a base member configured to be attached to a frame of the human-powered vehicle, the base member including a first base member connecting section and a second base member connecting section, a movable member movably arranged relative to the base member, the movable member including a first movable member connecting section and a second movable member connecting section, and a linkage assembly movably connecting the base member and the movable member. The linkage assembly includes an inner link member having a first inner link end portion and a second inner link end portion, and an outer link member at least partially overlying the inner link member as viewed in a direction facing toward the frame in a state where the base member is attached to the frame. The outer link member has a power source receiving part, a first outer link end portion, and a second outer link end portion. The first inner link end portion is pivotally coupled to the first base member connecting section about a first pivot axis. The second inner link end portion is pivotally coupled to the first movable member connecting section about a second pivot axis. The first outer link end portion is pivotally coupled to the second base member connecting section about a third pivot axis. The second outer link end portion is pivotally coupled to the second movable member connecting section about a fourth pivot axis. The power source receiving part is configured to be arranged such that the power source receiving part traverses a reference line extending between the third pivot axis and the fourth pivot axis.

In the derailleur according to the first aspect, the power source receiving part is arranged to traverse the reference line. Thus, the outer link member, which includes the power source receiving part, is appropriately separated from the inner link member while limiting projection of the outer link member in a direction opposite from the frame of the human-powered vehicle. The limitation on projection of the outer link member in a direction opposite from the frame of the human-powered vehicle limits contact of the outer link member, which includes the power source receiving part, with an object while the human-powered vehicle is traveling. Thus, the power source is arranged at a preferred position while maintaining movement of the linkage assembly.

In accordance with a second aspect of the present disclosure, the derailleur according to the first aspect is configured so that as viewed in a direction parallel to at least one of the third pivot axis and the fourth pivot axis, one part of a region divided by the reference line defines a first region and the other part of the region divided by the reference line defines a second region. The power source receiving part includes a portion located in the second region and a portion located in the first region that is larger than the portion located in the second region.

In the derailleur according to the second aspect, the power source receiving part is arranged so that the portion located in the first region is larger than the portion located in the second region.

In accordance with a third aspect of the present disclosure, the derailleur according to the first aspect is configured so that as viewed in a direction parallel to at least one of the third pivot axis and the fourth pivot axis, one part of a region divided by the reference line defines a first region and the other part of the region divided by the reference line defines a second region. The power source receiving part includes a portion located in the second region and a portion located in the first region that is smaller than the portion located in the second region.

In the derailleur according to the third aspect, the power source receiving part is arranged so that the portion located in the first region is smaller than the portion located in the second region.

In accordance with a fourth aspect of the present disclosure, the derailleur according to any one of the first to third aspects further comprises a power source holder including an electric terminal, and arrangeable in the power source receiving part. The power source holder is configured to traverse the reference line in a state arranged in the power source receiving part.

In the derailleur according to the fourth aspect, the power source is appropriately held by the power source holder.

In accordance with a fifth aspect of the present disclosure, the derailleur according to any one of the first to fourth aspects is configured so that the base member includes a base member attachment portion pivotally attached to the frame of the human-powered vehicle about an attachment portion pivot axis. The linkage assembly is configured to be arranged so that at least one of the first pivot axis, the second pivot axis, the third pivot axis, and the fourth pivot axis is orthogonal to the attachment portion pivot axis.

In the derailleur according to the fifth aspect, at least one of the first pivot axis, the second pivot axis, the third pivot axis, and the fourth pivot axis is orthogonal to the attachment portion pivot axis.

In accordance with a sixth aspect of the present disclosure, the derailleur according to any one of the first to fourth aspects is configured so that the base member includes a base member attachment portion pivotally attached to the frame of the human-powered vehicle about an attachment portion pivot axis. At least one of the first pivot axis, the second pivot axis, the third pivot axis, and the fourth pivot axis is inclined relative to a direction orthogonal to the attachment portion pivot axis.

In the derailleur according to the sixth aspect, at least one of the first pivot axis, the second pivot axis, the third pivot axis, and the fourth pivot axis is inclined relative to a direction orthogonal to the attachment portion pivot axis.

In accordance with a seventh aspect of the present disclosure, the derailleur according to any one of the first to sixth aspects is configured so that the power source receiving part includes an accommodation portion configured to accommodate a power source.

In the derailleur according to the seventh aspect, the power source is stably held by the accommodation portion.

In accordance with an eighth aspect of the present disclosure, the derailleur according to any one of the first to seventh aspects further comprises a cover member at least partially covering the power source receiving part.

In the derailleur according to the eighth aspect, the power source disposed on the power source receiving part is protected by the cover member.

In accordance with a ninth aspect of the present disclosure, in the derailleur according to the eighth aspect, the cover member is configured to traverse the reference line in a cover attachment state where the cover member at least partially covers the power source receiving part.

In the derailleur according to the ninth aspect, the power source receiving part is appropriately protected by the cover member.

In accordance with a tenth aspect of the present disclosure, the derailleur according to the eighth or ninth aspect is configured so that the cover member is pivotally attached to the outer link member.

In the derailleur according to the tenth aspect, when the power source is disposed on the power source receiving part, an operator can easily attach the cover member.

In accordance with an eleventh aspect of the present disclosure, the derailleur according to any one of the eighth to tenth aspects is configured so that the cover member is attached in a detachable manner to the outer link member.

In the derailleur according to the eleventh aspect, when the power source is disposed on the power source receiving part and removed from the power source receiving part, interference of the cover member with the power source is limited.

In accordance with a twelfth aspect of the present disclosure, the derailleur according to the eleventh aspect is configured so that the cover member is press-fitted in a detachable manner to the outer link member.

In the derailleur according to the twelfth aspect, the cover member is attached to and detached from the outer link member without a screw or the like.

In accordance with a thirteenth aspect of the present disclosure, the derailleur according to the eleventh aspect is configured so that the cover member includes a first rail. The outer link member includes a second rail. The first rail is configured to slide on the second rail.

In the derailleur according to the thirteenth aspect, the first rail slides on the second rail so that the cover member is attached to and detached from the outer link member.

In accordance with a fourteenth aspect of the present disclosure, the derailleur according to any one of the first to thirteenth aspects is configured so that the power source receiving part is formed integrally with the outer link member.

In the derailleur according to the fourteenth aspect, the power source receiving part is formed integrally with the outer link member. Thus, the number of components is reduced.

In accordance with a fifteenth aspect of the present disclosure, the derailleur according to any one of the first to thirteenth aspects is configured so that the power source receiving part is formed separately from the outer link member.

In the derailleur according to the fifteenth aspect, the power source receiving part is formed separately from the outer link member. Thus, the power source receiving part is readily formed.

In accordance with a sixteenth aspect of the present disclosure, the derailleur according to the fifteenth aspect is configured so that the power source receiving part includes a material differing from that of the outer link member.

In the derailleur according to the sixteenth aspect, the power source receiving part is formed from a material suitable for the power source receiving part.

The human-powered vehicle derailleur according to the present disclosure allows the power source to be arranged in a preferred position while maintaining the movability of the linkage assembly.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF EMBODIMENTS

Figure 1:
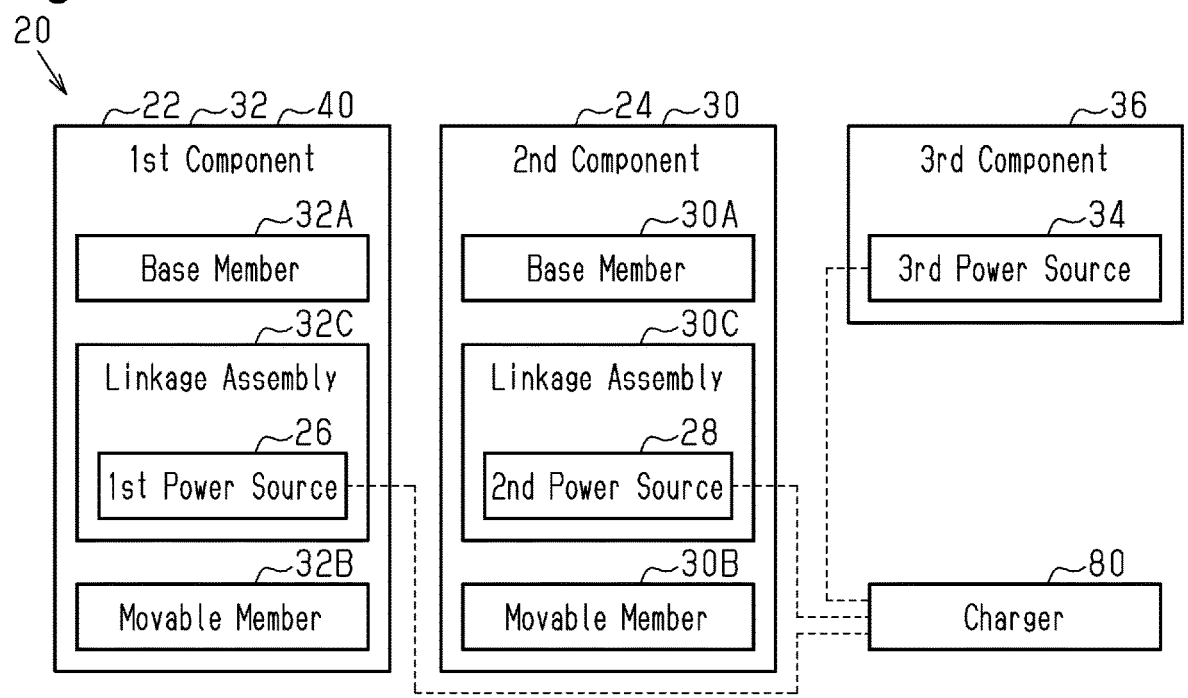
FIG. 1 is a block diagram showing the configuration of a first embodiment of a human-powered vehicle component.

Selected embodiments will now be described with reference to the accompanying drawings, wherein like reference numerals designate corresponding or identical elements throughout the various drawings.

With reference to FIGS. 1 to 17, a component system 20 for a human-powered vehicle, a human-powered vehicle derailleur 40, a human-powered vehicle rear derailleur 54, a charger 80 for use with the component system 20, and a power source 90 for a human-powered vehicle component will be described. A human-powered vehicle 10 is a vehicle including at least one wheel and driven by at least human driving force. The human-powered vehicle 10 includes, for example, various types of bicycles such as a mountain bike, a road bike, a city bike, a cargo bike, a hand bike, and a recumbent bike. The number of wheels on the human-powered vehicle 10 is not limited. The human-powered vehicle 10 includes, for example, a monocycle and a vehicle including two or more wheels. The human-powered vehicle 10 is not limited to a vehicle configured to be driven only by human driving force. The human-powered vehicle 10 includes an E-bike that uses driving force of an electric motor in addition to a human driving force for propulsion. The E-bike includes an electric assist bicycle that assists in propulsion with an electric motor. In the embodiments described below, the human-powered vehicle 10 refers to a mountain bike.

In this specification, unless otherwise specified, the frame of reference for the terms indicating directions such as "front," "rear," "frontward," "rearward," "left," "right," "sideward," "upward," and "downward," as well as other analogous terms indicating directions, will be based on the view of a rider who is facing the handlebar from a reference position (e.g., on saddle or seat) of the human-powered vehicle 10.

As shown in FIGS. 1 to 6, the component system 20 includes a first component 22, a second component 24, a first power source 26, and a second power source 28. The first component 22 includes one of an electric adjustable seatpost, an electric front suspension, an electric rear suspension, an electric front brake, an electric rear brake, an electric shift lever, an electric brake lever, an electric front derailleur 30, and an electric rear derailleur 32. The first power source 26 is used for the first component 22. The first power source 26 includes a first housing 26A and a first power source electric terminal 26B. The first housing 26A has a first housing shape. The first power source electric terminal 26B has a first power source electric terminal shape. The second component 24 includes another one of the electric adjustable seatpost, the electric front suspension, the electric rear suspension, the electric front brake, the electric rear brake, the electric shift lever, the electric brake lever, the electric front derailleur 30, and the electric rear derailleur 32. The second power source 28 is used for the second component 24. The second power source 28 includes a second housing 28A and a second power source electric terminal 28B. The second housing 28A has a second housing shape. The second power source electric terminal 28B has a second power source electric terminal shape. The first housing shape is different from the second housing shape. The first power source electric terminal shape is identical to the second power source electric terminal shape.

For example, the electric adjustable seatpost is provided on a seatpost of the human-powered vehicle 10. The electric adjustable seatpost is, for example, configured to change the height of the seatpost of the human-powered vehicle 10.

For example, the electric front suspension is provided on a front fork of the human-powered vehicle 10. The electric front suspension includes, for example, a first front suspension member and a second front suspension member that is movable relative to the first front suspension member. The electric front suspension is configured to, for example, select any one of a state that restricts movement of the second front suspension member to the first front suspension member and a state that allows the movement.

For example, the electric rear suspension is provided on a rear fork of the human-powered vehicle 10. The electric rear suspension includes, for example, a first rear suspension member and a second rear suspension member that is movable relative to the first rear suspension member. The electric rear suspension is, for example, configured to select any one of a state that restricts movement of the second rear suspension member to the first rear suspension member and a state that allows the movement.

For example, the electric front brake is provided on at least one of a front wheel of the human-powered vehicle 10 and a member that rotates integrally with the front wheel. The electric front brake is configured to, for example, apply braking force to at least one of the front wheel of the human-powered vehicle 10 and the member that rotates integrally with the front wheel.

For example, the electric rear brake is provided on at least one of a rear wheel of the human-powered vehicle 10 and a member that rotates integrally with the rear wheel. The electric rear brake is configured to, for example, apply braking force to at least one of the rear wheel of the human-powered vehicle 10 and the member that rotates integrally with the rear wheel.

For example, the electric shift lever is provided on the handlebar of the human-powered vehicle 10. The electric shift lever is configured to, for example, operate an electric transmission device of the human-powered vehicle 10. The electric transmission device of the human-powered vehicle 10 includes, for example, at least one of the electric front derailleur 30 and the electric rear derailleur 32.

For example, the electric brake lever is provided on the handlebar of the human-powered vehicle 10. The electric brake lever is configured to, for example, operate at least one of the electric front brake and the electric rear brake.

For example, the electric front derailleur 30 is provided on a front sprocket of the human-powered vehicle 10. The electric front derailleur 30 is configured to, for example, change the transmission ratio of the human-powered vehicle 10. The transmission ratio is expressed, for example, as the ratio of rotational speed of a wheel to rotational speed of the crank of the human-powered vehicle 10.

For example, the electric rear derailleur 32 is provided on a rear sprocket of the human-powered vehicle 10. The electric rear derailleur 32 is configured to, for example, change the transmission ratio of the human-powered vehicle 10.

Each of the first component 22 and the second component 24 is a human-powered vehicle component driven by at least electric power. In the present embodiment, the first component 22 includes the electric rear derailleur 32. The electric rear derailleur 32 includes, for example, a base member 32A, a movable member 32B, and a linkage assembly 32C. The base member 32A is, for example, configured to be attached to a frame 10F of the human-powered vehicle 10. The movable member 32B is, for example, movably arranged relative to the base member 32A. The linkage assembly 32C, for example, connects the movable member 32B to the base member 32A. The first power source 26 is, for example, disposed on the linkage assembly 32C of the electric rear derailleur 32. The first component 22 includes, for example, a power source holder in which the first power source 26 is arrangeable.

For example, the second power source 28 and the first power source 26 are used for different types of human-powered vehicle component. In the present embodiment, the second component 24 includes the electric front derailleur 30. The electric front derailleur 30 includes, for example, a base member 30A, a movable member 30B, and a linkage assembly 30C. The base member 30A is, for example, configured to be attached to the frame 10F of the human-powered vehicle 10. The movable member 30B is, for example, movably arranged relative to the base member 30A. The linkage assembly 30C, for example, connects the movable member 30B to the base member 30A. The second power source 28 is, for example, disposed on the linkage assembly 30C of the electric front derailleur 30. The second component 24 includes, for example, a power source holder in which the second power source 28 is arrangeable.

As shown in FIGS. 3 to 6, the first housing shape is, for example, a rectangular rod including a first terminal surface that includes the first power source electric terminal 26B and has round corners. The second housing shape is, for example, a rectangular rod including a second terminal surface that includes the second power source electric terminal 28B and has round corners. For example, the area of the first terminal surface of the first housing shape can be greater than the area of the second terminal surface of the second housing shape so that the first housing shape is configured to be different from the second housing shape. Each of the first housing shape and the second housing shape can be a polygonal rod other than the rectangular rod, a circular rod, or a cone. The area of the first terminal surface may be equal to the area of the second terminal surface. In a case where the area of the first terminal surface is equal to the area of the second terminal surface, the first terminal surface differs in shape from the second terminal surface. In this specification, the term "differ in shape" means one of a case where mathematically non-similar shapes have different areas, a case where mathematically similar shapes have different areas, and a case where mathematically non-similar shapes have the same area.

The first power source electric terminal 26B includes, for example, a plurality of first terminals 26C. The second power source electric terminal 28B includes, for example, a plurality of second terminals 28C. For example, the first terminals 26C of the first power source 26 are arranged identically to the second terminals 28C of the second power source 28. The first terminals 26C include, for example, at least one of a positive terminal for charging, a negative terminal for charging, and a communication terminal for communication. The second terminals 28C include, for example, at least one of a positive terminal for charging, a negative terminal for charging, and a communication terminal for communication.

Figure 3:
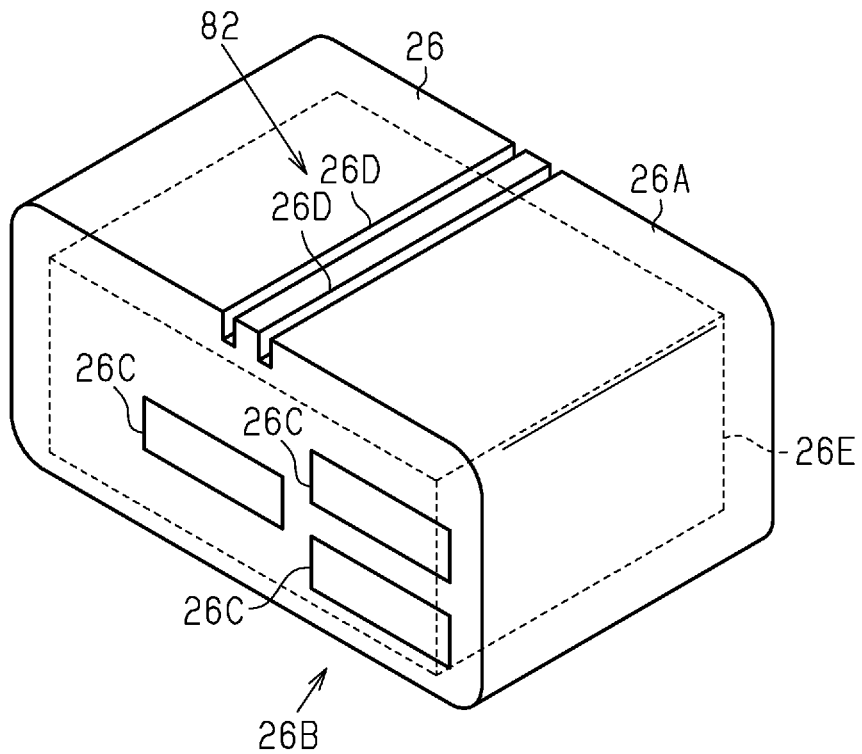
FIG. 3 is a perspective view of a first power source shown in FIG. 1.

The first power source electric terminal shape is determined by the arrangement of the first terminals 26C. The second power source electric terminal shape is determined by the arrangement of the second terminals 28C. The arrangement of the first terminals 26C includes, for example, the number of first terminals 26C, the shape of the first terminals 26C, and the arrangement of electrodes or the like. In FIG. 3, in the first power source electric terminal shape, one first terminal 26C used as a positive terminal, one first terminal 26C used as a negative terminal, and one first terminal 26C for communication are arranged side by side. The first terminal 26C for communication can be excluded from the first power source electric terminal shape, and a plurality of first terminals 26C used as positive terminals and a plurality of first terminals 26C used as negative terminals can be arranged side by side. The first power source electric terminal 26B can be configured to communicate with the first component 22 through the first terminals 26C used as positive terminals and the first terminals 26C used as negative terminals.

Figure 5:
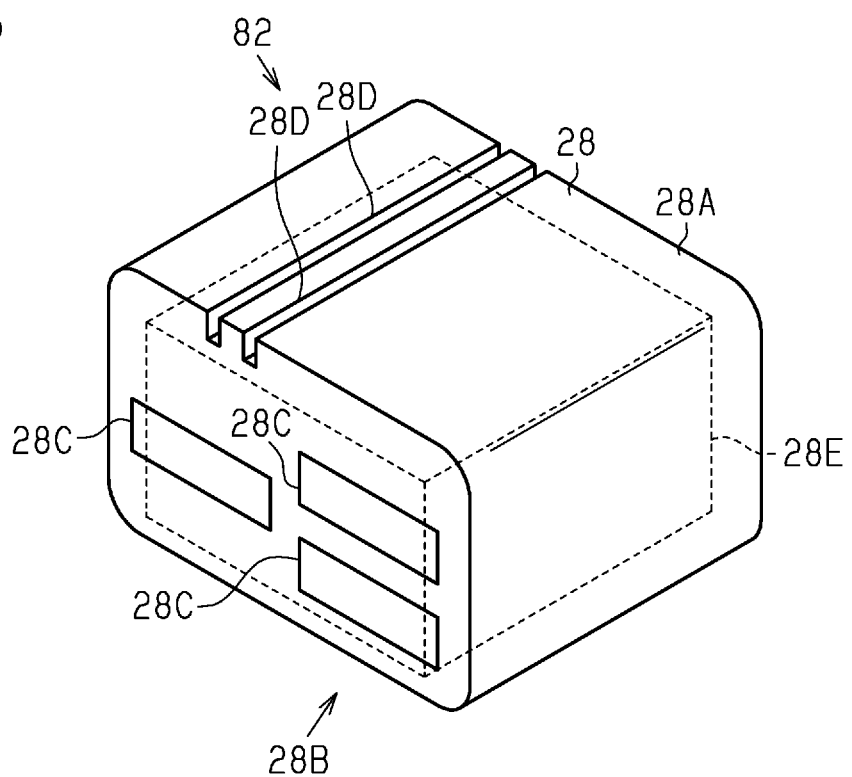
FIG. 5 is a perspective view of a second power source shown in FIG. 1.

The arrangement of the second terminals 28C includes, for example, the number of second terminals 28C, the shape of the second terminals 28C, and the arrangement of electrodes or the like. In FIG. 5, in the second power source electric terminal shape, one second terminal 28C used as a positive terminal, one second terminal 28C used as a negative terminal, and one second terminal 28C for communication are arranged side by side in the same manner as the first power source electric terminal shape. The second terminal 28C for communication can be excluded from the second power source electric terminal shape, and a plurality of second terminals 28C used as positive terminals and a plurality of second terminals 28C used as negative terminals can be arranged side by side. The second power source electric terminal 28B can be configured to communicate with the second component 24 through the second terminals 28C used as positive terminals and the second terminals 28C used as negative terminals.

The first component 22, for example, includes a first component electric terminal 22A. The first component electric terminal 22A has, for example, a first component electric terminal shape. The first component electric terminal shape corresponds to the first power source electric terminal shape. The second component 24 includes, for example, a second component electric terminal 24A. The second component electric terminal 24A has a second component electric terminal shape. The second component electric terminal shape corresponds to the second power source electric terminal shape. The first component electric terminal shape is, for example, identical to the second component electric terminal shape. The first component electric terminal 22A is, for example, provided on the power source holder of the first component 22. The second component electric terminal 24A is, for example, provided on the power source holder of the second component 24.

The first component electric terminal shape corresponds to the first power source electric terminal shape so that the first component electric terminal 22A is electrically connectable to the first power source electric terminal 26B. The first component 22 is supplied with electric power from the first power source 26 via the first power source electric terminal 26B and the first component electric terminal 22A. The second component electric terminal shape corresponds to the second power source electric terminal shape so that the second component electric terminal 24A is electrically connectable to the second power source electric terminal 28B. The second component 24 is supplied with electric power from the second power source 28 via the second power source electric terminal 28B and the second component electric terminal 24A.

Figure 4:
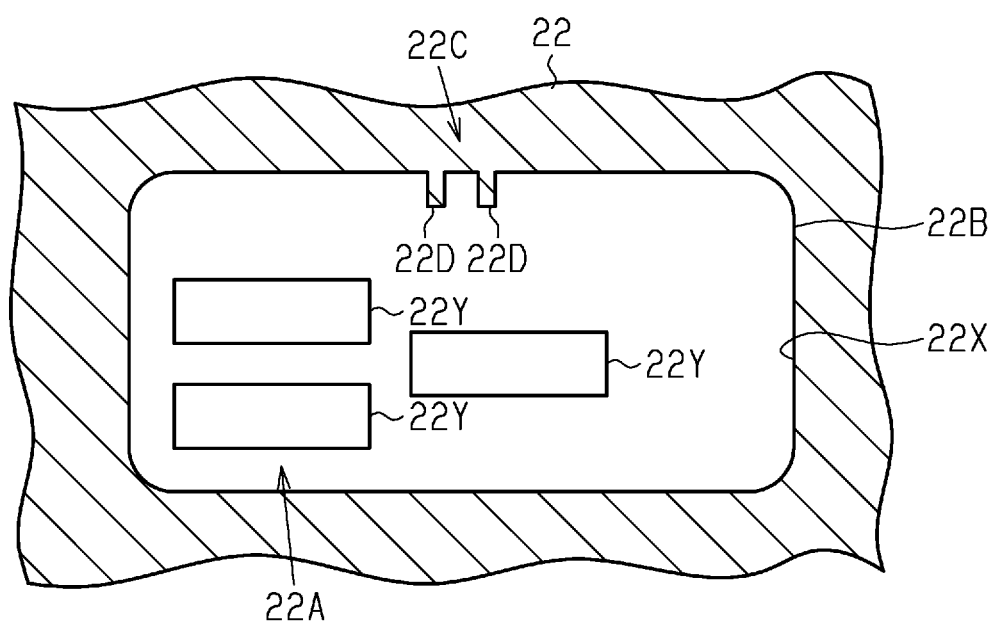
FIG. 4 is a schematic diagram of a first component shown in FIG. 1.

The first component electric terminal shape is, for example, identical to the first power source electric terminal shape. The second component electric terminal shape is, for example, identical to the second power source electric terminal shape. The first component electric terminal 22A includes, for example, a plurality of first component terminals 22Y corresponding to the first terminals 26C. The first component electric terminal shape is determined by the arrangement of a plurality of terminals corresponding to the first terminals 26C. In FIG. 4, in the first component electric terminal shape, one first component terminal 22Y used as a positive terminal, one first component terminal 22Y used as a negative terminal, and one first component terminal 22Y for communication are arranged side by side. The first component terminal 22Y used as a positive terminal is configured to contact the first terminal 26C used as a positive terminal. The first component terminal 22Y used as a negative terminal is configured to contact the first terminal 26C used as a negative terminal. The first component terminal 22Y for communication is configured to contact the first terminal 26C for communication.

Figure 6:
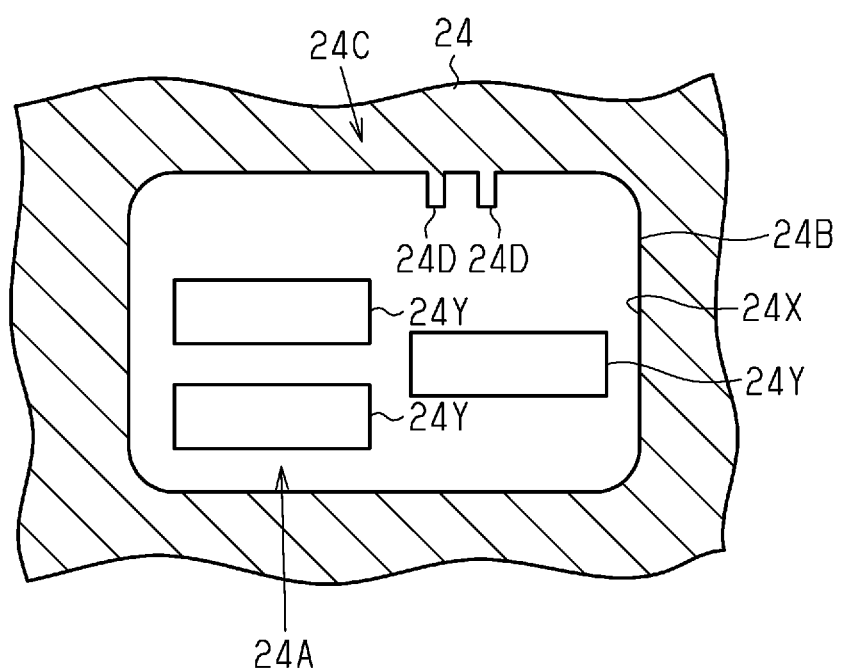
FIG. 6 is a schematic diagram of a second component shown in FIG. 1.

The second component electric terminal 24A includes, for example, a plurality of second component terminals 24Y corresponding to the second terminals 28C. The second component electric terminal shape is determined by the arrangement of a plurality of terminals corresponding to the second terminals 28C. In FIG. 6, in the second component electric terminal shape, one second component terminal 24Y used as a positive terminal, one second component terminal 24Y used as a negative terminal, and one second component terminal 24Y for communication are arranged side by side. The second component terminal 24Y used as a positive terminal is configured to contact the second terminal 28C used as a positive terminal. The second component terminal 24Y used as a negative terminal is configured to contact the second terminal 28C used as a negative terminal. The second component terminal 24Y for communication is configured to contact the second terminal 28C for communication.

The first component 22 includes, for example, a first attachment 22B. The first attachment 22B is attachable to the first power source 26. The first attachment 22B corresponds to the first housing shape. For example, the second component 24 includes a second attachment 24B. The second attachment 24B is attachable to the second power source 28. The second attachment 24B corresponds to the second housing shape. The first attachment 22B is configured to, for example, hold the first power source 26 in a power source receiving part of the first component 22. The second attachment 24B is configured to, for example, hold the second power source 28 in a power source receiving part of the second component 24. The first attachment 22B is, for example, formed on the first component 22 so that the first housing 26A is insertable in the power source receiving part of the first component 22. The second attachment 24B is, for example, formed on the second component 24 so that the second housing 28A is insertable in the power source receiving part of the second component 24. The first attachment 22B is, for example, formed to clamp the first housing 26A. The second attachment 24B is, for example, formed to clamp the second housing 28A.

The first attachment 22B includes, for example, a first attachment engagement portion 22C. The first housing 26A includes, for example, a first housing engagement portion 26D. The first attachment engagement portion 22C is engageable with the first housing engagement portion 26D. The second attachment 24B includes, for example, a second attachment engagement portion 24C. The second housing 28A includes, for example, a second housing engagement portion 28D. The second attachment engagement portion 24C is engageable with the second housing engagement portion 28D. The first attachment engagement portion 22C is, for example, disposed on at least one of the first attachment 22B and the power source receiving part of the first component 22. The second attachment engagement portion 24C is, for example, disposed on at least one of the second attachment 24B and the power source receiving part of the second component 24. The first attachment engagement portion 22C engages with the first housing engagement portion 26D to position the first power source electric terminal 26B relative to the first component electric terminal 22A. The second attachment engagement portion 24C engages with the second housing engagement portion 28D to position the second power source electric terminal 28B relative to the second component electric terminal 24A.

The first attachment 22B includes, for example, a first component recess 22X formed in the first component 22. The first component electric terminal 22A is, for example, disposed in the first component recess 22X. The second attachment 24B includes, for example, a second component recess 24X formed in the second component 24. The second component electric terminal 24A is, for example, disposed in the second component recess 24X. The first attachment 22B, for example, differs in shape from the second attachment 24B. The shape of the first attachment 22B includes, for example, the shape of the first component recess 22X. The shape of the second attachment 24B includes, for example, the shape of the second component recess 24X. The shape of the first component recess 22X, for example, differs from the shape of the second component recess 24X.

The first attachment engagement portion 22C includes, for example, a first rail 22D configured to slide on and engage with the first housing engagement portion 26D. The second attachment engagement portion 24C includes, for example, a second rail 24D configured to slide on and engage with the second housing engagement portion 28D. The first rail 22D is formed in the same manner as the second rail 24D. The first housing engagement portion 26D includes, a rail. The first rail 22D engages with the rail of the first housing engagement portion 26D. This engages the first attachment engagement portion 22C with the first housing engagement portion 26D. The second housing engagement portion 28D includes a rail. The second rail 24D engages with the rail of the second housing engagement portion 28D. This engages the second attachment engagement portion 24C with the second housing engagement portion 28D.

The first power source 26 includes, for example, at least one first power source element 26E. The first power source 26 shown in FIG. 3 includes one first power source element 26E. The first power source 26 can include a plurality of first power source elements 26E. The first power source element 26E is electrically connected to the first power source electric terminal 26B. The first power source element 26E is, for example, at least partially accommodated in the first housing 26A of the first power source 26. The second power source 28 includes, for example, at least one second power source element 28E. The second power source 28 shown in FIG. 5 includes one second power source element 28E. The second power source 28 can include a plurality of second power source elements 28E. The second power source element 28E is electrically connected to the second power source electric terminal 28B. The second power source element 28E is, for example, at least partially accommodated in the second housing 28A of the second power source 28. The battery capacity of the first power source 26 can be the same as or different from the battery capacity of the second power source 28. In a case where the battery capacity of the first power source 26 is the same as the battery capacity of the second power source 28, for example, the battery capacity of the first power source element 26E is the same as the battery capacity of the second power source element 28E. For example, the shape of the first power source element 26E differs from the shape of the second power source element 28E. The first power source element 26E is shaped in accordance with the first housing shape. The second power source element 28E is shaped in accordance with the second housing shape. The number of the at least one second power source element 28E can differ from the number of at least one first power source element 26E.

Figure 7:
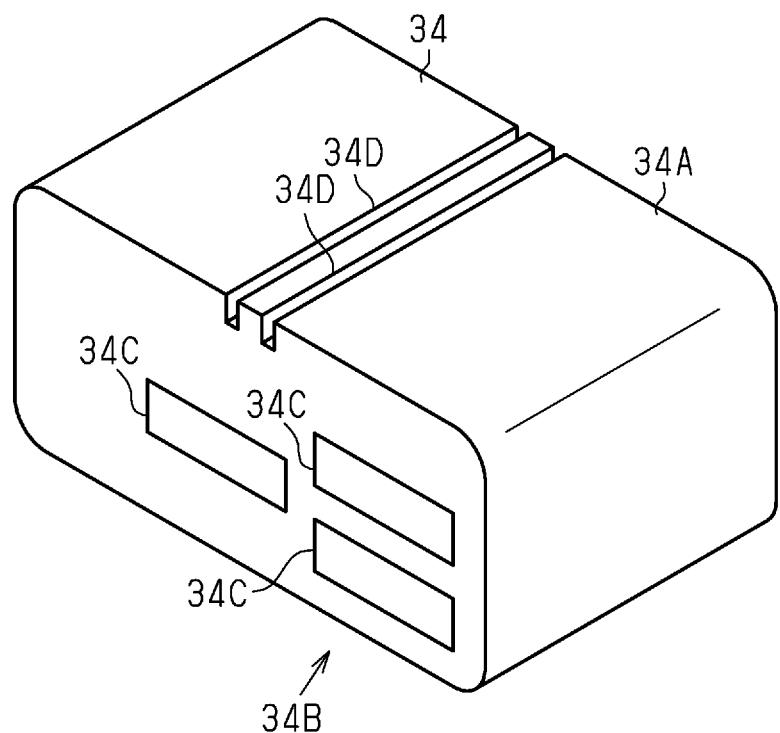
FIG. 7 is a perspective view of a third power source shown in FIG. 1.
Figure 8:
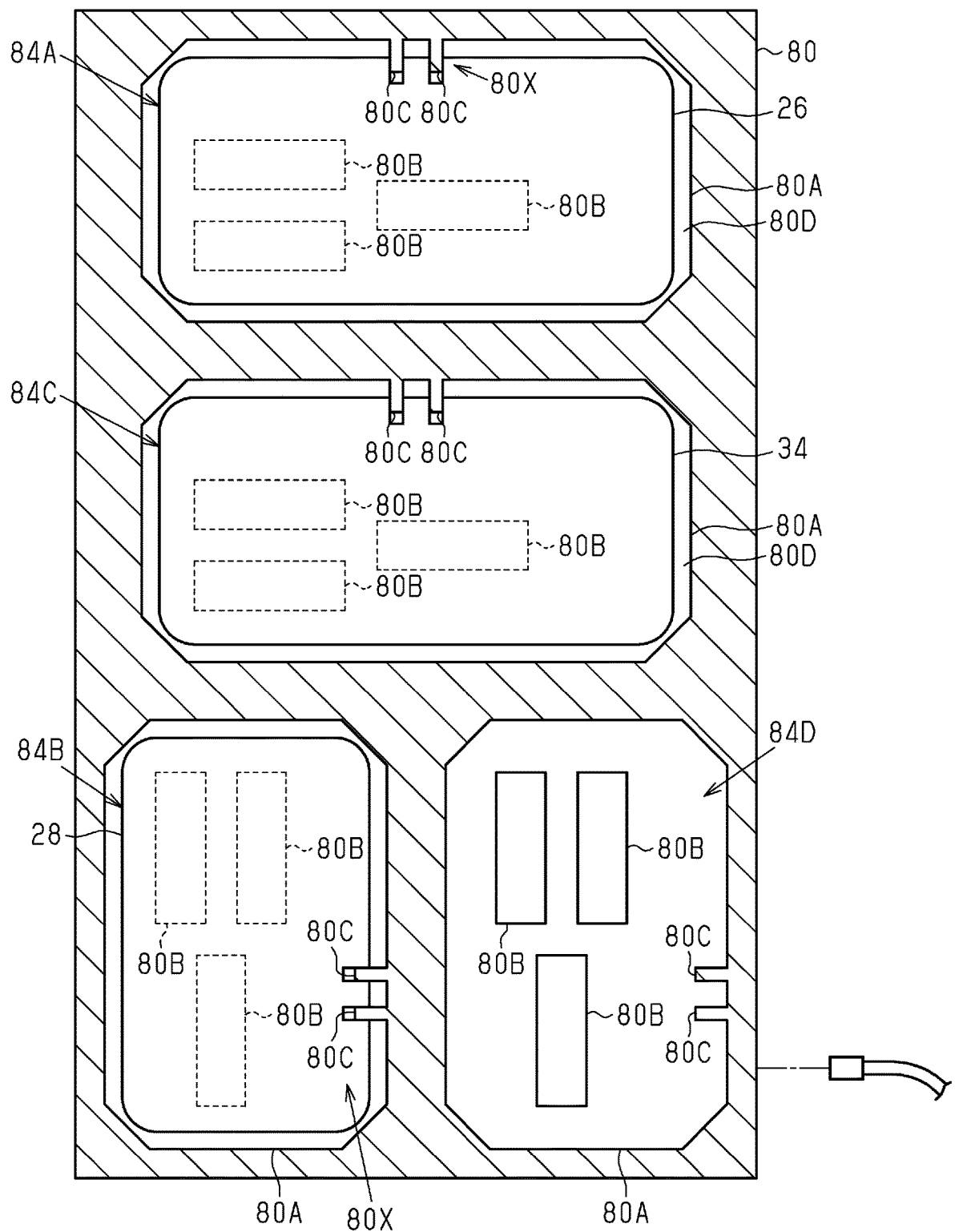
FIG. 8 is a schematic diagram of a charger for use with a component system for a human-powered vehicle shown in FIG. 1.

As shown in FIGS. 1 and 3 to 7, for example, the component system 20 further includes a third power source 34. The third power source 34 is used for a third component 36. The third power source 34 includes a third housing 34A and a third power source electric terminal 34B. The third component 36 includes, for example, one of the electric adjustable seatpost, the electric front suspension, the electric rear suspension, the electric front brake, the electric rear brake, the electric shift lever, the electric brake lever, the electric front derailleur 30, and the electric rear derailleur 32 that differs from the first component 22 and the second component 24. The third housing 34A has a third housing shape. The third housing shape is different from at least one of the first housing shape and the second housing shape. The third power source electric terminal 34B has, for example, a third power source electric terminal shape. The third power source electric terminal shape is, for example, identical to the first power source electric terminal shape and the second power source electric terminal shape. The third housing shape can be identical in shape to one of the first housing shape and the second housing shape or can be different from both the first housing shape and the second housing shape. The third housing shape shown in FIG. 7 is identical to the first housing shape and different from the second housing shape.

The third power source electric terminal 34B includes, for example, a plurality of third terminals 34C. The third terminals 34C include, for example, at least one of a positive terminal for charging, a negative terminal for charging, and a communication terminal for communication. The third power source electric terminal shape is determined by the arrangement of the third terminals 34C. The arrangement of the third terminals 34C includes, for example, the number of the third terminals 34C, the shape of the third terminals 34C, and the arrangement of electrodes. In the present embodiment, in the third power source electric terminal shape, one third terminal 34C used as a positive terminal, one third terminal 34C used as a negative terminal, and one third terminal 34C for communication are arranged side by side in the same manner as the first power source electric terminal shape. The third terminal 34C used as a positive terminal and the third terminal 34C used as a negative terminal are configured to supply electric power to the third component 36 in addition to perform charging.

The third component 36 is a human-powered vehicle component driven by at least electric power. The third component 36 is, for example, a human-powered vehicle component that differs from the first component 22 and differs in type from the second component 24.

The third component 36 includes, for example, a third component electric terminal. The third component electric terminal has a third component electric terminal shape that is identical to the first component electric terminal shape.

The third component electric terminal has a third component electric terminal shape that is identical to the second component electric terminal shape.

The third component 36 includes, for example, a third attachment. The third attachment can be, for example, the same as the first attachment 22B. In a case where the third housing shape differs in shape from both the first housing shape and the second housing shape, the third attachment can differ from both the first attachment 22B and the second attachment 24B.

The third housing 34A includes, for example, a third housing engagement portion 34D. The third housing engagement portion 34D is engageable with a third attachment engagement portion.

As shown in FIGS. 1 to 8, for example, the charger 80 is used in the component system 20 for a human-powered vehicle. For example, the first power source 26, the second power source 28, and the third power source 34 each include a rechargeable battery, and the charger 80 is configured to charge at least one of the first power source 26, the second power source 28, and the third power source 34. The charger 80 is, for example, configured to charge all of the first power source 26, the second power source 28, and the third power source 34. The charger 80 includes, for example, a first charging portion 84A configured to charge the first power source 26, a second charging portion 84B configured to charge the second power source 28, and a third charging portion 84C configured to charge the third power source 34. The number of charging portions can be changed in any manner. For example, the charger 80 shown in FIG. 8 further includes a fourth charging portion 84D and can simultaneously charge four power sources.

The charger 80 is, for example, configured to be connected to an alternating current power supply. The charger 80 is configured to supply electric power from the alternating current power supply to the first power source 26, the second power source 28, and the third power source 34. The charger 80 is, for example, configured to be attached to and detached from the first power source 26, the second power source 28, and the third power source 34. The charger 80 is configured to be connected to one of the first power source 26, the second power source 28, and the third power source 34 to supply electric power to the connected one of the first power source 26, the second power source 28, and the third power source 34.

The charger 80 includes, for example, a charger receptacle 80A. The charger receptacle 80A includes, for example, a recess provided in the housing of the charger 80. The charger receptacle 80A is configured to accommodate at least one of the first power source 26, the second power source 28, and the third power source 34. The charger 80 can include a support instead of the charger receptacle 80A. The support is, for example, plate-shaped.

The charger 80 includes, for example, a charger electric terminal 80B. The charger electric terminal 80B corresponds to the first power source electric terminal shape and the second power source electric terminal shape. The charger electric terminal 80B, for example, includes a charger electric terminal shape. The charger electric terminal shape is, for example, identical to the first component electric terminal shape and the second component electric terminal shape. The charger electric terminal 80B is shaped in accordance with the first power source electric terminal shape and the second power source electric terminal shape so as to contact the first power source electric terminal 26B and the second power source electric terminal 28B. Since the charger electric terminal shape is identical to the first component electric terminal shape and the second component electric terminal shape, the charger electric terminal 80B is connectable to the first power source 26 and the second power source 28.

The charger 80 is, for example, configured to charge the first power source 26 and the second power source 28 via the charger electric terminal 80B. The charger electric terminal 80B includes a plurality of terminals corresponding to the first terminals 26C. The charger electric terminal shape is determined by the arrangement of the terminals corresponding to the first terminals 26C.

The charger electric terminal 80B, for example, corresponds to the third power source electric terminal shape. The charger electric terminal 80B is shaped in accordance with the third power source electric terminal shape so as to contact the third power source electric terminal 34B. The charger electric terminal shape is identical to the third component electric terminal shape. Since the charger electric terminal shape is identical to the third component electric terminal shape, the charger electric terminal 80B is connectable to the third power source 34. The charger 80 is configured to charge the third power source 34 via the charger electric terminal 80B.

The charger 80 includes, for example, a charger engagement portion 80C engageable with the first housing 26A and the second housing 28A. The charger engagement portion 80C, for example, engages with the first housing 26A in the same manner as the first attachment engagement portion 22C and engages with the second housing 28A in the same manner as the second attachment engagement portion 24C. The charger engagement portion 80C, for example, has a shape corresponding to the first attachment engagement portion 22C and a shape corresponding to the second attachment engagement portion 24C. In the charger 80 shown in FIG. 8, the charger engagement portion 80C of the first charging portion 84A engages with the first housing 26A of the first power source 26, and the charger engagement portion 80C of the second charging portion 84B engages with the second housing 28A of the second power source 28. The charger 80 includes, for example, a charger engagement portion 80C engageable with the third housing 34A. In the charger 80 shown in FIG. 8, the charger engagement portion 80C of the third charging portion 84C engages with the third housing 34A of the third power source 34.

The charger engagement portion 80C includes, for example, a rail similar to the first rail 22D. The charger engagement portion 80C is configured to slide on and engage with the first housing engagement portion 26D. The charger engagement portion 80C is configured to slide on and engage with the second housing engagement portion 28D.

The first power source 26 and the second power source 28 each include, for example, a held portion 82 corresponding to the charger engagement portion 80C. For example, the held portion 82 of the first power source 26 includes the first housing engagement portion 26D. For example, the held portion 82 of the second power source 28 includes the second housing engagement portion 28D. In a case where the charger 80 charges the first power source 26, the charger engagement portion 80C engages with the first housing engagement portion 26D to position the first power source electric terminal 26B relative to the charger electric terminal 80B. In a case where the charger 80 charges the second power source 28, the charger engagement portion 80C engages with the second housing engagement portion 28D to position the second power source electric terminal 28B relative to the charger electric terminal 80B.

The charger 80, for example, further includes a first charger engagement portion 80X and a second charger engagement portion 80Y. The first charger engagement portion 80X is engageable with the first housing 26A. The second charger engagement portion 80Y is engageable with the second housing 28A. The charger engagement portion 80C includes, for example, the first charger engagement portion 80X and the second charger engagement portion 80Y. In the present embodiment, the first charger engagement portion 80X and the second charger engagement portion 80Y are identical in structure. For example, the first charger engagement portion 80X and the first attachment engagement portion 22C are identical in structure, and the second charger engagement portion 80Y and the second attachment engagement portion 24C are identical in structure. In the present embodiment, the first charger engagement portion 80X is used as the second charger engagement portion 80Y. The first charger engagement portion 80X can be provided separately from the second charger engagement portion 80Y.

The charger engagement portion 80C can be arranged on a charger terminal surface 80D that includes the charger electric terminal 80B. In a case where the charger engagement portion 80C is arranged on the charger terminal surface 80D, for example, the charger terminal surface 80D and each of the first power source 26, the second power source 28, and the third power source 34 are configured to be coupled by magnets. For example, the charger terminal surface 80D includes one of a recess and a projection. Each of the first power source 26, the second power source 28, and the third power source 34 includes the other one of the recess and the projection configured to be coupled to the one of the recess and the projection of the charger terminal surface 80D.

Figure 9:
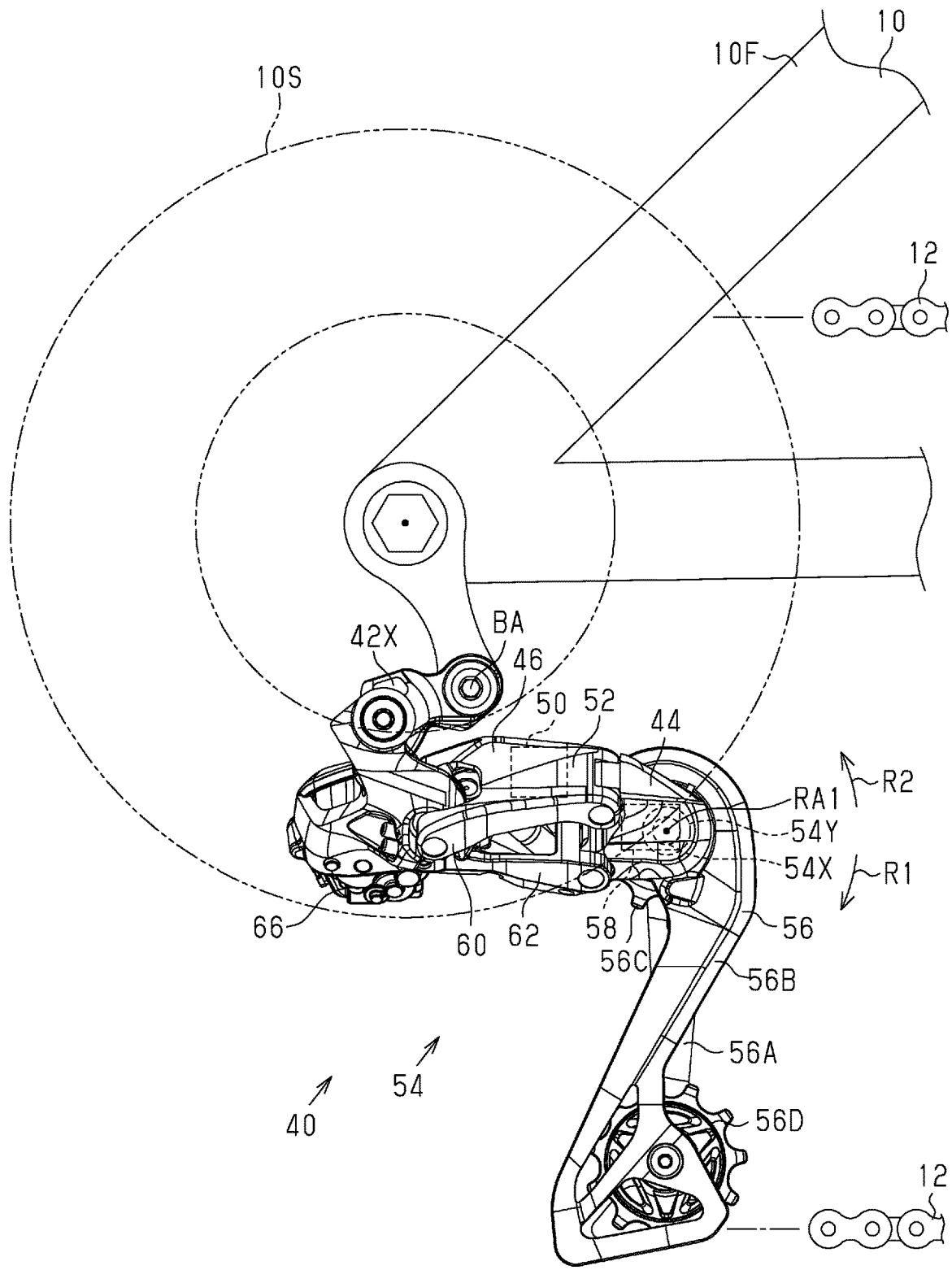
FIG. 9 is a side view of a human-powered vehicle derailleur included in the first component of the component system for the human-powered vehicle shown in FIG. 1, a human-powered vehicle frame, a chain, and a sprocket mechanism.

As shown in FIG. 9, the human-powered vehicle 10 includes, for example, a derailleur 40. The derailleur 40 includes, for example, one of a front derailleur and a rear derailleur 54. The derailleur 40 includes, for example, one of the electric front derailleur 30 and the electric rear derailleur 32. The derailleur 40 shown in FIG. 9 includes the rear derailleur 54. The rear derailleur 54 includes, for example, the electric rear derailleur 32. The base member 32A, the movable member 32B, and the linkage assembly 32C are respectively referred to as a base member 42, a movable member 44, and a linkage assembly 46 in a case where the derailleur 40 includes the electric rear derailleur 32. The linkage assembly 46 includes, for example, at least one link member 52.

The human-powered vehicle derailleur 40 will be described with reference to FIGS. 9 to 17. In the description with reference to FIGS. 9 to 17, the derailleur 40 refers to the rear derailleur 54.

Figure 12:
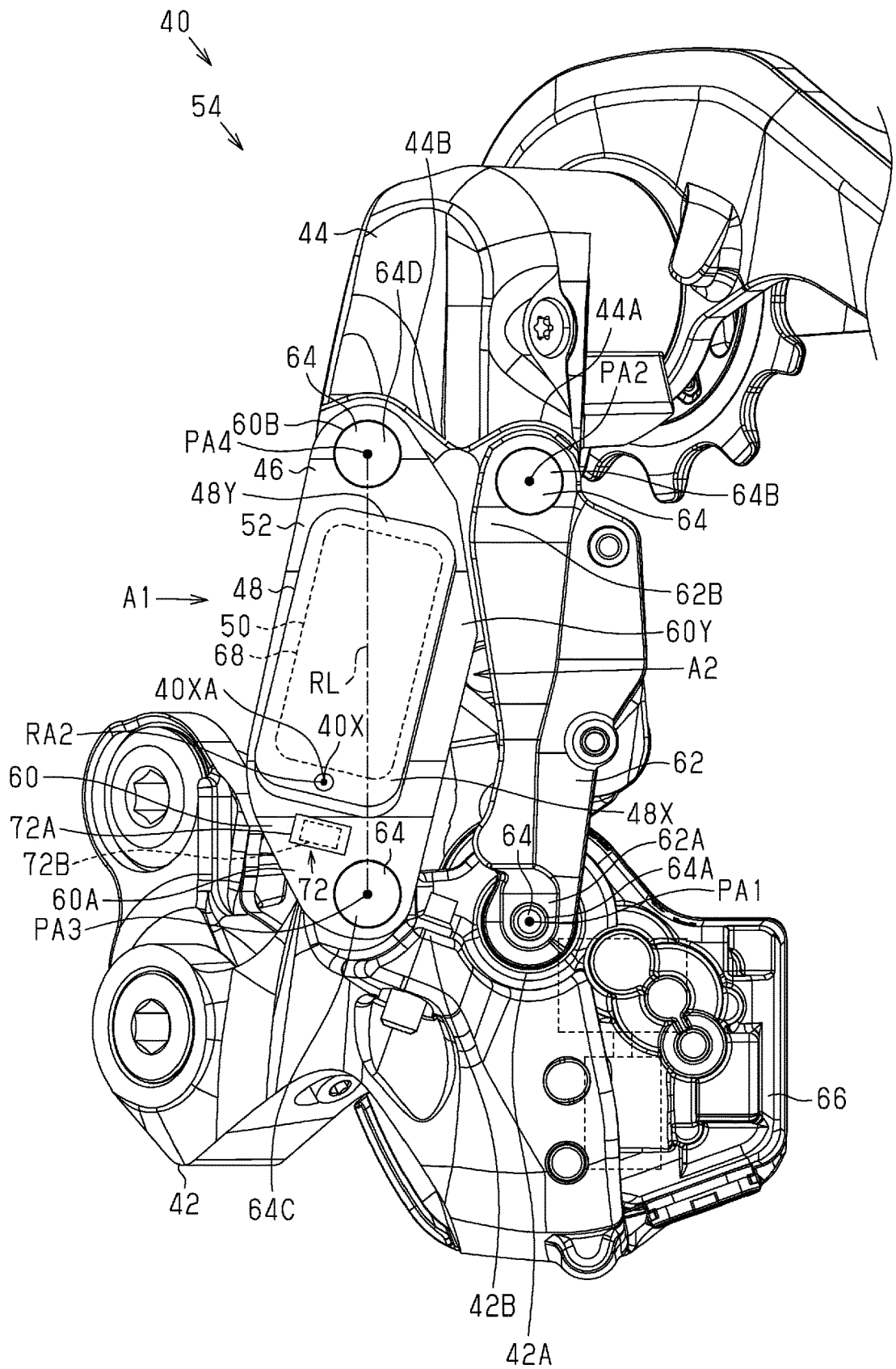
FIG. 12 is a first partial plan view of the human-powered vehicle derailleur shown in FIG. 9.

As shown in FIGS. 9 and 12, for example, the derailleur 40 includes the base member 42, the movable member 44, the linkage assembly 46, and a cover member 48. The base member 42 is, for example, configured to be attached to the frame 10F of the human-powered vehicle 10. The movable member 44 is, for example, movably arranged relative to the base member 42. The linkage assembly 46, for example, movably connects the movable member 44 to the base member 42. The linkage assembly 46 includes, for example, a power source receiving part 50. The cover member 48, for example, at least partially covers the power source receiving part 50. The cover member 48 is, for example, pivotally coupled to one of the base member 42, the movable member 44, and the linkage assembly 46.

The rear derailleur 54 includes, for example, the base member 42, the movable member 44, the at least one link member 52, a pulley assembly 56, a rotational shaft 54X, a biasing member 54Y, and a damping structure 58. The base member 42 is, for example, configured to be attached to the frame 10F of the human-powered vehicle 10. The movable member 44 is, for example, movably arranged relative to the base member 42. The at least one link member 52 connects, for example, the movable member 44 to the base member 42. The at least one link member 52 includes, for example, the power source receiving part 50. The pulley assembly 56 is, for example, rotatably connected to the movable member 44 about a rotational axis RA1. The rotational shaft 54X is, for example, fixed to the pulley assembly 56 and rotatably coupled to the movable member 44 about the rotational axis RA1. The biasing member 54Y is, for example, configured to bias the pulley assembly 56 relative to the movable member 44 in a first rotational direction R1 about the rotational axis RA1. The damping structure 58 is, for example, provided around the rotational shaft 54X of the movable member 44. The damping structure 58, for example, applies rotational resistance force to the pulley assembly 56 when the pulley assembly 56 rotates in a second rotational direction R2 that is opposite to the first rotational direction R1.

Figure 10:
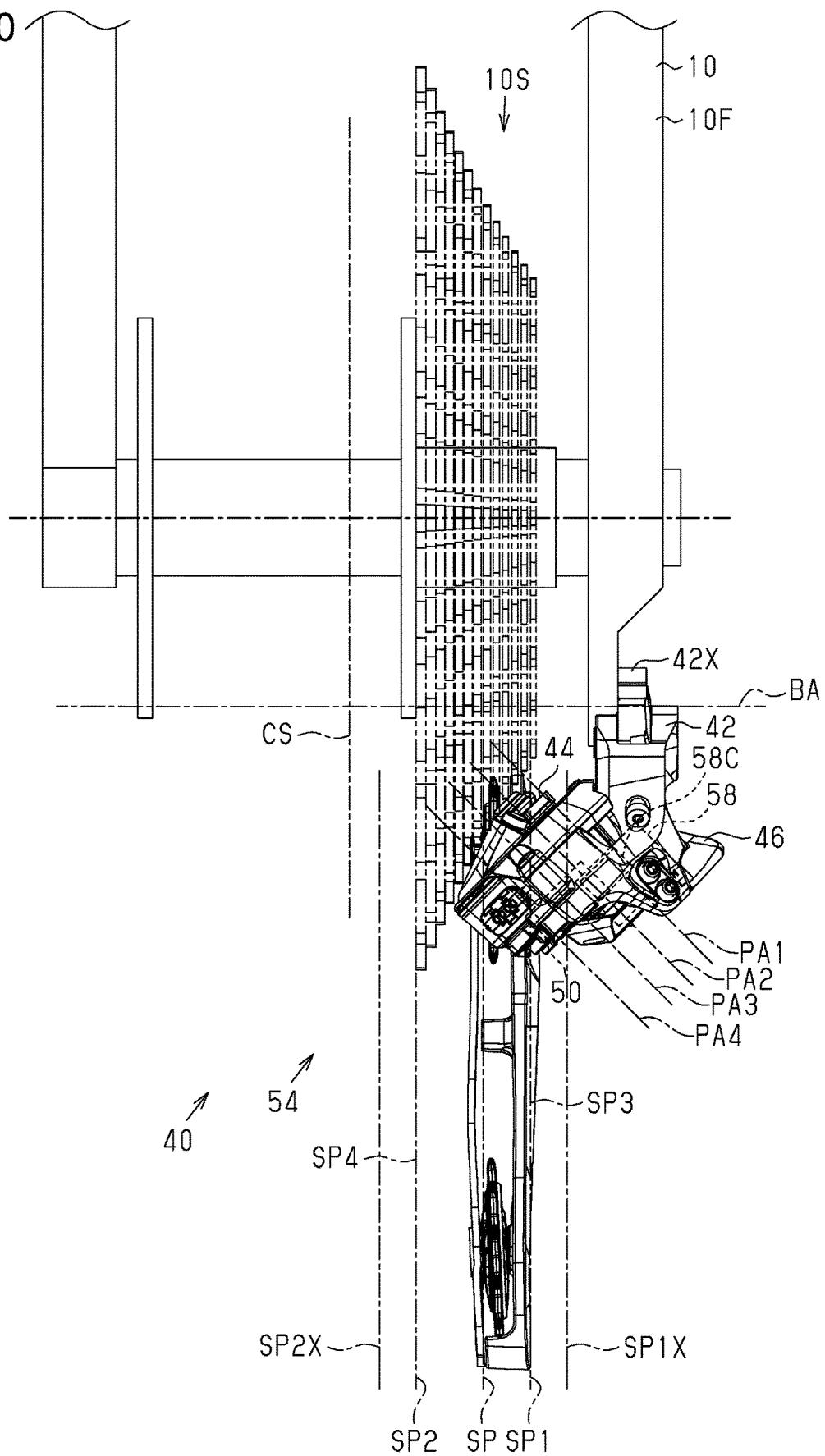
FIG. 10 is a plan view of the human-powered vehicle derailleur corresponding to the first component shown in FIG. 1, the human-powered vehicle frame, the chain, and the sprocket mechanism as viewed in a direction from a base member toward a movable member.

As shown in FIGS. 9 and 10, the base member 42 includes, for example, a base member attachment portion 42X. The base member attachment portion 42X is, for example, pivotally attached to the frame 10F of the human-powered vehicle 10 about an attachment portion pivot axis BA. The linkage assembly 46 is, for example, configured to be arranged so that at least one of a first pivot axis PA1, a second pivot axis PA2, a third pivot axis PA3, and a fourth pivot axis PA4 is inclined relative to a direction orthogonal to the attachment portion pivot axis BA. The attachment portion pivot axis BA, for example, coincides with a rear wheel axis of the human-powered vehicle 10.

The first pivot axis PA1, the second pivot axis PA2, the third pivot axis PA3, and the fourth pivot axis PA4 extend, for example, parallel to each other. The first pivot axis PA1, the second pivot axis PA2, the third pivot axis PA3, and the fourth pivot axis PA4 are inclined relative to an axial center plane CS so as to become closer to the axial center plane CS toward an upper side of the linkage assembly 46. The axial center plane CS is, for example, orthogonal to the attachment portion pivot axis BA of the human-powered vehicle 10. The upper side of the linkage assembly 46 refers to a direction toward the human-powered vehicle 10 in a state where the derailleur 40 is arranged so that the axial direction of at least one link pin 64 is parallel to a vertical direction.

The movable member 44 is, for example, movably arranged relative to the base member 42 in a direction parallel to the attachment portion pivot axis BA. The rear derailleur 54 moves a chain 12 from one sprocket to another sprocket in accordance with movement of the movable member 44 relative to the base member 42. The movable member 44 is, for example, movable relative to the base member 42 at least between an outermost shifting position SP1 and an innermost shifting position SP2. The outermost shifting position SP1 corresponds to a smallest sprocket position SP3 where the chain 12 of the human-powered vehicle 10 engages a smallest sprocket of a sprocket mechanism 10S. The innermost shifting position SP2 corresponds to a largest sprocket position SP4 where the chain 12 of the human-powered vehicle 10 engages a largest sprocket of the sprocket mechanism 10S.

The movable member 44 moves relative to the base member 42, for example, so that a shifting position SP of the pulley assembly 56 is located at the outermost shifting position SP1 and the innermost shifting position SP2. The outermost shifting position SP1 corresponds to the smallest sprocket position SP3 in a direction orthogonal to the attachment portion pivot axis BA. The innermost shifting position SP2 corresponds to the largest sprocket position SP4 in a direction orthogonal to the attachment portion pivot axis BA. The outermost shifting position SP1 coincides with the center plane of the smallest sprocket in a rear wheel axial direction of the human-powered vehicle 10. The center plane of the smallest sprocket is, for example, located at the smallest sprocket position SP3 in the rear wheel axial direction of the human-powered vehicle 10. The innermost shifting position SP2 coincides with the center plane of the largest sprocket in the rear wheel axial direction of the human-powered vehicle 10. The center plane of the largest sprocket is, for example, located at the largest sprocket position SP4 in the rear wheel axial direction of the human-powered vehicle 10.

The outermost shifting position SP1 is a position where the chain 12 engages with the smallest sprocket. The outermost shifting position SP1 can be located at a position separated from the center plane of the smallest sprocket in the rear wheel axial direction of the human-powered vehicle 10. The outermost shifting position SP1 can be located at a position, such as a first position SP1X, farther from the human-powered vehicle 10 than the center plane of the smallest sprocket in the rear wheel axial direction. The innermost shifting position SP2 is a position where the chain 12 engages the largest sprocket. The innermost shifting position SP2 can be located at a position separated from the center plane of the largest sprocket in the rear wheel axial direction of the human-powered vehicle 10. The innermost shifting position SP2 can be located at a position, such as a second position SP2X, closer to the human-powered vehicle 10 than the center plane of the largest sprocket in the rear wheel axial direction.

The movable member 44 is movable relative to the base member 42 at least between the outermost shifting position SP1 and the innermost shifting position SP2. The movable member 44 can be movable relative to the base member 42 in a range wider than between the outermost shifting position SP1 and the innermost shifting position SP2. The movable member 44 can be configured to, for example, move to a position farther from the frame 10F than the outermost shifting position SP1 in a direction of the attachment portion pivot axis BA so as to move the chain 12 to the smallest sprocket. The movable member 44 can be configured to, for example, move to a position farther from the frame 10F than the innermost shifting position SP2 in a direction of the attachment portion pivot axis BA so as to move the largest sprocket of the chain 12.

The linkage assembly 46 includes, for example, an outer link member 60 and an inner link member 62. The outer link member 60, for example, at least partially overlies the inner link member 62 as viewed in a direction facing toward the frame 10F in a state where the base member 42 is attached to the frame 10F. The at least one link member 52 includes, for example, the outer link member 60 and the inner link member 62. The outer link member 60, for example, at least partially overlies the inner link member 62 as viewed in a direction facing toward the frame 10F in a state where the base member 42 is attached to the frame 10F.

The pulley assembly 56 includes, for example, an inner plate 56A, an outer plate 56B, a guide pulley 56C, and a tension pulley 56D. The rotational shaft 54X is coupled to the pulley assembly 56 so as to rotate integrally with the pulley assembly 56. The biasing member 54Y includes, for example, a coil spring arranged around the rotational shaft 54X. The biasing member 54Y biases the pulley assembly 56 relative to the movable member 44 in the first rotational direction R1 about the rotational axis RA1.

The damping structure 58 is, for example, disposed in an inner cavity of the movable member 44. The damping structure 58 is, for example, configured to at least partially overlie the power source receiving part 50 as viewed from the base member 42 toward the movable member 44 in a state where the movable member 44 is located at the outermost shifting position SP1. The damping structure 58 is, for example, configured to at least partially overlie the power source receiving part 50 as viewed from the base member 42 toward the movable member 44 in a state where the movable member 44 is located at the innermost shifting position SP2. The power source receiving part 50 is, for example, configured to be arranged at least partially farther from the frame 10F of the human-powered vehicle 10 than the damping structure 58 in a state where the base member 42 is attached to the frame 10F and the movable member 44 is located at the outermost shifting position SP1.

Figure 11:
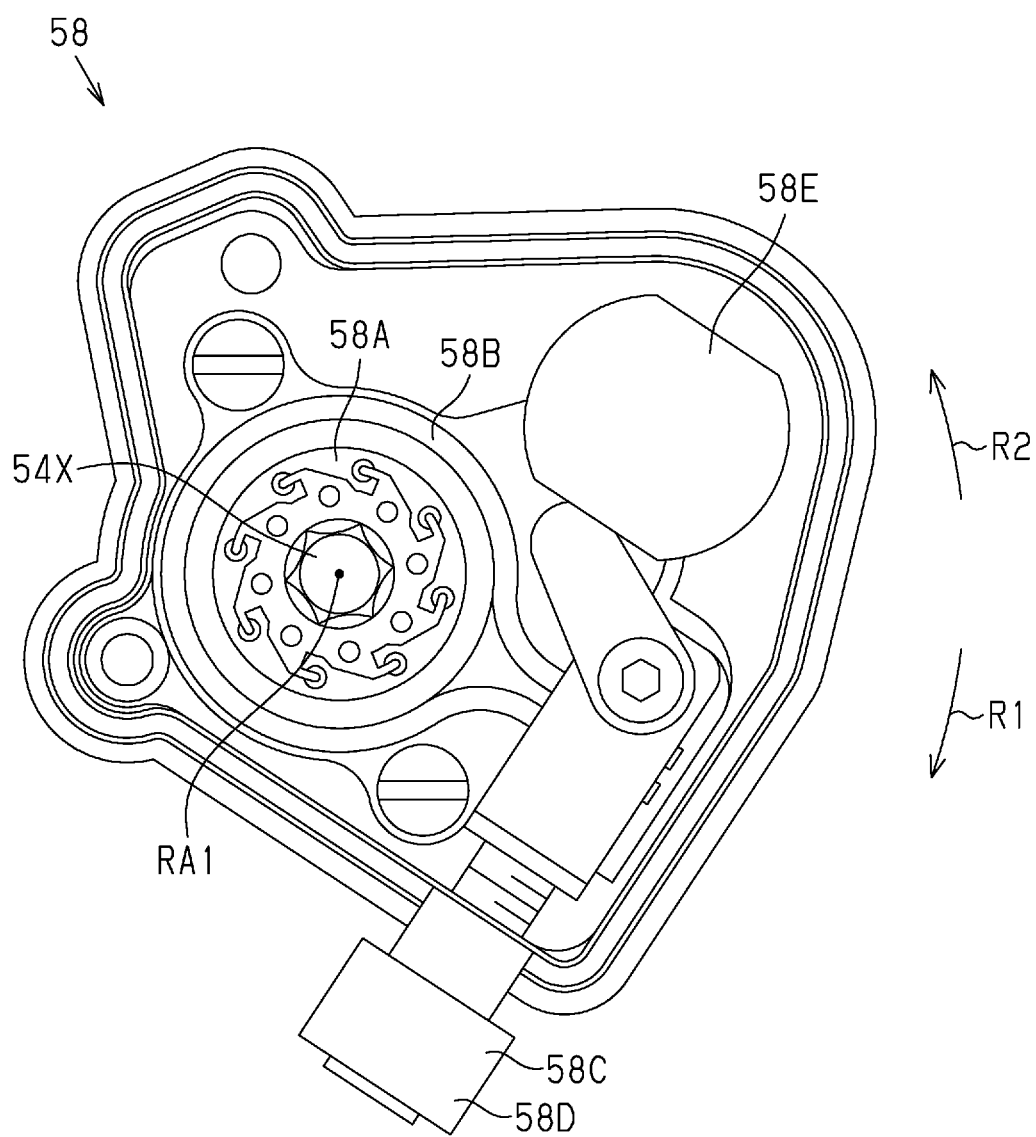
FIG. 11 is a schematic diagram of a damping structure shown in FIG. 9.

As shown in FIGS. 9 to 11, for example, the damping structure 58 is configured to friction-engage the rotational shaft 54X and apply rotational resistance force to the pulley assembly 56 when the pulley assembly 56 rotates in the second rotational direction R2. The damping structure 58 includes, for example, a one-way clutch 58A. The one-way clutch 58A is arranged between the rotational shaft 54X and the movable member 44. When the pulley assembly 56 rotates relative to the movable member 44 in the second rotational direction R2 about the rotational axis RA1, the rotational shaft 54X rotates integrally with the one-way clutch 58A. When the pulley assembly 56 rotates relative to the movable member 44 in the first rotational direction R1 about the rotational axis RA1, the rotational shaft 54X rotates relative to the one-way clutch 58A. The one-way clutch 58A includes, for example, a roller clutch.

The damping structure 58 includes, for example, a resistance-applying member 58B having the shape of a belt. The resistance-applying member 58B is arranged between the one-way clutch 58A and the movable member 44 to extend around an outer circumferential portion of the one-way clutch 58A. The resistance-applying member 58B tightens the outer circumferential portion of the one-way clutch 58A to friction-engage the one-way clutch 58A. When the pulley assembly 56 rotates in the second rotational direction R2, the rotational shaft 54X rotates integrally with the one-way clutch 58A. Thus, the resistance-applying member 58B applies rotational resistance force to the pulley assembly 56.

The damping structure 58 includes, for example, an operating portion 58C. The operating portion 58C is configured to adjust the rotational resistance force applied to the pulley assembly 56 when the pulley assembly 56 rotates in the second rotational direction R2. The power source receiving part 50 is, for example, configured to be arranged at least partially farther from the frame 10F of the human-powered vehicle 10 than the operating portion 58C in a state where the base member 42 is attached to the frame 10F and the movable member 44 is located at the outermost shifting position SP1. The power source receiving part 50 is, for example, configured to be arranged at least partially farther from the frame 10F of the human-powered vehicle 10 than the operating portion 58C in the attachment portion pivot axis BA as viewed from the base member 42 toward the movable member 44 in a state where the base member 42 is attached to the frame 10F and the movable member 44 is located at the outermost shifting position SP1.

The power source receiving part 50 is, for example, configured to be arranged entirely farther from the frame 10F of the human-powered vehicle 10 than the operating portion 58C in a state where the base member 42 is attached to the frame 10F and the movable member 44 is located at the outermost shifting position SP1. The power source receiving part 50 is, for example, configured to be arranged entirely farther from the frame 10F of the human-powered vehicle 10 than the operating portion 58C in a radial direction of the attachment portion pivot axis BA in a state where the base member 42 is attached to the frame 10F and the movable member 44 is located at the outermost shifting position SP1.

The operating portion 58C is configured to adjust rotational resistance force by tightening opposite ends of the resistance-applying member 58B. The operating portion 58C includes, for example, an adjustment screw 58D. The operating portion 58C is configured to adjust tightening force applied to opposite ends of the resistance-applying member 58B in accordance with rotation of the adjustment screw 58D.

As shown in FIG. 12, the linkage assembly 46 includes, for example, the at least one link pin 64. The at least one link pin 64 pivotally attaches the linkage assembly 46 to one of the movable member 44 and the base member 42. The at least one link member 52 includes, for example, the at least one link pin 64. The at least one link pin 64 includes, for example, a first link pin 64A, a second link pin 64B, a third link pin 64C, and a fourth link pin 64D. The first link pin 64A and the second link pin 64B pivotally attach the linkage assembly 46 to the base member 42. The third link pin 64C and the fourth link pin 64D pivotally attach the linkage assembly 46 to the movable member 44. The first link pin 64A is disposed on the linkage assembly 46 so that the axis of the first link pin 64A coincides with the first pivot axis PA1. The second link pin 64B is disposed on the linkage assembly 46 so that the axis of the second link pin 64B coincides with the second pivot axis PA2. The third link pin 64C is disposed on the linkage assembly 46 so that the axis of the third link pin 64C coincides with the third pivot axis PA3. The fourth link pin 64D is disposed on the linkage assembly 46 so that the axis of the fourth link pin 64D coincides with the fourth pivot axis PA4.

As shown in FIG. 12, for example, the derailleur 40 further includes a motor unit 66 configured to move the movable member 44 relative to the base member 42. The motor unit 66 is arranged on one of the base member 42 and the movable member 44. The motor unit 66 is, for example, arranged on the base member 42. The motor unit 66 includes an electric motor. The motor unit 66 uses the electric motor to pivot the inner link member 62 about the first pivot axis PA1 and move the movable member 44 relative to the base member 42.

Figure 2:
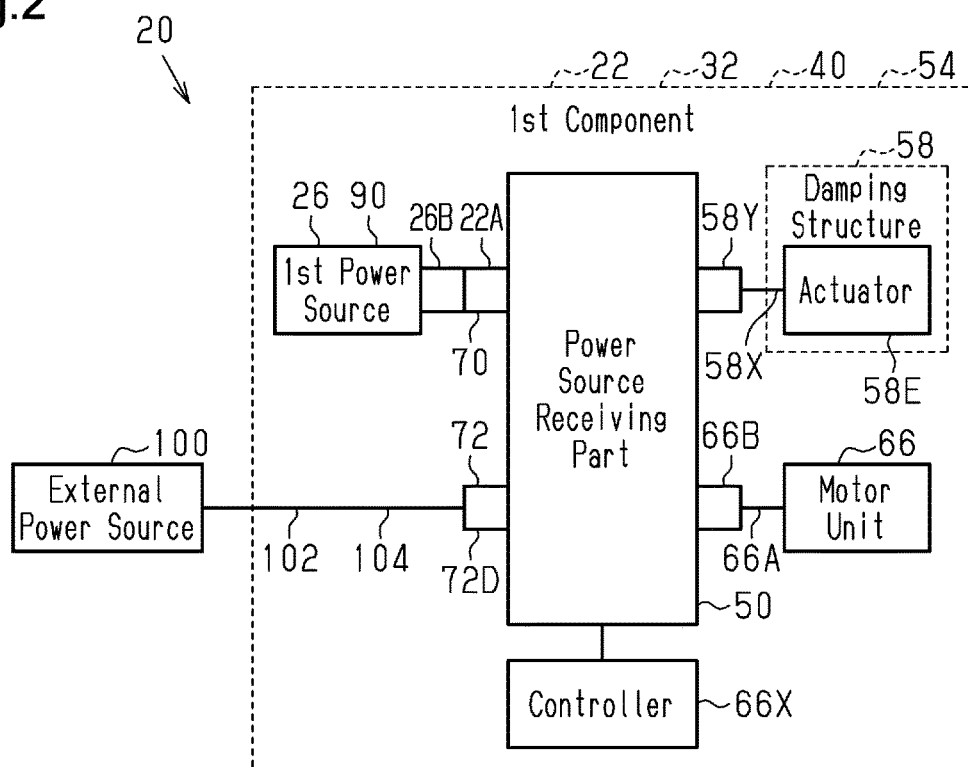
FIG. 2 is a block diagram showing the electrical configuration of the human-powered vehicle component shown in FIG. 1.

As shown in FIG. 2, for example, the derailleur 40 further includes a controller 66X electrically connected to an electric port 72 and configured to control the motor unit 66. The controller 66X includes a processor that executes a predetermined control program. The processor includes, for example, a central processing unit (CPU) or a micro processing unit (MPU). The controller 66X can include one or more microcomputers. The controller 66X can include a plurality of processors located at separate positions. The controller 66X, for example, controls the motor unit 66 to move the movable member 44 relative to the base member 42 and change the sprocket on which the chain 12 runs. The transmission ratio is changed by changing the sprocket on which the chain 12 runs.

Figure 13:
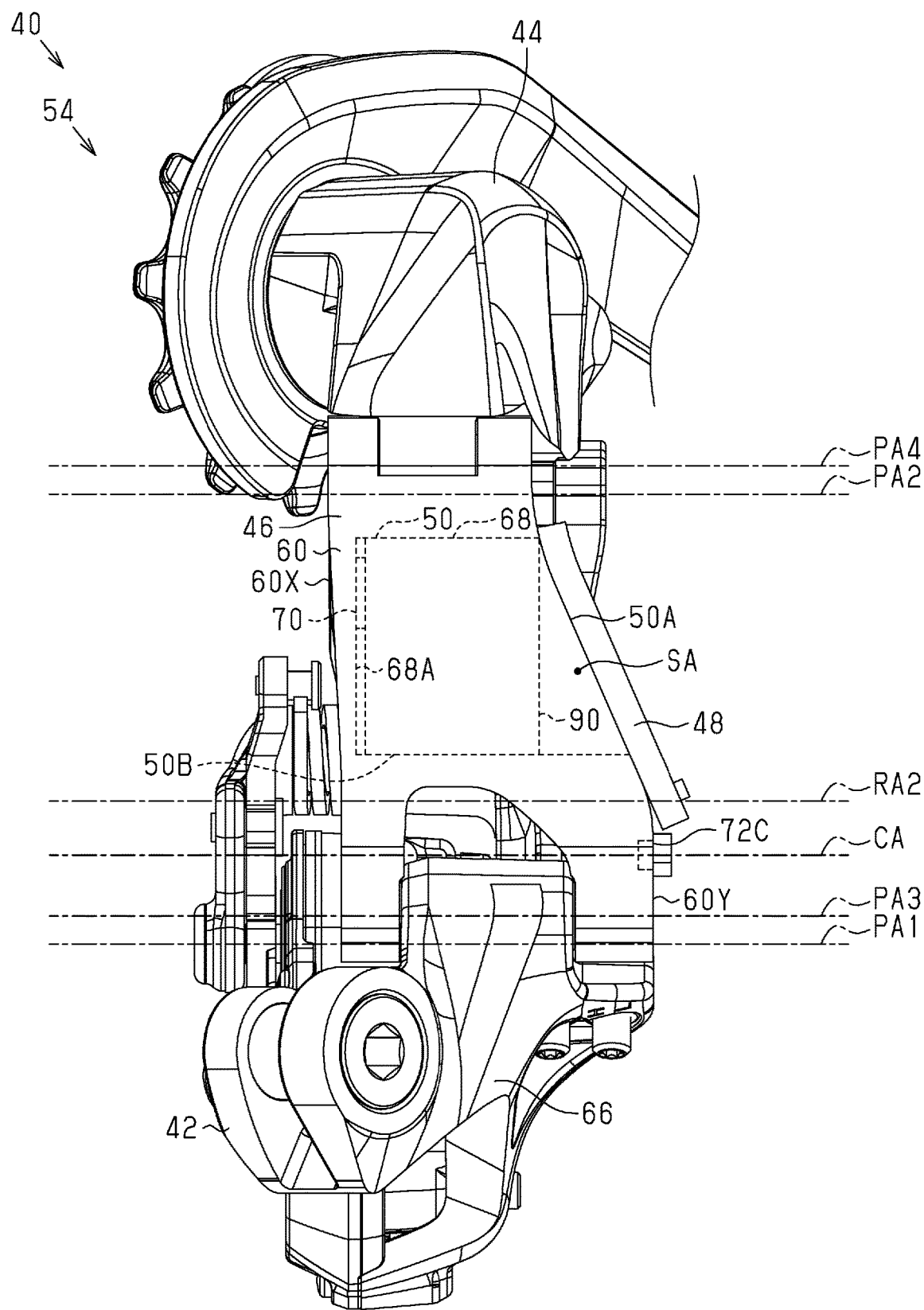
FIG. 13 is a first partial side view of the human-powered vehicle derailleur shown in FIG. 9.

As shown in FIGS. 2, 12, and 13, for example, the rear derailleur 54 further includes the motor unit 66 configured to move the movable member 44 relative to the base member 42 and an actuator 58E configured to actuate the damping structure 58. The power source receiving part 50 is, for example, configured to allow for arrangement of the power source 90. The motor unit 66 and the actuator 58E are, for example, configured to be supplied with electric power from the power source 90 arranged in the power source receiving part 50. For example, at least one of the first power source 26 and the second power source 28 can be used as the power source 90. In the present embodiment, the first power source 26 can be used as the power source 90.

The actuator 58E includes, for example, an electric motor. The actuator 58E is, for example, configured to switch an actuation mode of the damping structure 58 between a clutch-on mode and a clutch-off mode. In the clutch-on mode, when the pulley assembly 56 rotates in the second rotational direction R2, the resistance-applying member 58B applies rotational resistance force to the pulley assembly 56. In the clutch-off mode, the resistance-applying member 58B does not apply rotational resistance force to the pulley assembly 56. The damping structure 58 can be configured to rotate the adjustment screw 58D of the operating portion 58C and adjust the rotational resistance force with the actuator 58E. The controller 66X can be configured to control the actuator 58E of the damping structure 58.

The motor unit 66 is, for example, electrically connected to the power source receiving part 50 via at least one of an additional electric cable 66A and an electric terminal 66B. The motor unit 66 is, for example, electrically connected to the power source receiving part 50 via the additional electric cable 66A and the electric terminal 66B. The damping structure 58 is, for example, electrically connected to the power source receiving part 50 via at least one of a damper electric cable 58X and a damper electric cable 58Y. The damping structure 58 is, for example, electrically connected to the power source receiving part 50 via the damper electric cable 58X and the damper electric cable 58Y.

Figure 14:
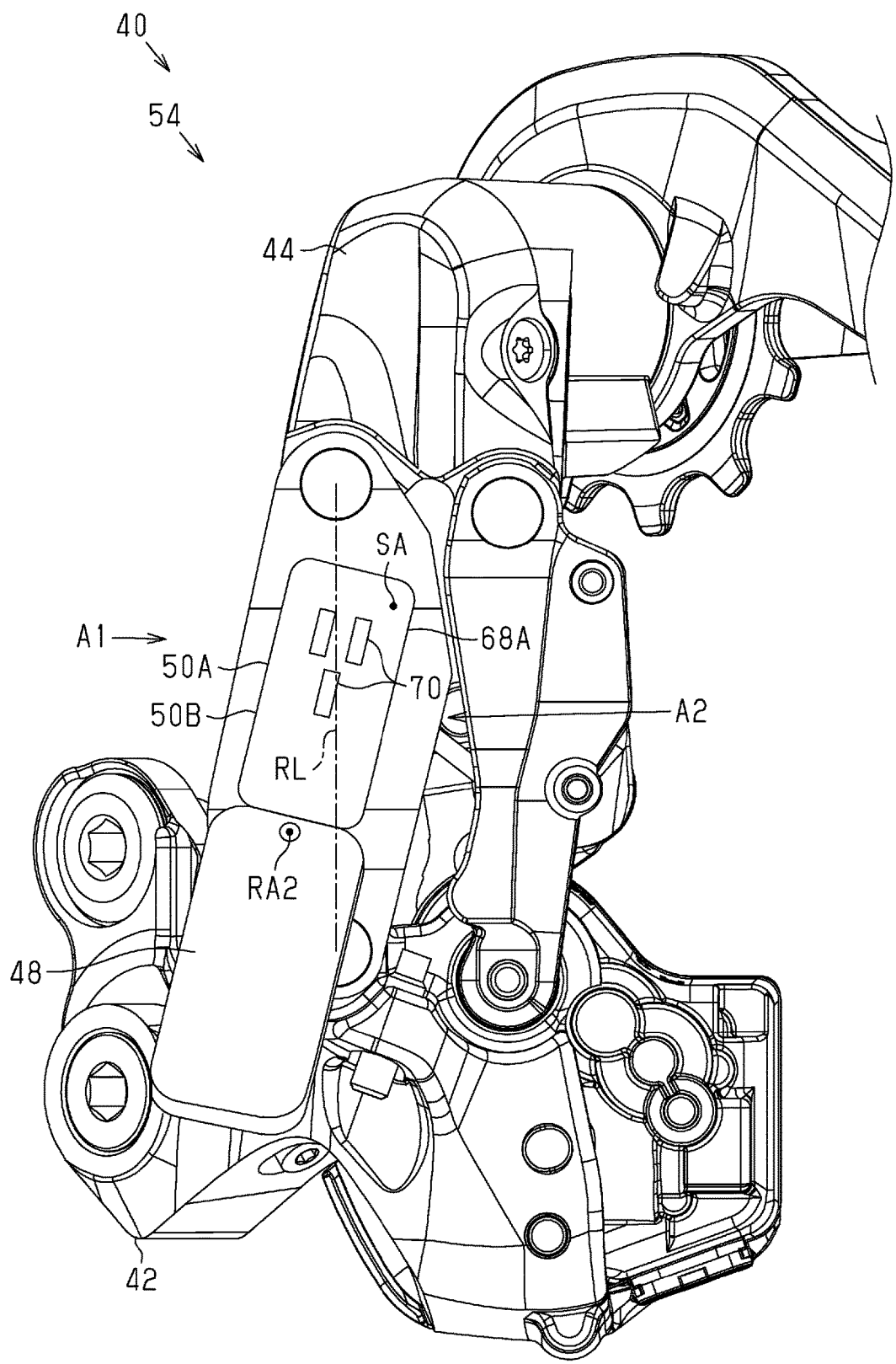
FIG. 14 is a second partial plan view of the human-powered vehicle derailleur shown in FIG. 9.

As shown in FIGS. 12 to 14, for example, the power source receiving part 50 is disposed on one of the outer link member 60 and the inner link member 62. The power source receiving part 50 is, for example, disposed on the outer link member 60. The power source receiving part 50 is, for example, formed integrally with the outer link member 60. The power source receiving part 50 includes, for example, a recess provided in a lower surface of the outer link member 60.

The power source receiving part 50 includes, for example, an accommodation portion 68 configured to at least partially accommodate the power source 90. The power source receiving part 50 is, for example, configured to entirely accommodate the power source 90. The power source receiving part 50 includes, for example, the accommodation portion 68 configured to accommodate the power source 90. The accommodation portion 68 includes, for example, a recess provided in the outer link member 60. The first attachment 22B of the first component 22 includes, for example, the accommodation portion 68.

The accommodation portion 68 includes an accommodation cavity SA configured to accommodate the power source 90. The accommodation cavity SA is, for example, configured to entirely accommodate the power source 90. The accommodation cavity SA is shaped in accordance with the shape of the power source 90. The shape of the power source 90 is, for example, identical to the first housing shape. As long as the accommodation cavity SA is configured to accommodate the power source 90, the accommodation cavity SA does not have to entirely accommodate the power source 90. The accommodation cavity SA can be open to the exterior in a state where the power source 90 is accommodated.

The linkage assembly 46 includes, for example, the at least one link pin 64. The at least one link pin 64, for example, pivotally attaches the linkage assembly 46 to one of the movable member 44 and the base member 42. The outer link member 60 includes, for example, a first end 60X and a second end 60Y. The second end 60Y is, for example, separated from the first end 60X in an axial direction of the at least one link pin 64. The power source receiving part 50 includes, for example, an open portion 50A through which the power source 90 is inserted into the accommodation portion 68. The open portion 50A is, for example, located closer to one of the first end 60X and the second end 60Y than the other one of the first end 60X and the second end 60Y in the axial direction of the at least one link pin 64. The first component recess 22X of the first component 22 includes, for example, the open portion 50A.

The open portion 50A is disposed on an end of the accommodation portion 68 so that the power source 90 is accommodated in the accommodation cavity SA. In a state where the derailleur 40 is located so that the axial direction of the at least one link pin 64 is parallel to a vertical direction, a direction extending from the first end 60X toward the second end 60Y conforms to a vertically downward direction. In a state where the derailleur 40 is located so that the axial direction of the at least one link pin 64 extends parallel to a vertical direction, a direction extending from the second end 60Y toward the first end 60X conforms to a vertically upward direction. The open portion 50A is located closer to the second end 60Y of the outer link member 60 than the first end 60X of the outer link member 60 in the axial direction of the at least one link pin 64.

The derailleur 40, for example, further includes a connection terminal 70. The connection terminal 70 is, for example, disposed on the power source receiving part 50 and electrically connectable to the power source 90. The connection terminal 70 includes the first component electric terminal 22A of the first component 22. In the present embodiment, the connection terminal 70 is disposed on an open portion facing surface 68A located in the accommodation cavity SA. The open portion facing surface 68A is a surface of the recess defining the accommodation cavity SA facing the open portion 50A. The connection terminal 70 can be disposed on a surface different from the open portion facing surface 68A located in the accommodation cavity SA.

The derailleur 40, for example, further includes the cover member 48. The cover member 48, for example, at least partially covers the power source receiving part 50. The rear derailleur 54, for example, further includes the cover member 48. The cover member 48, for example, at least partially covers the power source receiving part 50. The cover member 48 is, for example, rotatably disposed on the at least one link member 52. The cover member 48 is, for example, configured to at least partially cover the accommodation portion 68. The cover member 48 is, for example, configured to cover the open portion 50A. The cover member 48 can be configured to at least partially cover the open portion 50A to restrict movement of the power source 90 relative to the power source receiving part 50.

The cover member 48 is, for example, coupled to the linkage assembly 46. The cover member 48 is, for example, coupled to the outer link member 60. The cover member 48 is, for example, pivotally attached to the outer link member

60. The cover member 48 is, for example, located closer to one of the first end 60X and the second end 60Y than the other one of the first end 60X and the second end 60Y. In the present embodiment, the cover member 48 is located closer to the second end 60Y of the outer link member 60 than the first end 60X of the outer link member 60 in the axial direction of the at least one link pin 64.

In the present embodiment, the cover member 48 is arranged on the linkage assembly 46 so that a rotational axis RA2 of the cover member 48 is inclined at an angle of less than 45 degrees relative to an axis of the at least one link pin 64. The cover member 48 is, for example, arranged on the linkage assembly 46 so that the rotational axis RA2 is parallel to the first pivot axis PA1, the second pivot axis PA2, the third pivot axis PA3, and the fourth pivot axis PA4. The cover member 48 is rotated about the rotational axis RA2 to switch between a cover attachment state shown in FIG. 12 and a cover detachment state shown in FIG. 14. In the cover attachment state, the cover member 48 at least partially covers the power source receiving part 50. In the cover detachment state, the cover member 48 does not cover the power source receiving part 50.

The derailleur 40, for example, further includes a pivot mechanism 40X. The pivot mechanism 40X pivotally attaches the cover member 48 to the linkage assembly 46. The pivot mechanism 40X is located closer to one of the first end 60X and the second end 60Y than the other one of the first end 60X and the second end 60Y. The pivot mechanism 40X is disposed closer to the one of the first end 60X and the second end 60Y that is located closer to the cover member 48 in the axial direction of the at least one link pin 64. In the present embodiment, the pivot mechanism 40X is located closer to the second end 60Y of the outer link member 60 than the first end 60X of the outer link member 60 in the axial direction of the at least one link pin 64.

The pivot mechanism 40X includes, for example, a hinge structure. For example, the pivot mechanism 40X includes a pivot shaft 40XA, the axis of which coincides with the rotational axis RA2 of the cover member 48. The hinge structure is configured to pivot the cover member 48 relative to the linkage assembly 46 about the pivot shaft 40XA. In the present embodiment, the pivot shaft 40XA is disposed parallel to the at least one link pin 64. The cover member 48 is coupled to the outer link member 60 via the pivot shaft 40XA.

As shown in FIGS. 12 and 14, for example, the cover member 48 includes a first end 48X and a second end 48Y. The first end 48X rotatably couples the cover member 48 to the at least one link member 52. The second end 48Y is attachable to and detachable from the at least one link member 52 in a state where the cover member 48 is rotatably coupled to the at least one link member 52. The second end 48Y is, for example, configured to be arranged closer to the damping structure 58 than the first end 48X in a state where the cover member 48 is coupled to the at least one link member 52.

Figure 16:
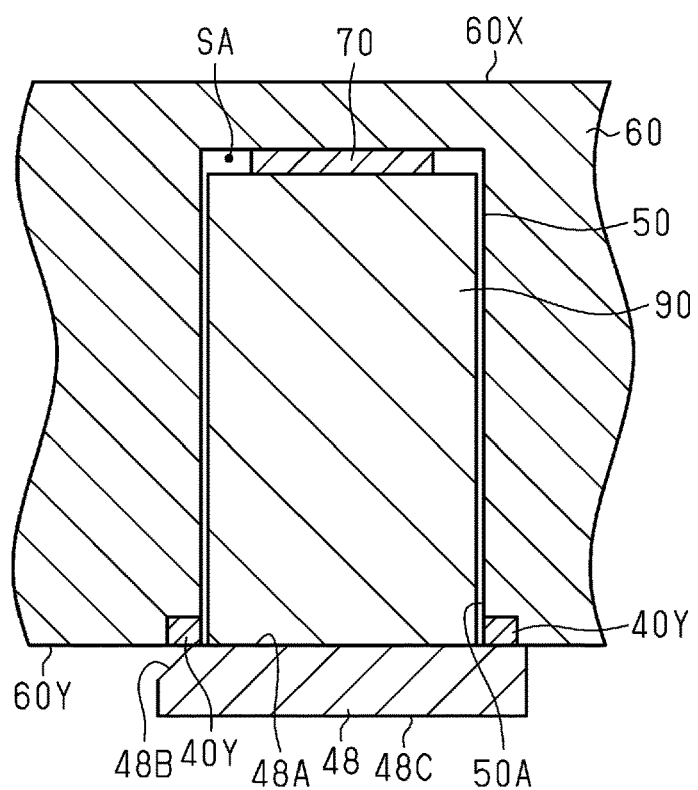
FIG. 16 is a cross-sectional view of part of an outer link member and a power source in a cover attachment state shown in FIG. 9.

The cover member 48 is, for example, detachably attached to the outer link member 60. In the present embodiment of the cover member 48, the second end 48Y is detachably attached to the outer link member 60. For example, in the cover member 48, the first end 48X is attached to the outer link member 60 in an undetachable manner. For example, in the cover member 48, the first end 48X is attached to the outer link member 60 in an undetachable manner by the pivot mechanism 40X. The cover member 48 is configured to define part of the accommodation cavity SA when the second end 48Y is attached to the outer link member 60. The cover member 48 is configured to pivot about the rotational axis RA2 of the cover member 48 when the second end 48Y is detached from the outer link member 60, In the present embodiment of the cover member 48, the second end 48Y is attached to the outer link member 60 in a separable manner. For example, in the cover member 48, the first end 48X is attached to the outer link member 60 in a non-separable manner. For example, in the cover member 48, the first end 48X is attached to the outer link member 60 by the pivot mechanism 40X in a non-separable manner. The cover member 48 is configured to define part of the accommodation cavity SA when the second end 48Y is attached to the outer link member 60. The cover member 48 is configured to pivot about the rotational axis RA2 of the cover member 48 when the second end 48Y is separated from the outer link member 60, The cover member 48 is, for example, press-fitted in a detachable manner to the outer link member 60. The second end 48Y of the cover member 48 is press-fitted to the outer link member 60, so that the second end 48Y is attached to the outer link member 60. For example, the cover member 48 is formed of a flexible member so that the second end 48Y is configured to be partially deformed and press-fitted to the open portion 50A. As shown in FIG. 16, a flexible seal 40Y is provided on the open portion 50A. The seal 40Y deforms in accordance with the shape of part of the second end 48Y, so that the second end 48Y is partially press-fitted to the open portion 50A.

The derailleur 40, for example, further includes a power source holder 50B including an electric terminal and arrangeable in the power source receiving part 50. The power source holder 50B is, for example, configured to traverse a reference line RL in a state arranged in the power source receiving part 50. The electric terminal of the power source holder 50B includes the connection terminal 70. The power source holder 50B is, for example, configured to traverse the reference line RL in a state arranged in the power source receiving part 50 as viewed in a direction parallel to at least one of the third pivot axis PA3 and the fourth pivot axis PA4. The power source holder 50B defines the accommodation cavity SA together with the cover member 48. The portion of the power source holder 50B located in a first region A1 is, for example, larger than the portion of the power source holder 50B located in a second region A2. The electric terminal of the power source receiving part 50 is, for example, configured to traverse the reference line RL. In FIG. 14, in the electric terminal of the power source receiving part 50, the connection terminal 70 traverses the reference line RL.

As shown in FIGS. 2, 9, and 12, for example, the derailleur 40 includes the base member 42, the movable member 44, the linkage assembly 46, and the electric port 72. The base member 42 is, for example, configured to be attached to the frame 10F of the human-powered vehicle 10. The movable member 44 is, for example, movably arranged relative to the base member 42. The linkage assembly 46, for example, connects the movable member 44 to the base member 42. The linkage assembly 46 includes, for example, a power source receiving part 50. The electric port 72 is, for example, configured to be electrically connected to the power source receiving part 50, configured to detachably receive a cable 102, and is arranged in at least one of the linkage assembly 46 and the movable member 44.

The linkage assembly 46 includes, for example, the outer link member 60 and the inner link member 62. The outer link member 60 at least partially overlies the inner link member 62 as viewed in a direction facing toward the frame 10F in a state where the base member 42 is attached to the frame 10F. The power source receiving part 50 is, for example, disposed on the outer link member 60. The electric port 72 is, for example, arranged on one of the outer link member 60 and the movable member 44. The motor unit 66 is, for example, arranged on the base member 42. In the present embodiment, the electric port 72 is arranged on the outer link member 60.

The electric port 72 includes, for example, a lid 72A. The lid 72A is, for example, configured to cover the electric port 72 in a cable-disconnected state where the cable 102 is disconnected from the electric port 72. The lid 72A is, for example, configured to be detachably attached to the electric port 72 so as not to cover the electric port 72 in a cable-connected state where the cable 102 is connected to the electric port 72. The lid 72A is, for example, configured to be press-fitted to the electric port 72. For example, the lid 72A is formed by a flexible member so that the lid 72A is configured to be partially deformed and press-fitted to the electric port 72.

The electric port 72 includes, for example, a cable receiving portion 72B. The cable receiving portion 72B includes, for example, a cable receiving opening 72C. The cable receiving opening 72C includes, for example, a cable receiving opening axis CA. The cable 102 is coupled to the cable receiving portion 72B. A terminal for connection with the cable 102 is provided in the cable receiving opening 72C. The cable 102 is removed from the cable receiving opening 72C in a direction parallel to the cable receiving opening axis CA.

The cable receiving opening 72C is arranged in one of the first end 60X of the outer link member 60 and the second end 60Y of the outer link member 60 in a direction parallel to the at least one link pin 64. In the present embodiment, the cable receiving opening 72C is arranged in the second end 60Y of the outer link member 60.

In a case where the cable receiving opening 72C is arranged in the first end 60X of the outer link member 60, the cable receiving opening 72C is open toward an upper side of the outer link member 60. The upper side of the outer link member 60 conforms to, for example, an upper side of the human-powered vehicle 10 in a state where the derailleur 40 is coupled to the human-powered vehicle 10 and the derailleur 40 is in a predetermined state. The case where the derailleur 40 is in the predetermined state includes, for example, a case where the movable member 44 is located at the outermost shifting position SP1, the innermost shifting position SP2, or a predetermined position between the outermost shifting position SP1 and the innermost shifting position SP2. The upper side of the outer link member 60 refers to, for example, a direction extending from the second end 60Y toward the first end 60X in a state where the derailleur 40 is located so that the axial direction of the at least one link pin 64 is parallel to a vertical direction.

In a case where the cable receiving opening 72C is arranged in the second end 60Y of the outer link member 60, the cable receiving opening 72C is open toward a lower side of the outer link member 60. The lower side of the outer link member 60 conforms to, for example, a lower side of the human-powered vehicle 10 in a state where the derailleur 40 is coupled to the human-powered vehicle 10 and the derailleur 40 is in a predetermined state. The lower side of the outer link member 60 refers to, for example, a direction extending from the first end 60X toward the second end 60Y in a state where the derailleur 40 is located so that the axial direction of the at least one link pin 64 is parallel to a vertical direction.

The linkage assembly 46 includes, for example, the at least one link pin 64. The at least one link pin 64 pivotally attaches the linkage assembly 46 to one of the movable member 44 and the base member 42. The electric port 72 is arranged on the linkage assembly 46. The cable receiving opening axis CA is, for example, parallel to the axis of the at least one link pin 64. The cable receiving opening axis CA is, for example, parallel to the first pivot axis PA1, the second pivot axis PA2, the third pivot axis PA3, and the fourth pivot axis PA4.

As shown in FIGS. 2 and 13, for example, the cable 102 is configured to be detachably coupled to the electric port 72. The cable 102 is, for example, an electric cable 104. The electric port 72 is, for example, used to perform at least one of charging of the power source 90, wired communication with a component 14 that differs from the derailleur 40, and wired communication with an external device 106. The electric port 72 is, for example, used to perform at least charging of the power source 90. For example, in a case where a power source 90 that is arranged on the power source receiving part 50 is a rechargeable battery, the electric port 72 is used to perform charging of the power source 90 arranged on the power source receiving part 50.

The electric port 72 can be configured to be supplied with electric power from a power source arranged on the component 14 differing from the derailleur 40. The electric port 72 is, for example, configured to supply the motor unit 66 with electric power supplied from the power source arranged on the component 14 differing from the derailleur 40. The electric port 72 can be configured to supply the motor unit 66 with electric power supplied from the power source arranged on the component 14 differing from the derailleur 40 in a case where the power source 90 is not arranged on the power source receiving part 50. The electric port 72 can be configured to supply the motor unit 66 with electric power supplied from the power source arranged on the component 14 differing from the derailleur 40 in a case where the voltage of the power source 90 is less than or equal to a predetermined value.

The electric port 72 includes, for example, a power receiving portion 72D. The power receiving portion 72D is configured to receive electric power from an external power source 100. The electric port 72 is configured to supply the motor unit 66 with the electric power received by the power receiving portion 72D. The electric port 72 is, for example, configured to be electrically connected to the motor unit 66 via the power source receiving part 50. The power receiving portion 72D is, for example, configured to regulate voltage of the electric power received by the power receiving portion 72D. The power receiving portion 72D includes, for example, a voltage regulator. The power receiving portion 72D is, for example, configured to decrease the voltage of electric power received by the power receiving portion 72D in accordance with the electric properties of the power source 90 and the electric properties of the motor unit 66.

As shown in FIGS. 9, 12, and 13, for example, the derailleur 40 includes the base member 42, the movable member 44, and the linkage assembly 46. The base member 42 is, for example, configured to be attached to the frame 10F of the human-powered vehicle 10. The base member 42 includes, for example, a first base member connecting section 42A and a second base member connecting section 42B. The movable member 44 is, for example, movably arranged relative to the base member 42. The movable member 44 includes, for example, a first movable member connecting section 44A and a second movable member connecting section 44B. The linkage assembly 46, for example, movably connects the base member 42 and the movable member 44. The linkage assembly 46 includes, for example, the outer link member 60 and the inner link member 62. The inner link member 62 has, for example, a first inner link end portion 62A and a second inner link end portion 62B. The outer link member 60, for example, at least partially overlies the inner link member 62 as viewed in a direction facing toward the frame 10F in a state where the base member 42 is attached to the frame 10F.

The outer link member 60 includes, for example, the power source receiving part 50, a first outer link end 60A, and a second outer link end 60B. The first inner link end portion 62A is, for example, pivotally coupled to the first base member connecting section 42A about the first pivot axis PA1. The second inner link end portion 62B is, for example, pivotally coupled to the first movable member connecting section 44A about the second pivot axis PA2. The first outer link end portion 60A is, for example, pivotally coupled to the second base member connecting section 42B about the third pivot axis PA3. The second outer link end portion 60B is, for example, pivotally coupled to the second movable member connecting section 44B about the fourth pivot axis PA4. The power source receiving part 50 is, for example, configured to be arranged such that the power source receiving part 50 traverses the reference line RL extending between the third pivot axis PA3 and the fourth pivot axis PA4.

The power source receiving part 50 is, for example, configured to be arranged such that the power source receiving part 50 traverses the reference line RL extending between the third pivot axis PA3 and the fourth pivot axis PA4 as viewed in a direction parallel to at least one of the third pivot axis PA3 and the fourth pivot axis PA4. The reference line RL is, for example, a straight line extending between the third pivot axis PA3 and the fourth pivot axis PA4.

For example, as viewed in a direction parallel to at least one of the third pivot axis PA3 and the fourth pivot axis PA4, the first region A1 and the second region A2 are defined. The first region A1 includes, for example, one of the regions divided by the reference line RL as viewed in a direction parallel to at least one of the third pivot axis PA3 and the fourth pivot axis PA4. The second region A2 includes, for example, the other one of the regions divided by the reference line RL as viewed in a direction parallel to at least one of the third pivot axis PA3 and the fourth pivot axis PA4. The power source receiving part 50 includes, for example, a portion located in the second region A2 and a portion located in the first region A1 that is larger than the portion located in the second region A2. The first region A1 and the second region A2 are, for example, defined on the lower surface of the outer link member 60. The first region A1 is located farther from the inner link member 62 than the second region A2 as viewed in a direction parallel to at least one of the third pivot axis PA3 and the fourth pivot axis PA4.

The cover member 48 is, for example, configured to traverse the reference line RL in the cover attachment state where the cover member 48 at least partially covers the power source receiving part 50. The cover member 48 is, for example, configured to traverse the reference line RL in the cover attachment state as viewed in a direction parallel to at least one of the third pivot axis PA3 and the fourth pivot axis PA4. The portion of the cover member 48 located in the first region A1 is, for example, larger than the portion of the cover member 48 located in the second region A2.

Figure 15:
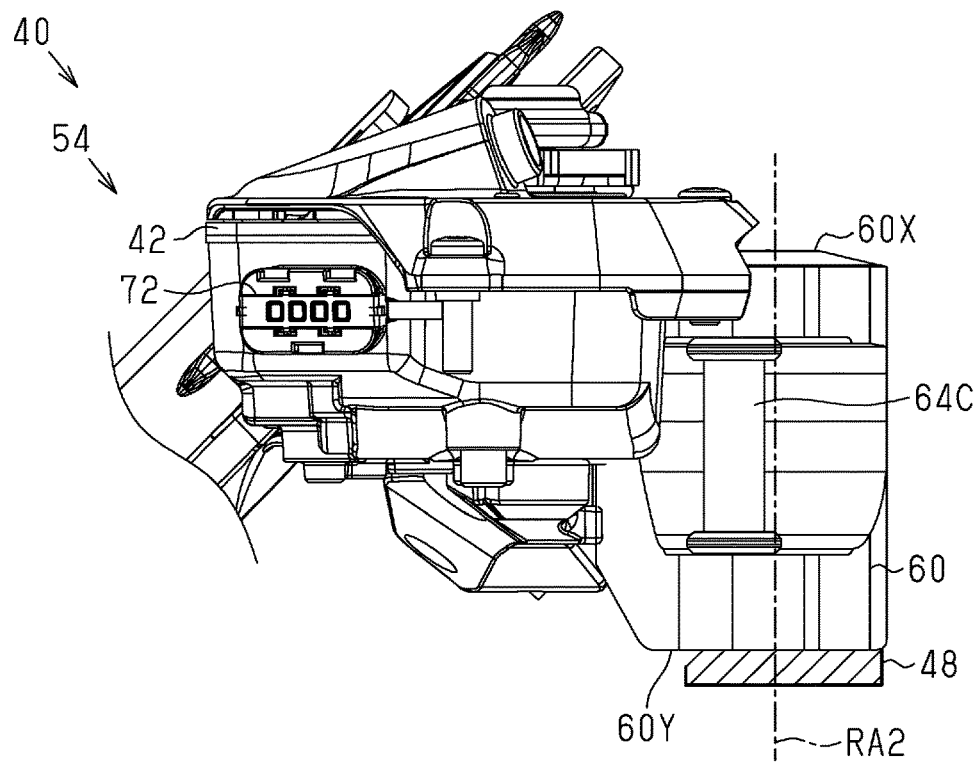
FIG. 15 is a second partial side view of the human-powered vehicle derailleur shown in FIG. 9.
Figure 17:
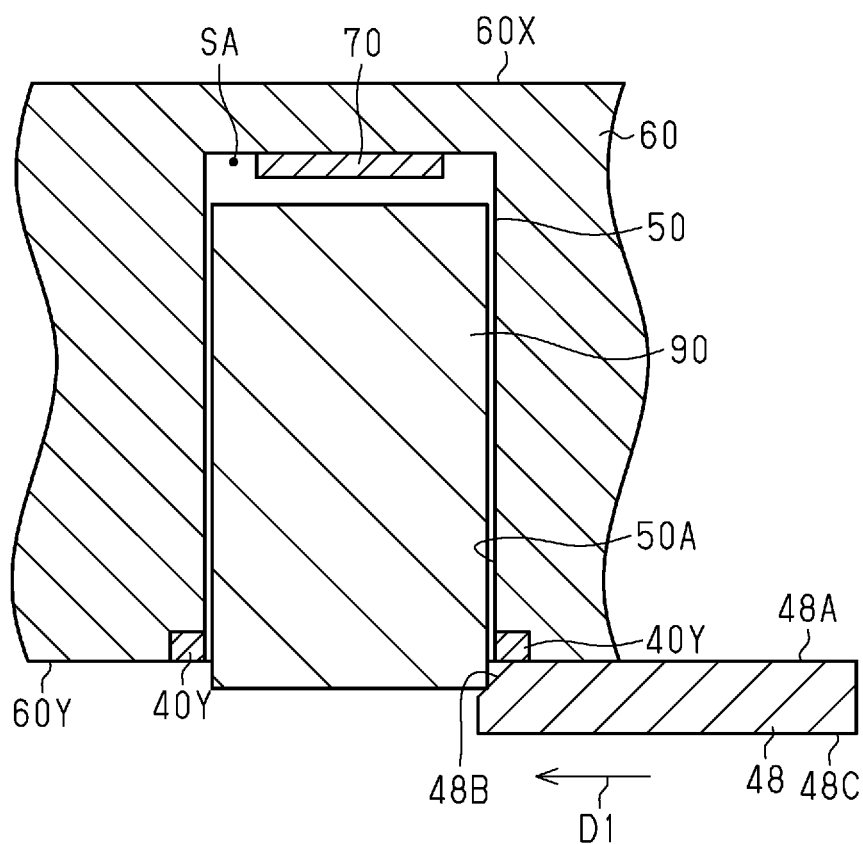
FIG. 17 is a cross-sectional view of part of the outer link member and the power source in a cover detachment state shown in FIG. 9.

As shown in FIGS. 15 to 17, the cover member 48 includes, for example, a first power source contact surface 48A and a second power source contact surface 48B. The first power source contact surface 48A is, for example, configured to contact the power source 90 in a holding state where the power source 90 is held in the power source receiving part 50. The second power source contact surface 48B is, for example, configured to contact the power source 90 when an operation for accommodating the power source 90 in the power source receiving part 50 is being performed. The second power source contact surface 48B includes, for example, an inclined surface inclined relative to the first power source contact surface 48A. The first power source contact surface 48A is configured to abut the second power source contact surface 48B. The cover member 48, for example, further includes a power source non-contact surface 48C that does not contact with the power source 90 in the holding state and when an operation for accommodating the power source 90 in the power source receiving part 50 is being performed.

As shown in FIG. 16, the holding state is the cover attachment state. In the holding state, the first power source contact surface 48A covers the open portion 50A to define part of the accommodation cavity SA. In the holding state, for example, the first power source contact surface 48A contacts the power source 90 so that the power source 90 contacts the connection terminal 70. In the holding state, for example, the second power source contact surface 48B is configured to face the second end 60Y of the outer link member 60.

As shown in FIG. 17, in the cover detachment state, in a case where the power source 90 is accommodated in the power source receiving part 50, the power source 90 acts to move downward from the open portion 50A. When the cover member 48 is switched from the cover detachment state to the cover attachment state, the second power source contact surface 48B comes into contact with an end of the power source 90. Movement of the cover member 48 in a first direction D1 moves the power source 90 upward relative to the outer link member 60 along the inclined surface of the second power source contact surface 48B and brings the power source 90 into contact with the connection terminal 70.

As shown in FIG. 16, for example, the derailleur 40 further includes the seal 40Y. The seal 40Y is, for example, a member for sealing the gap between the open portion 50A and the cover member 48 in a state where the cover member 48 at least partially covers the open portion 50A. The seal 40Y is, for example, mounted on an edge of the open portion 50A. The seal 40Y can be mounted on the cover member 48. The seal 40Y can be mounted on both the edge of the open portion 50A and the cover member 48.

A second embodiment of a rear derailleur 54 will now be described with reference to FIGS. 18 to 20. The rear derailleur 54 of the second embodiment is the same as the human-powered vehicle rear derailleur 54 of the first embodiment except that the rotational axis RA2 of the cover member 48 is inclined at an angle of greater than or equal to 45 degrees relative to the axis of the at least one link pin 64. Same reference characters are given to those components that are the same as the corresponding components of the first embodiment. Such components will not be described in detail.

Figure 18:
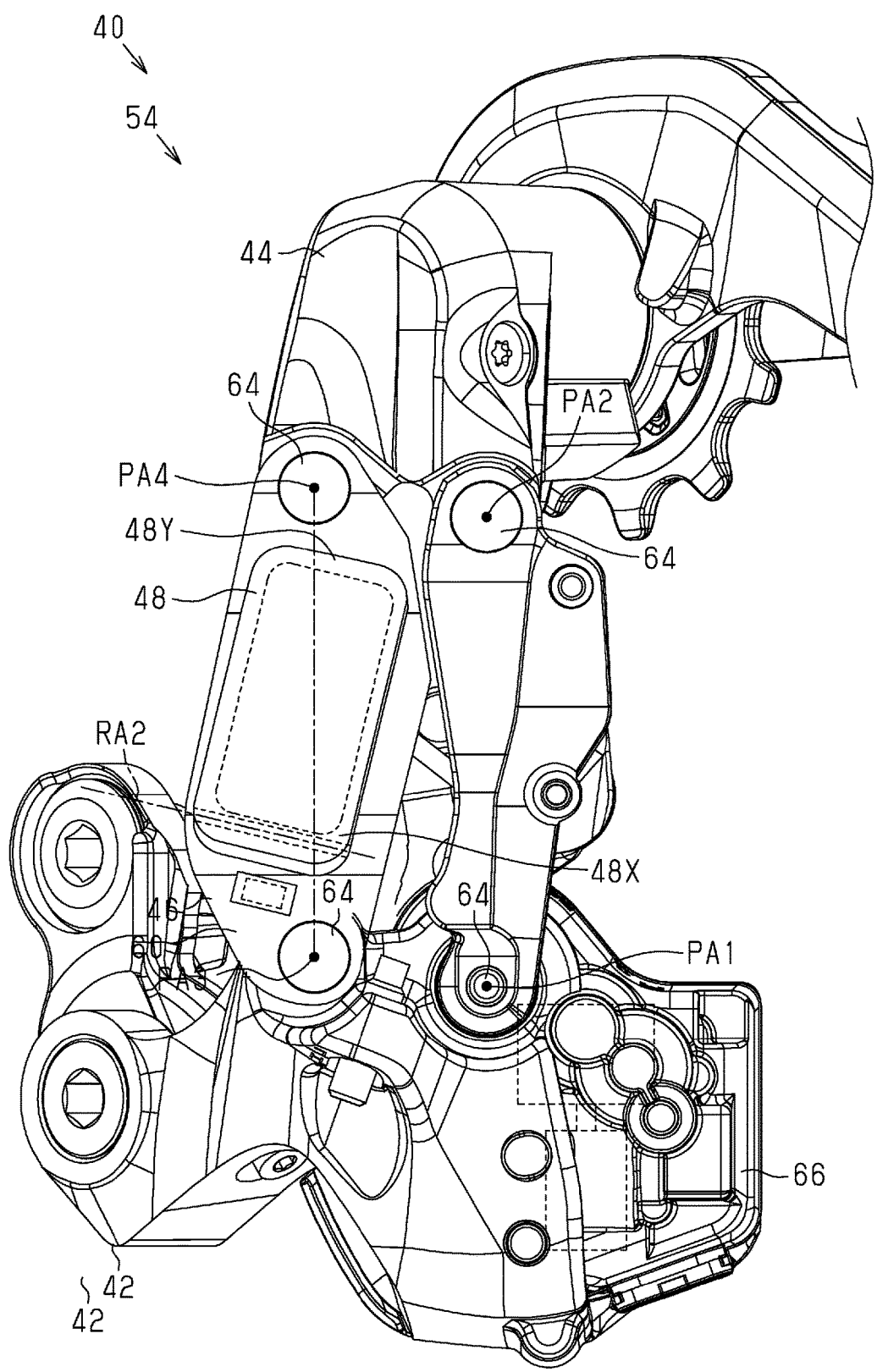
FIG. 18 is a partial plan view showing a second embodiment of a human-powered vehicle derailleur.
Figure 19:
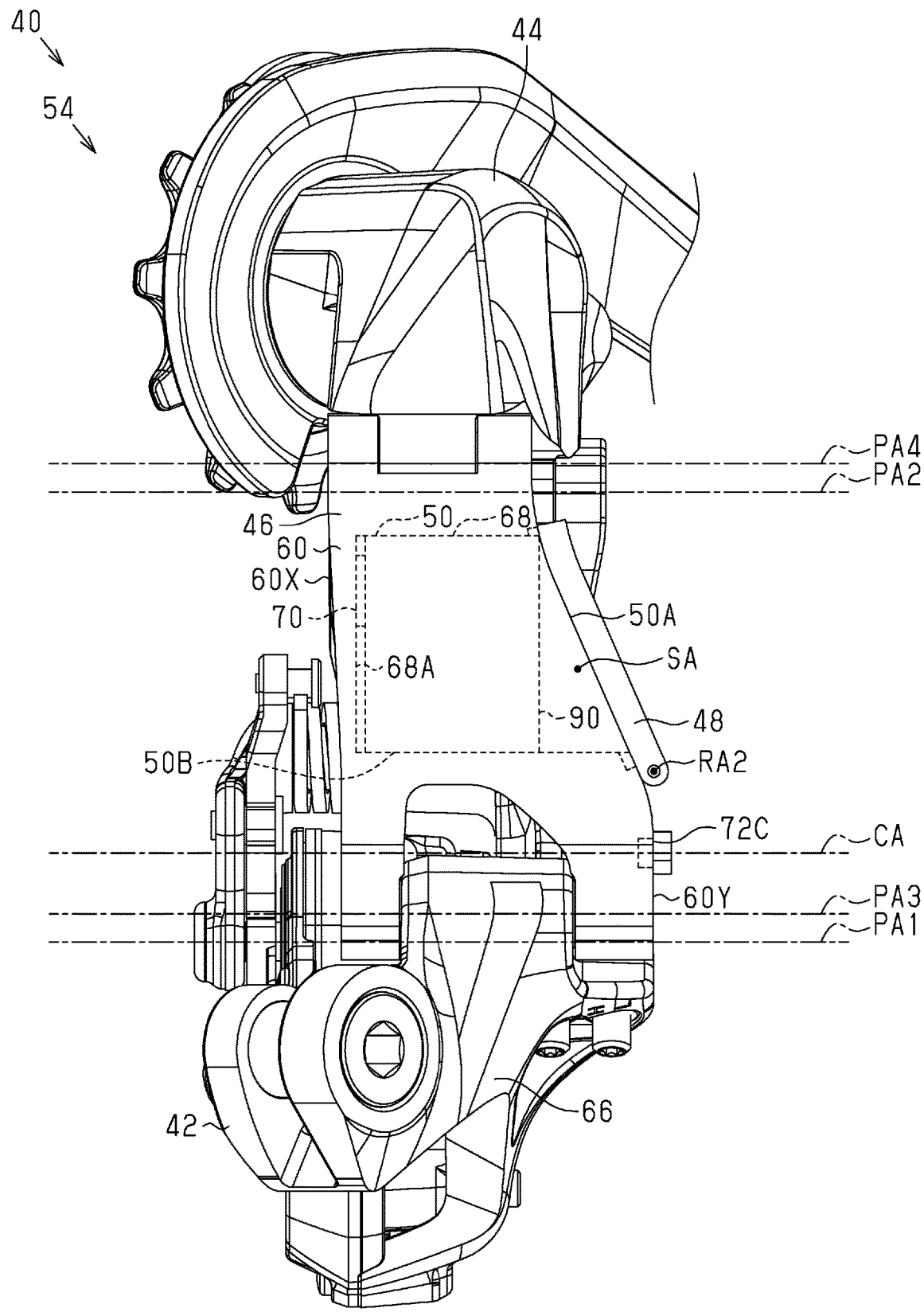
FIG. 19 is a partial side view of the human-powered vehicle derailleur shown in FIG. 18 in a cover attachment state.

As shown in FIGS. 18 and 19, in the present embodiment, the cover member 48 is arranged on the linkage assembly 46 so that the rotational axis RA2 is inclined at an angle of greater than or equal to 45 degrees relative to the axis of the at least one link pin 64. The cover member 48 is arranged on the linkage assembly 46, for example, so that the rotational axis RA2 extends orthogonal to the axis of the at least one link pin 64. The cover member 48 is arranged on the linkage assembly 46, for example, so that the rotational axis RA2 extends orthogonal to the first pivot axis PA1, the second pivot axis PA2, the third pivot axis PA3, and the fourth pivot axis PA4. The pivot shaft 40XA of the pivot mechanism 40X is, for example, disposed orthogonal to the at least one link pin 64.

Figure 20:
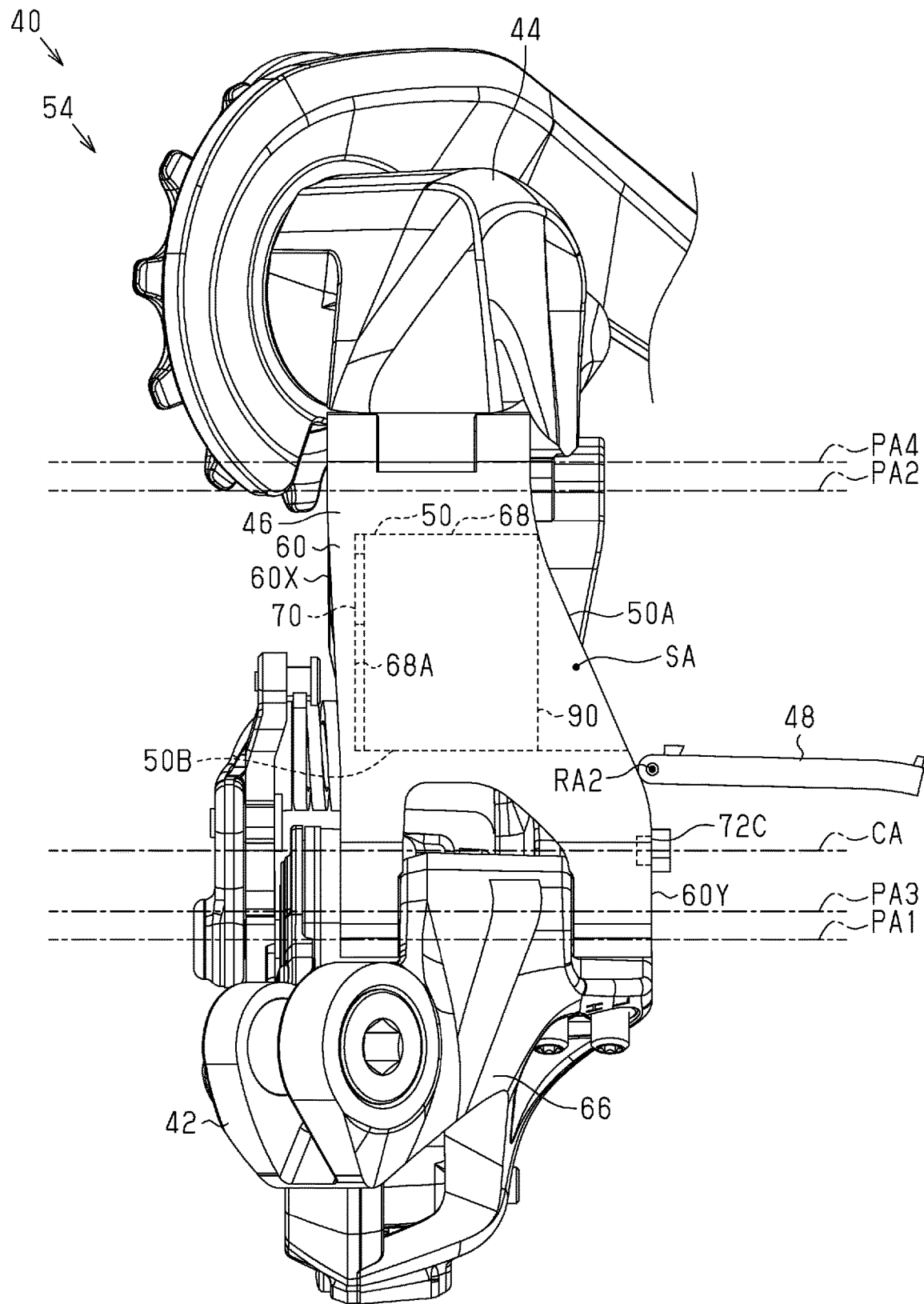
FIG. 20 is a partial side view of the human-powered vehicle derailleur shown in FIG. 18 in a cover detachment state.

As shown in FIG. 20, in the present embodiment, the cover member 48 is rotated downward about the rotational axis RA2, so that the second end 48Y is detached from the outer link member 60. The cover member 48 is rotated about the rotational axis RA2 to switch between a cover attachment state shown in FIG. 19 and a cover detachment state shown in FIG. 20.

Figure 21:
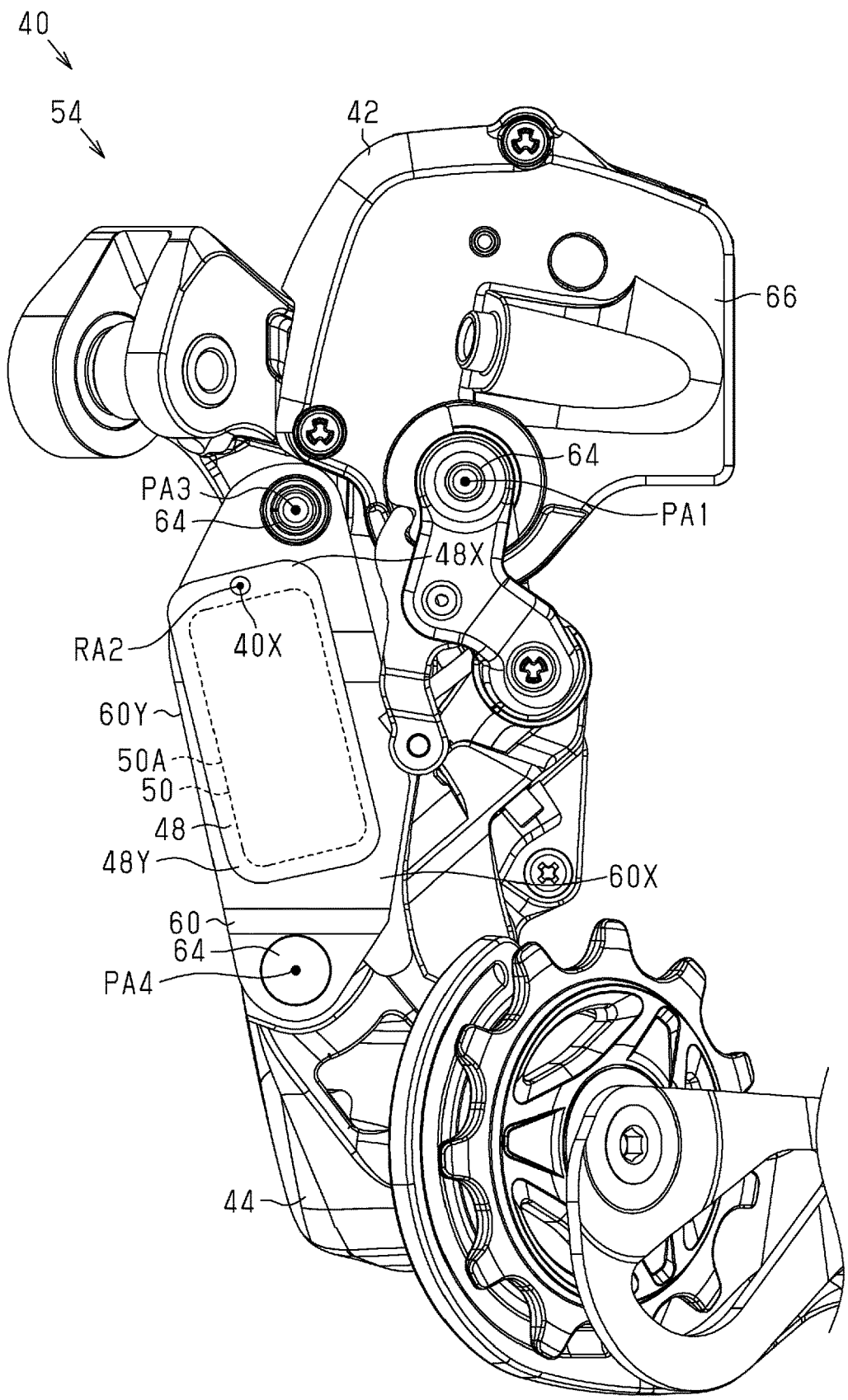
FIG. 21 is a partial plan view showing a third embodiment of a human-powered vehicle derailleur in a cover attachment state.
Figure 22:
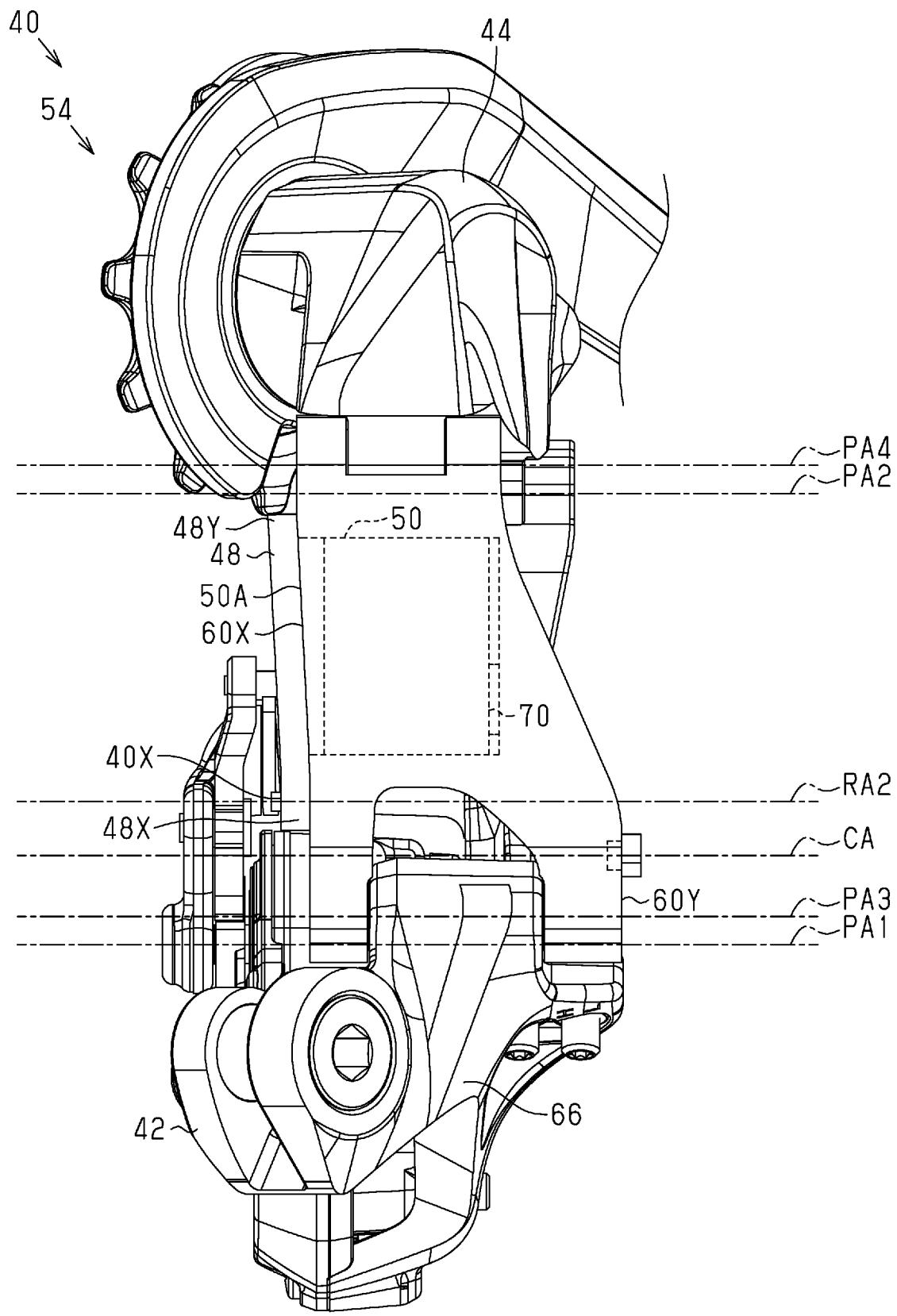
FIG. 22 is a side view of the human-powered vehicle derailleur shown in FIG. 21.

A rear derailleur 54 will now be described with reference to FIGS. 21 to 23. The rear derailleur 54 of the third embodiment is the same as the rear derailleur 54 of the first embodiment except that the open portion 50A of the power source receiving part 50 is located closer to the first end 60X of the outer link member 60 than the second end 60Y of the outer link member 60 in the axial direction of the at least one link pin 64. Same reference characters are given to those components that are the same as the corresponding components of the first embodiment. Such components will not be described in detail.

In the present embodiment, the open portion 50A of the power source receiving part 50 is located closer to the first end 60X of the outer link member 60 than the second end 60Y of the outer link member 60 in the axial direction of the at least one link pin 64. The cover member 48 is, for example, located closer to the first end 60X of the outer link member 60 than the second end 60Y of the outer link member 60 in the axial direction of the at least one link pin 64. The pivot mechanism 40X is, for example, located closer to the first end 60X of the outer link member 60 than the second end 60Y of the outer link member 60 in the axial direction of the at least one link pin 64.

Figure 23:
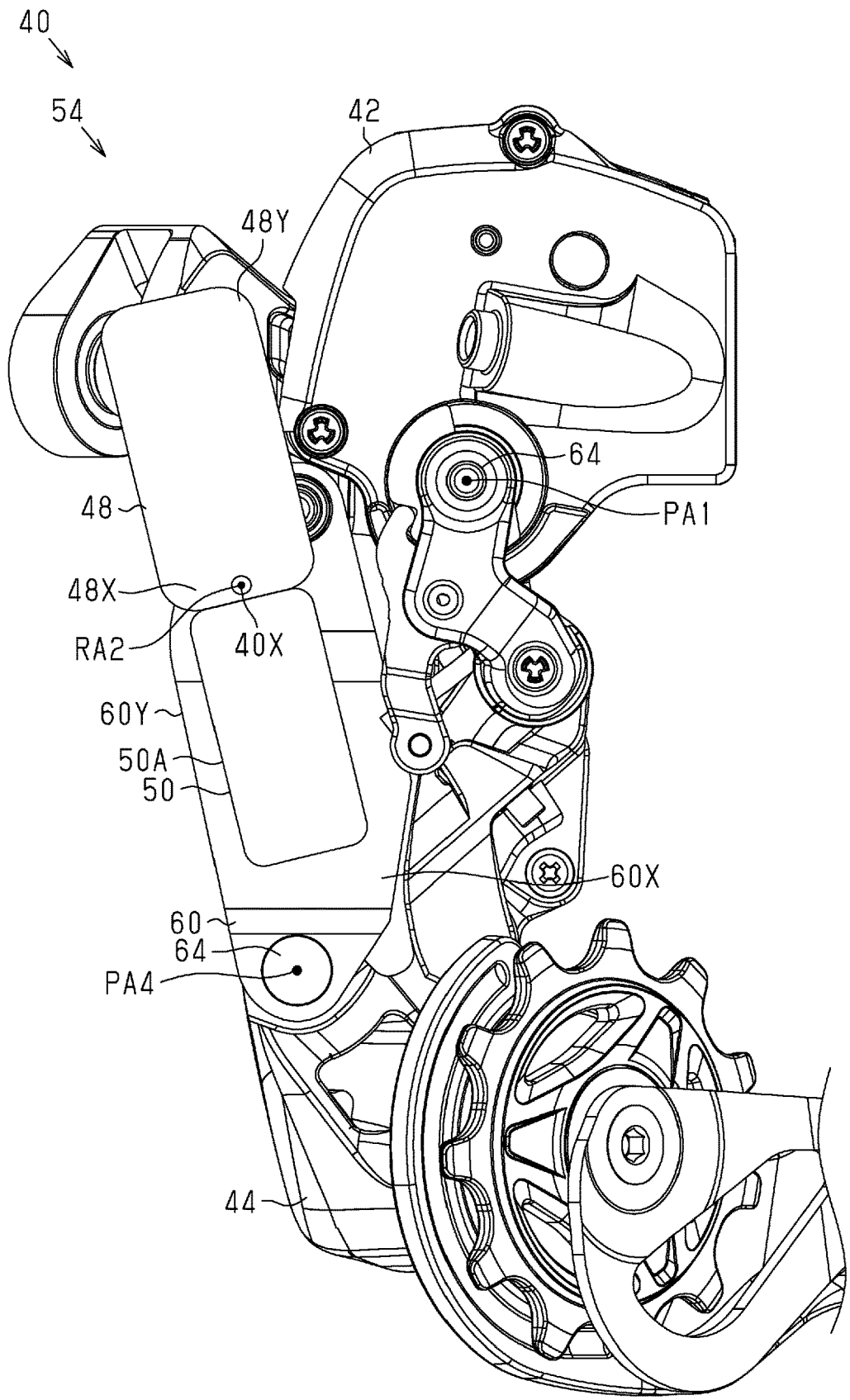
FIG. 23 is a partial side view of the human-powered vehicle derailleur shown in FIG. 21 in a cover detachment state.

As shown in FIG. 23, in the present embodiment, the cover member 48 is rotated about the rotational axis RA2 so that the second end 48Y is detached from the outer link member 60. The cover member 48 is rotated about the rotational axis RA2 to switch between a cover attachment state shown in FIG. 21 and a cover detachment state shown in FIG. 23.

In the rear derailleur 54 of the present embodiment, the open portion 50A of the power source receiving part 50 is arranged on an upper surface of the outer link member 60. Thus, when accommodating the power source 90 in the power source receiving part 50, the power source 90 is readily disposed on the power source receiving part 50.

A fourth embodiment of the rear derailleur 54 will now be described with reference to FIGS. 24 and 25. The rear derailleur 54 of the fourth embodiment is the same as the rear derailleur 54 of the third embodiment except that the rotational axis RA2 of the cover member 48 is inclined at an angle of greater than or equal to 45 degrees relative to the axis of the at least one link pin 64. The same reference characters are given to those components that are the same as the corresponding components of the first and third embodiments. Such components will not be described in detail.

Figure 24:
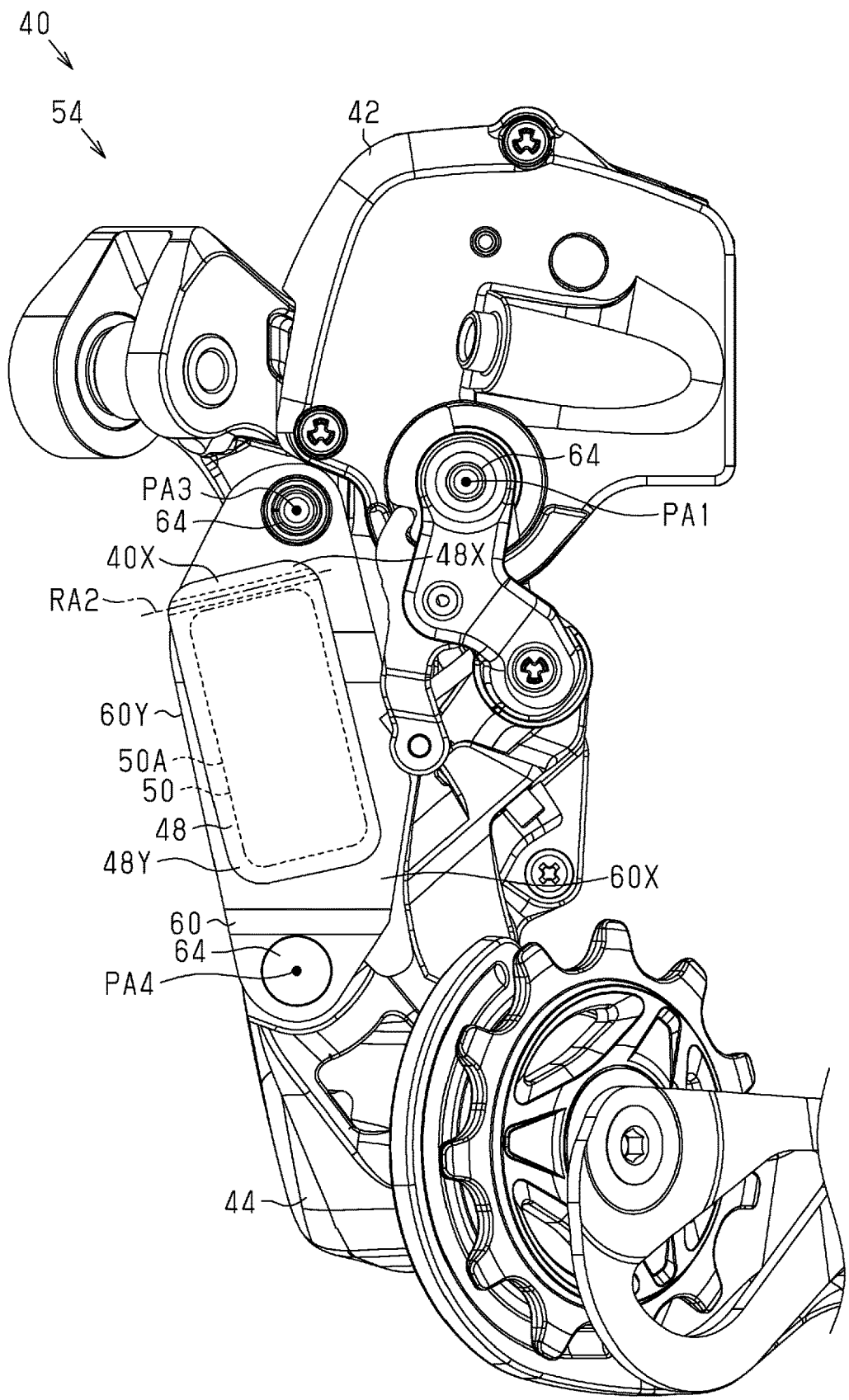
FIG. 24 is a partial plan view showing a fourth embodiment of a human-powered vehicle derailleur in a cover attachment state.
Figure 25:
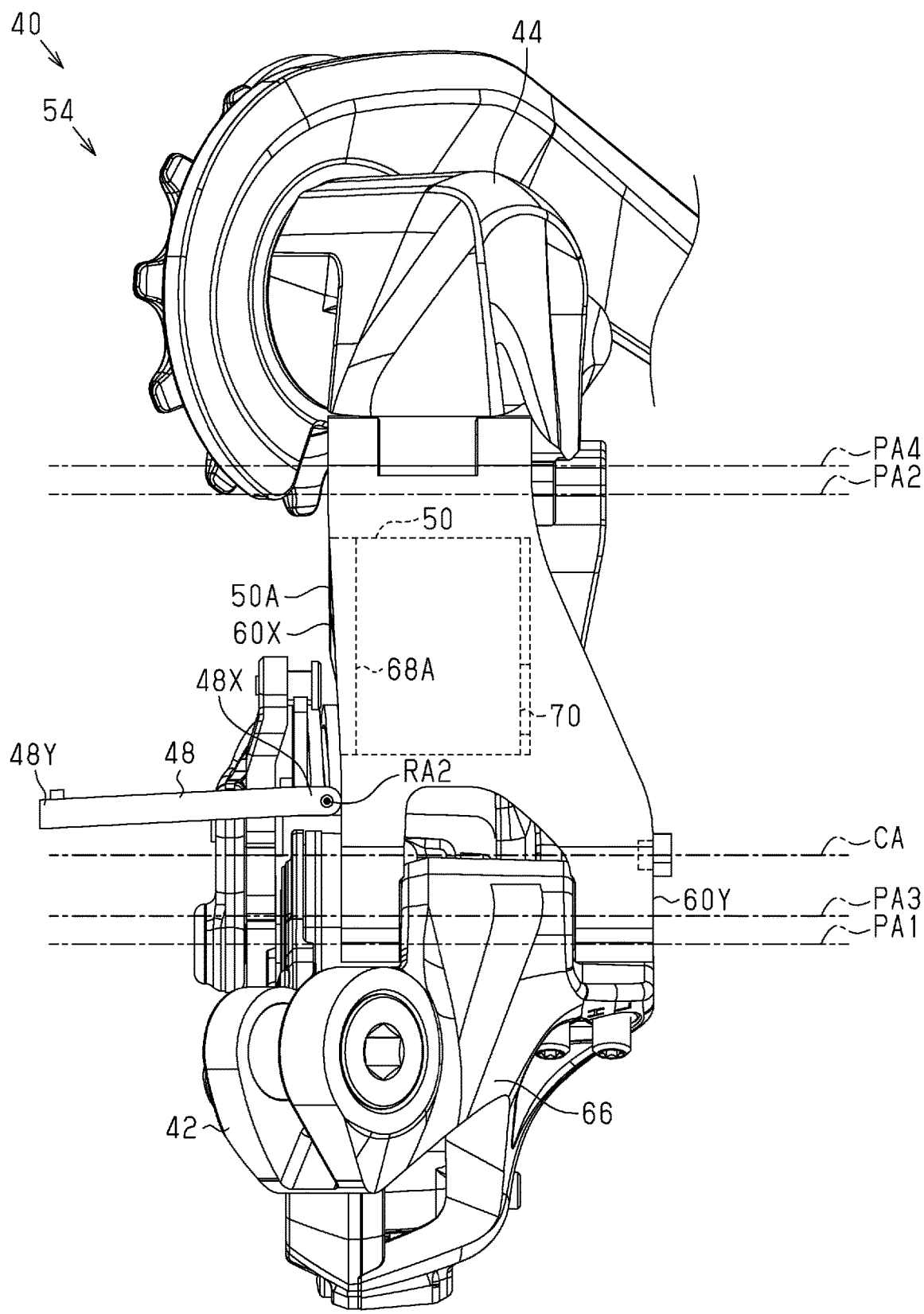
FIG. 25 is a partial side view of the human-powered vehicle derailleur shown in FIG. 24 in a cover detachment state.

As shown in FIGS. 24 and 25, in the present embodiment, the cover member 48 is arranged on the linkage assembly 46 so that the rotational axis RA2 is inclined at an angle of greater than or equal to 45 degrees relative to the axis of the at least one link pin 64. The cover member 48 is arranged on the linkage assembly 46, for example, so that the rotational axis RA2 extends orthogonal to the axis of the at least one link pin 64. The cover member 48 is arranged on the linkage assembly 46, for example, so that the rotational axis RA2 extends orthogonal to the first pivot axis PA1, the second pivot axis PA2, the third pivot axis PA3, and the fourth pivot axis PA4. The pivot shaft 40XA of the pivot mechanism 40X is, for example, disposed orthogonal to the at least one link pin 64.

As shown in FIG. 25, in the present embodiment, the cover member 48 is rotated about the rotational axis RA2 to the upper side of the outer link member 60, so that the second end 48Y is detached from the outer link member 60. The cover member 48 is rotated about the rotational axis RA2 to switch between a cover attachment state shown in FIG. 24 and a cover detachment state shown in FIG. 25.

A fifth embodiment of a rear derailleur 54 will now be described with reference to FIG. 26. The rear derailleur 54 of the fifth embodiment is the same as the rear derailleur 54 of the first embodiment except that the power source receiving part 50 is disposed on the inner link member 62. Same reference characters are given to those components that are the same as the corresponding components of the first embodiment. Such components will not be described in detail.

Figure 26:
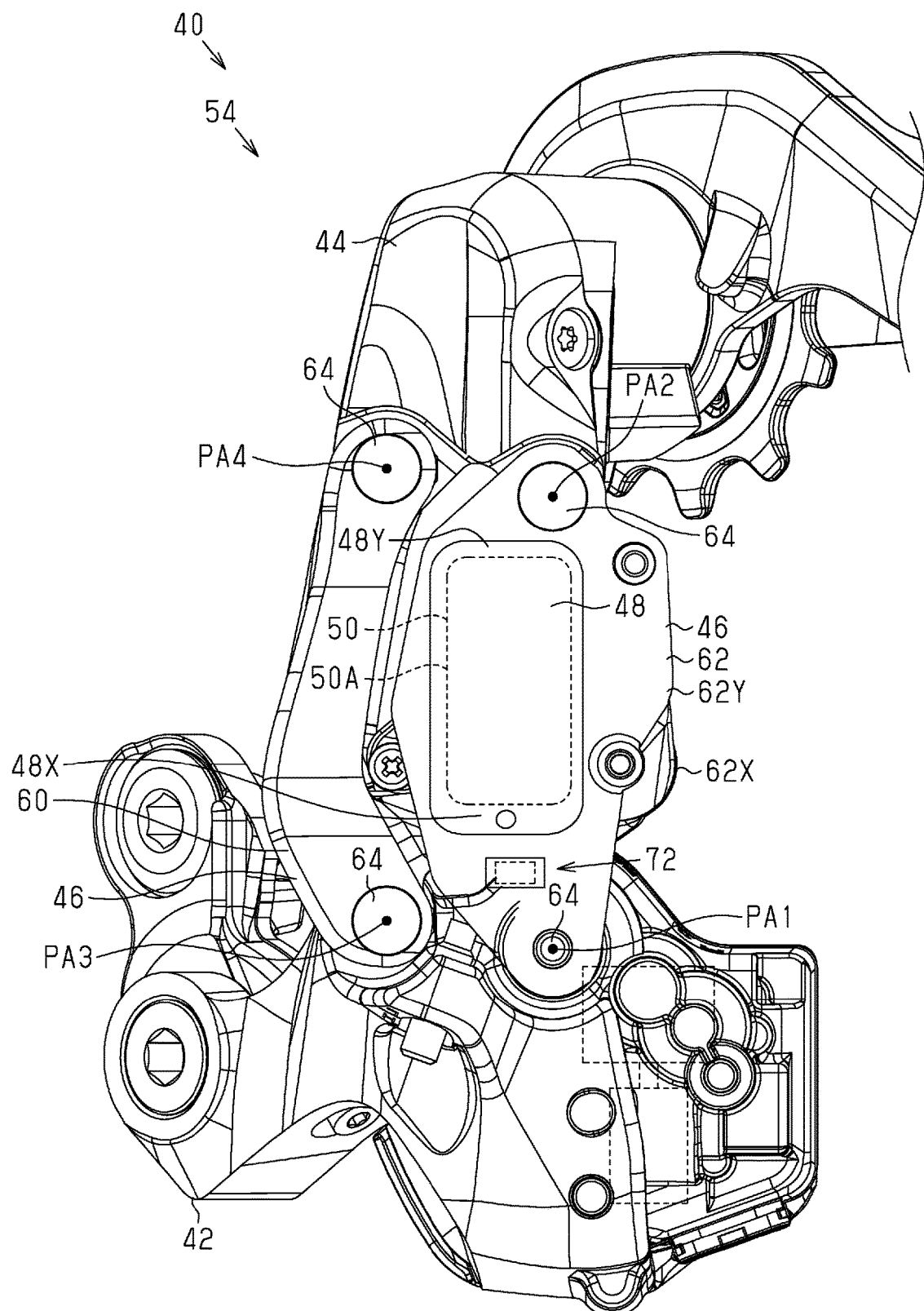
FIG. 26 is a partial plan view showing a fifth embodiment of a human-powered vehicle derailleur.

As shown in FIG. 26, in the present embodiment, the power source receiving part 50 is disposed on the inner link member 62. The open portion 50A is, for example, located closer to a second end 62Y of the inner link member 62 than a first end 62X of the inner link member 62 in the axial direction of the at least one link pin 64. The first end 62X of the inner link member 62 is, for example, a part of the surface of the inner link member 62 facing an upper side of the inner link member 62. The upper side of the inner link member 62 conforms to, for example, an upper side of the human-powered vehicle 10 in a state where the derailleur 40 is coupled to the human-powered vehicle 10 and the derailleur 40 is in a predetermined state. The upper side of the inner link member 62 refers to, for example, a direction extending from the second end 62Y toward the first end 62X in a state where the derailleur 40 is located so that the axial direction of the at least one link pin 64 is parallel to a vertical direction. The second end 62Y of the inner link member 62 is, for example, a part of the surface of the inner link member 62 facing a lower side of the inner link member 62. The lower side of the inner link member 62 conforms to, for example, a lower side of the human-powered vehicle 10 in a state where the derailleur 40 is coupled to the human-powered vehicle 10 and the derailleur 40 is in a predetermined state. The lower side of the inner link member 62 refers to, for example, a direction extending from the first end 62X toward the second end 62Y in a state where the derailleur 40 is located so that the axial direction of the at least one link pin 64 is parallel to a vertical direction. The open portion 50A can be located closer to the first end 62X of the inner link member 62 than the second end 62Y of the inner link member 62.

In the present embodiment, the cover member 48 is attached to the inner link member 62. The cover member 48 is, for example, located closer to the second end 62Y of the inner link member 62 than the first end 62X of the inner link member 62 in the axial direction of the at least one link pin 64.

In the present embodiment, the electric port 72 is arranged on the second end 62Y of the inner link member 62. In the present embodiment, the electric port 72 can be arranged on the outer link member 60 as in the first embodiment.

A sixth embodiment of a rear derailleur 54 will now be described with reference to FIGS. 27 and 28. The rear derailleur 54 of the sixth embodiment is the same as the rear derailleur 54 of the first embodiment except that the cover member 48 includes the first rail 22D and the outer link member 60 includes the second rail 24D. Same reference characters are given to those components that are the same as the corresponding components of the first embodiment. Such components will not be described in detail.

Figure 27:
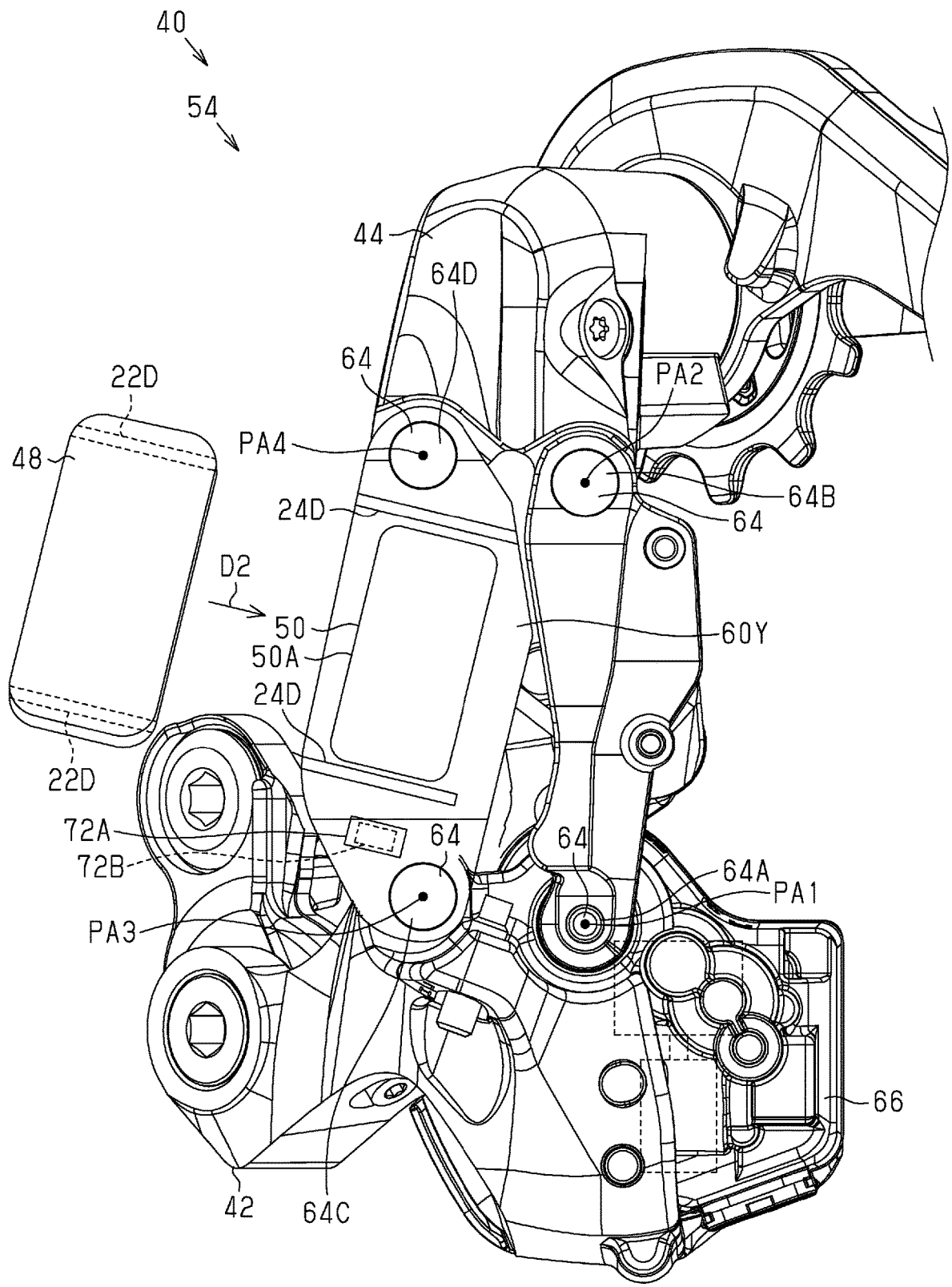
FIG. 27 is a partial plan view showing a sixth embodiment of a human-powered vehicle derailleur.
Figure 28:
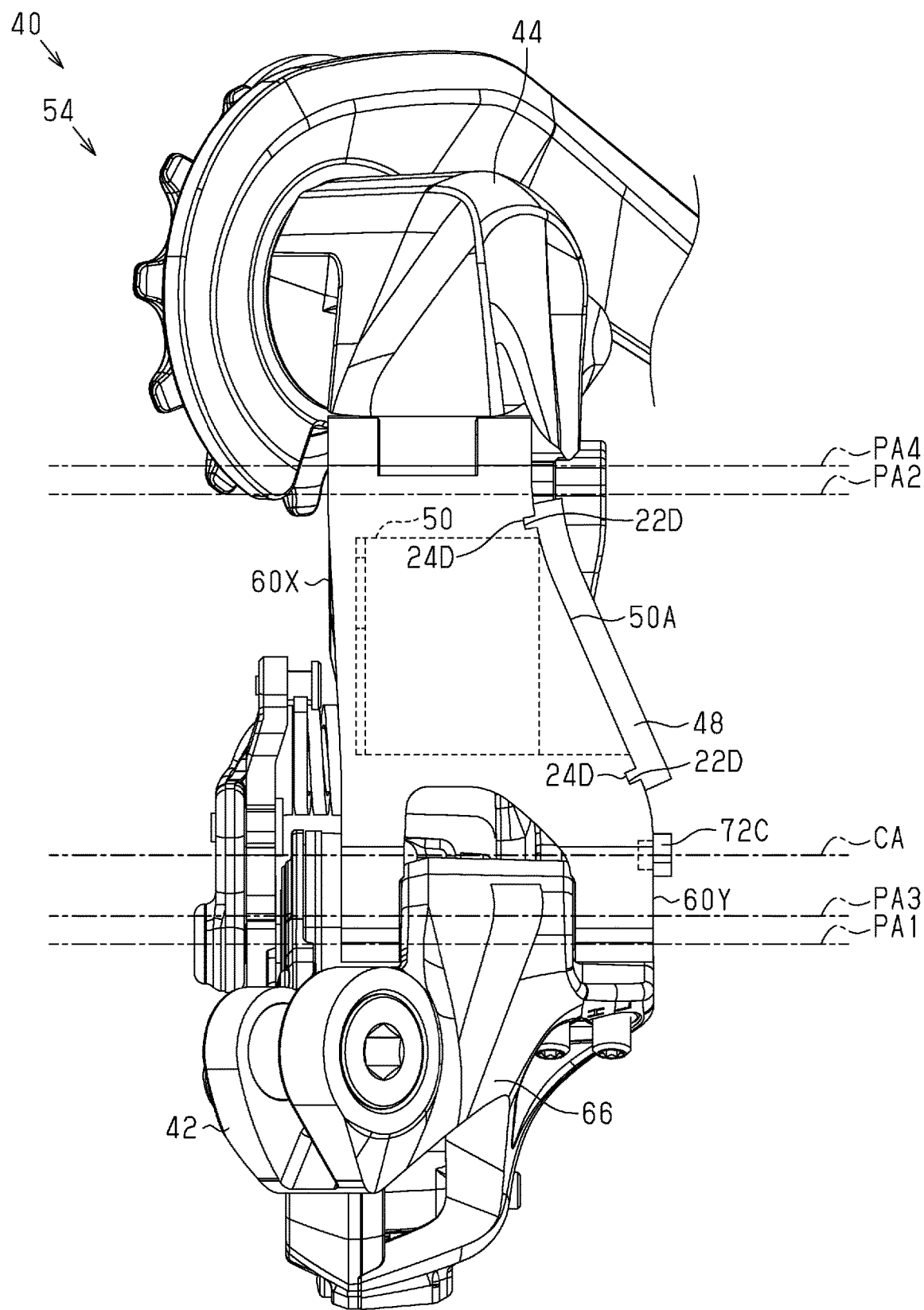
FIG. 28 is a partial side view of the human-powered vehicle derailleur shown in FIG. 27.

As shown in FIGS. 27 and 28, in the present embodiment, the cover member 48 includes the first rail 22D. The outer link member 60 includes, for example, the second rail 24D. The first rail 22D slides on the second rail 24D. The cover member 48 is, for example, configured to be attached to the outer link member 60 in accordance with sliding of the first rail 22D on the second rail 24D.

For example, in a cover detachment state shown in FIG. 27, movement of the cover member 48 relative to the outer link member 60 in a second direction D2 switches the derailleur 40 to the cover attachment state. The second direction D2 is orthogonal to the axis of the at least one link pin 64.

The cover member 48 of the present embodiment can be configured to be attached to the outer link member 60 in an undetachable manner or a detachable manner.

Figure 29:
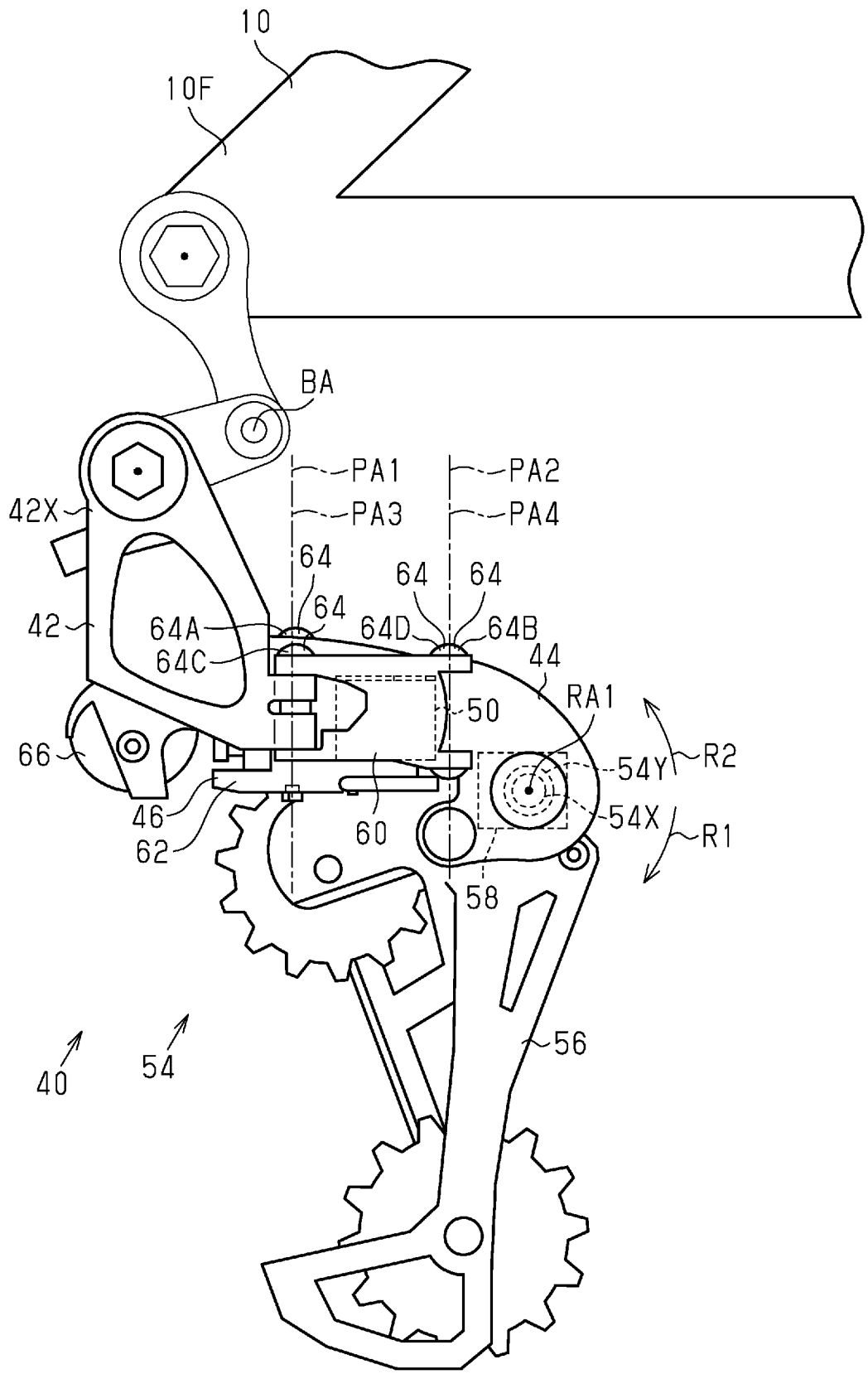
FIG. 29 is a partial side view showing a seventh embodiment of a human-powered vehicle derailleur.

A seventh embodiment of a rear derailleur 54 will now be described with reference to FIG. 29. The rear derailleur 54 of the seventh embodiment is the same as the rear derailleur 54 of the first embodiment except that the linkage assembly 46 is arranged so that at least one of the first pivot axis PA1, the second pivot axis PA2, the third pivot axis PA3, and the fourth pivot axis PA4 is orthogonal to the attachment portion pivot axis BA. Same reference characters are given to those components that are the same as the corresponding components of the first embodiment. Such components will not be described in detail.

The base member 42 of the present embodiment includes the base member attachment portion 42X pivotally attached to the frame 10F of the human-powered vehicle 10 about the attachment portion pivot axis BA. In the present embodiment, the linkage assembly 46 is configured to be arranged so that at least one of the first pivot axis PA1, the second pivot axis PA2, the third pivot axis PA3, and the fourth pivot axis PA4 is orthogonal to the attachment portion pivot axis BA. The at least one link pin 64 is, for example, arranged so that the axis of the at least one link pin 64 is parallel to the attachment portion pivot axis BA.

Figure 30:
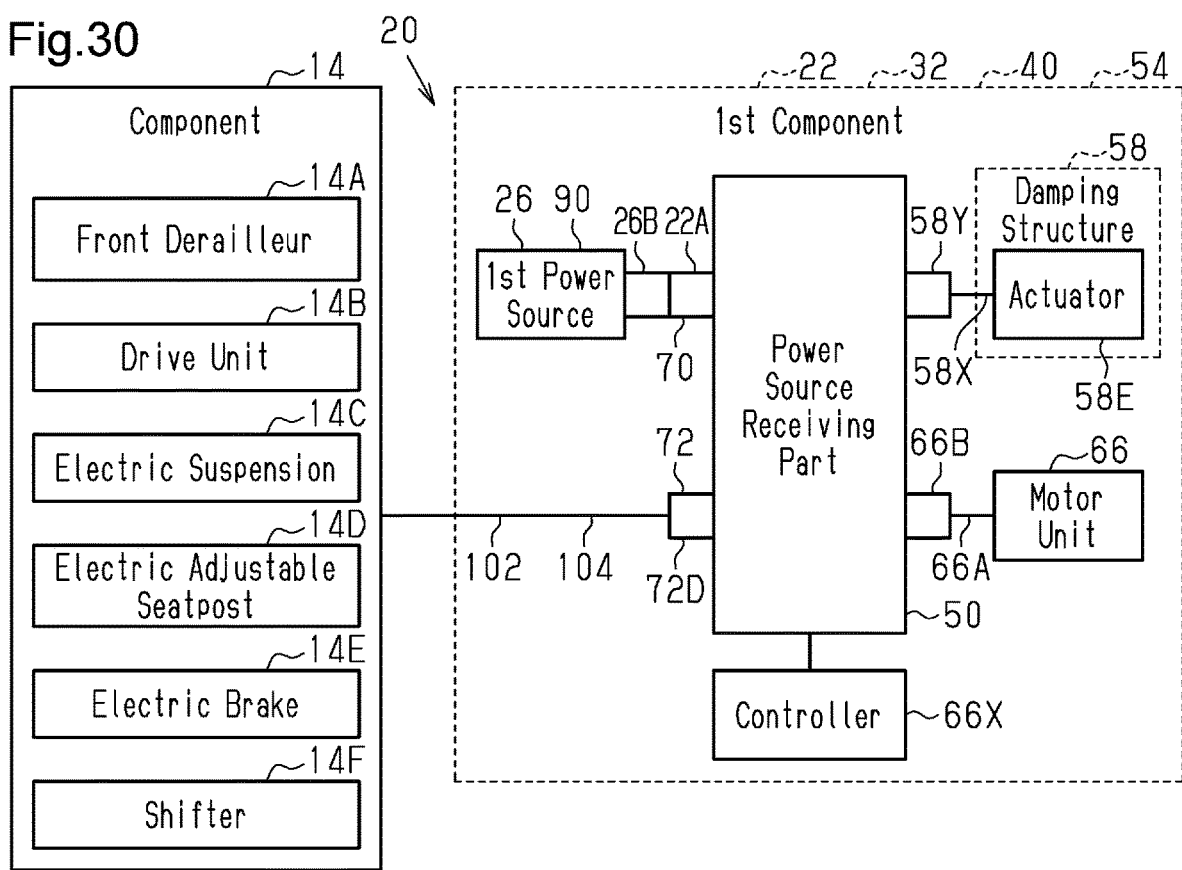
FIG. 30 is a block diagram showing the electrical configuration of an eighth embodiment of a component system for a human-powered vehicle.

An eighth embodiment of a derailleur 40 will now be described with reference to FIG. 30. The derailleur 40 of the eighth embodiment is the same as the derailleur 40 of the first embodiment except that the electric port 72 is used to perform at least wired communication with the component 14 differing from the derailleur 40. Same reference characters are given to those components that are the same as the corresponding components of the first embodiment. Such components will not be described in detail.

In the present embodiment, the electric port 72 is used to perform at least wired communication with the component 14 differing from the derailleur 40. In the present embodiment, the derailleur 40 is one of a front derailleur 14A and the rear derailleur 54. The component 14 is, for example, at least one of the other one of the front derailleur 14A and the rear derailleur 54, a drive unit 14B, an electric suspension 14C, an electric adjustable seatpost 14D, an electric brake 14E, and a shifter 14F.

For example, the one of the front derailleur 14A and the rear derailleur 54 is the rear derailleur 54, and the other one of the front derailleur 14A and the rear derailleur 54 is the front derailleur 14A. The derailleur 40 is, for example, the rear derailleur 54. The derailleur 40 can be the front derailleur 14A. The component 14 can be the same human-powered vehicle component as the second component 24 or a human-powered vehicle component differing from the second component 24.

The front derailleur 14A includes, for example, the front derailleur of the first embodiment. The drive unit 14B is, for example, provided on the frame 10F of the human-powered vehicle 10 and apply propulsion force to the human-powered vehicle 10. The electric suspension 14C includes, for example, at least one of the electric front suspension and the electric rear suspension of the first embodiment. The electric adjustable seatpost 14D includes, for example, the electric adjustable seatpost of the first embodiment. The electric brake 14E includes, for example, at least one of the electric front brake and the electric rear brake of the first embodiment. The shifter 14F includes, for example, the electric shift lever of the first embodiment.

The controller 66X is, for example, configured to transmit the present transmission ratio, the rotational speed of the guide pulley 56C, the rotational speed of the tension pulley 56D, or the like to the component 14 through wired communication. The controller 66X is, for example, configured to receive a signal related to control of the motor unit 66 or a signal related to control of the actuator 58E of the damping structure 58 from the component 14 through wired communication. The derailleur 40 can be configured to communicate with a plurality of components 14 through power line communication (PLC) via the electric port 72.

Figure 31:
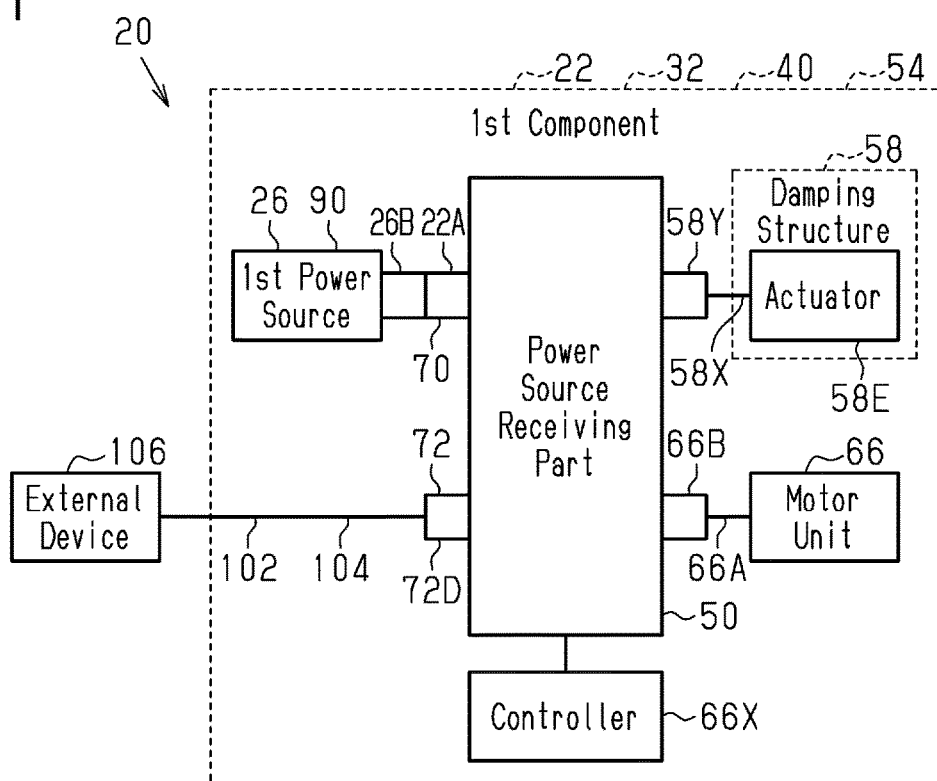
FIG. 31 is a block diagram showing the electrical configuration of a human-powered vehicle derailleur in a ninth embodiment of a component system for a human-powered vehicle.

A ninth embodiment of a derailleur 40 will now be described with reference to FIG. 31. The rear derailleur 54 of the ninth embodiment is the same as the derailleur 40 of the first embodiment except that the electric port 72 is used to perform at least wired communication with the external device 106. Same reference characters are given to those components that are the same as the corresponding components of the first embodiment. Such components will not be described in detail.

In the present embodiment, the electric port 72 is used to perform at least wired communication with the external device 106. The electric port 72 is, for example, connected to the external device 106 in a manner allowing for wired communication. The external device 106 is, for example, configured to perform, via the electric port 72, at least one of analysis of a traveling state of the human-powered vehicle 10, firmware update of the derailleur 40, and anomaly analysis of the derailleur 40.

The external device 106 differs, for example, from the first component 22 and the second component 24. The external device 106 includes, for example, at least one of a smartphone, a personal computer, and a tablet computer. The electric port 72 can be configured to be connected to an external server via the external device 106.

In a case where the external device 106 is configured to perform analysis of the traveling state of the human-powered vehicle 10, the controller 66X is configured to transmit the present transmission ratio, the rotational speed of the guide pulley 56C, the rotational speed of the tension pulley 56D, or the like to the external device 106. In a case where the external device 106 is configured to perform firmware update of the derailleur 40, the controller 66X is configured to transmit information related to firmware of the derailleur 40 to and from the external device 106. In a case where the external device 106 is configured to perform anomaly analysis of the derailleur 40, the controller 66X is configured to transmit an actuation state of the derailleur 40 to the external device 106 through wired communication.

Figure 32:
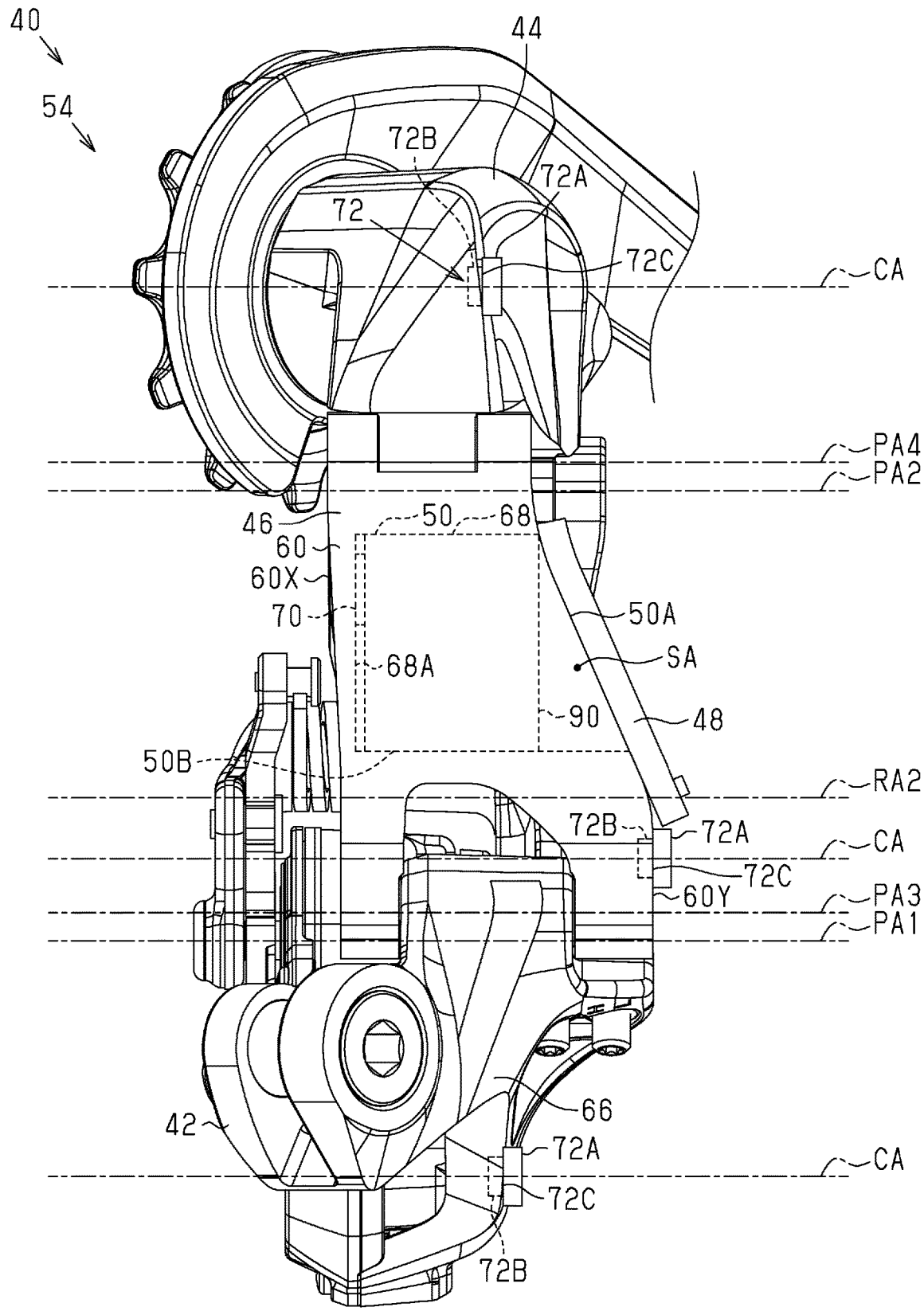
FIG. 32 is a partial side view showing a tenth embodiment of a human-powered vehicle derailleur.

A tenth embodiment of a rear derailleur 54 will now be described with reference to FIG. 32. The rear derailleur 54 of the tenth embodiment is the same as the rear derailleur 54 of the first embodiment except that the electric port 72 is arranged on the movable member 44. Same reference characters are given to those components that are the same as the corresponding components of the first embodiment. Such components will not be described in detail.

The linkage assembly 46 includes, for example, the at least one link pin 64. The at least one link pin 64, for example, pivotally attaches the linkage assembly 46 to one of the movable member 44 and the base member 42. In the present embodiment, the electric port 72 is arranged on the movable member 44. In the present embodiment, the cable receiving opening axis CA is parallel to the axis of the at least one link pin 64. The cable receiving opening axis CA is, for example, parallel to the first pivot axis PA1, the second pivot axis PA2, the third pivot axis PA3, and the fourth pivot axis PA4.

The electric port 72 is, for example, arranged on an upper surface or a lower surface of the movable member 44. In the present embodiment, the electric port 72 is arranged on the lower surface of the movable member 44 so that the cable receiving opening 72C faces downward. The upper side of the movable member 44 conforms to, for example, an upper side of the human-powered vehicle 10 in a state where the derailleur 40 is coupled to the human-powered vehicle 10 and the derailleur 40 is in a predetermined state. The upper surface of the movable member 44, for example, faces vertically upward in a state where the derailleur 40 is arranged so that the axial direction of the at least one link pin 64 is parallel to the vertical direction. The lower side of the movable member 44 conforms to, for example, a lower side of the human-powered vehicle 10 in a state where the derailleur 40 is coupled to the human-powered vehicle 10 and the derailleur 40 is in a predetermined state. The lower surface of the movable member 44, for example, faces vertically downward in a state where the derailleur 40 is arranged so that the axial direction of the at least one link pin 64 is parallel to the vertical direction.

The electric port 72 can be arranged on an upper surface or a lower surface of the base member 42. The upper surface of the base member 42 faces vertically upward in a state where the derailleur 40 is arranged so that the axial direction of the at least one link pin 64 is parallel to the vertical direction. The lower surface of the base member 42 faces vertically downward in a state where the derailleur 40 is arranged so that the axial direction of the at least one link pin 64 is parallel to the vertical direction. In FIG. 32 electric ports 72 are further arranged on the lower surface of the base member 42 and the lower surface of the linkage assembly 46.

An eleventh embodiment of a rear derailleur 54 will now be described with reference to FIG. 33. The rear derailleur 54 of the eleventh embodiment is the same as the rear derailleur 54 of the tenth embodiment except that the cable receiving opening axis CA of the electric port 72 is inclined relative to the axis of the at least one link pin 64. Same reference characters are given to those components that are the same as the corresponding components of the tenth embodiment. Such components will not be described in detail.

The linkage assembly 46 includes, for example, the at least one link pin 64. The at least one link pin 64, for example, pivotally attaches the linkage assembly 46 to one of the movable member 44 and the base member 42. The electric port 72 is, for example, arranged on the movable member 44. In the present embodiment, the cable receiving opening axis CA is inclined relative to the axis of the at least one link pin 64. The cable receiving opening axis CA is, for example, orthogonal to the axis of the at least one link pin 64.

The electric port 72 is arranged on the upper surface, a side surface, or a lower surface of the movable member 44. The side surface of the movable member 44 faces a direction orthogonal to a vertical direction in a state where the derailleur 40 is arranged so that the axial direction of the at least one link pin 64 is parallel to the vertical direction. The electric port 72 is arranged on the side surface of the movable member 44, for example, so that the cable receiving opening 72C is open sideward. As shown in FIG. 32, electric ports 72 can be further arranged on a side surface of the base member 42 and a side surface of the linkage assembly 46.

The electric ports 72 can be arranged on the side surface of the base member 42 and the side surface of the linkage assembly 46. The side surface of the base member 42 faces a direction orthogonal to a vertical direction in a state where the derailleur 40 is arranged so that the axial direction of the at least one link pin 64 is parallel to the vertical direction. The side surface of the linkage assembly 46 faces a direction orthogonal to a vertical direction in a state where the derailleur 40 is arranged so that the axial direction of the at least one link pin 64 is parallel to the vertical direction. In FIG. 33, the electric ports 72 are further arranged on the side surface of the base member 42 and the side surface of the linkage assembly 46.

A twelfth embodiment of a rear derailleur 54 and a power source 90 will now be described with reference to FIGS. 34 to 37. The rear derailleur 54 and the power source 90 of the twelfth embodiment are the same as the rear derailleur 54 and the power source 90 of the first embodiment except the structures of the first attachment engagement portion 22C, the first housing engagement portion 26D, the second attachment engagement portion 24C, and the second housing engagement portion 28D. Same reference characters are given to those components that are the same as the corresponding components of the first embodiment. Such components will not be described in detail.

Figure 34:
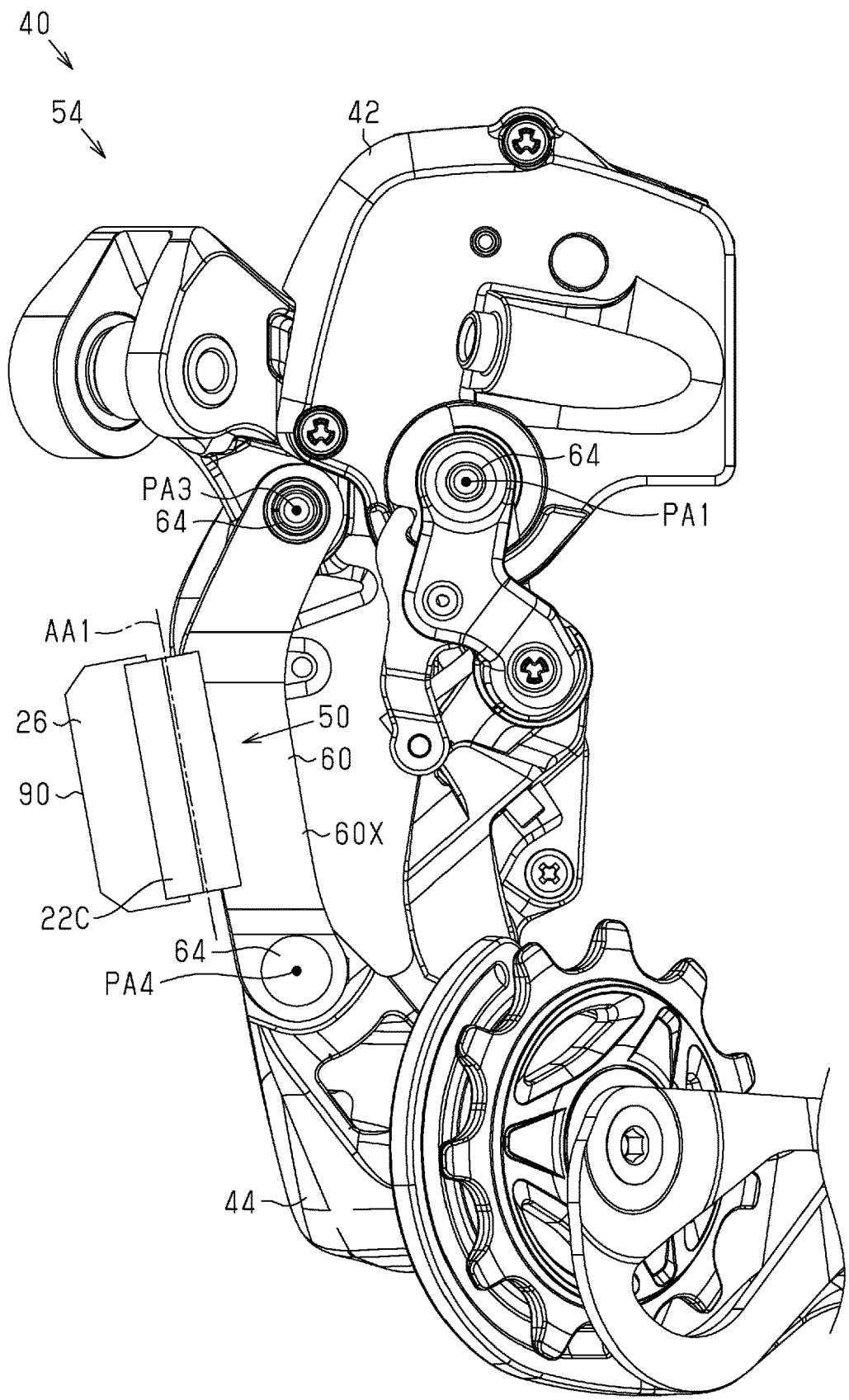
FIG. 34 is a partial plan view of a human-powered vehicle derailleur in a twelfth embodiment of a component system for a human-powered vehicle.

As shown in FIG. 34, for example, the power source receiving part 50 is arranged on a side portion of the outer link member 60. The outer link member 60 is, for example, part of the first component 22. The power source 90 is attached to the side portion of the outer link member 60. The power source 90 that is attached to the side portion of the outer link member 60 is, for example, the first power source 26.

Figure 35:
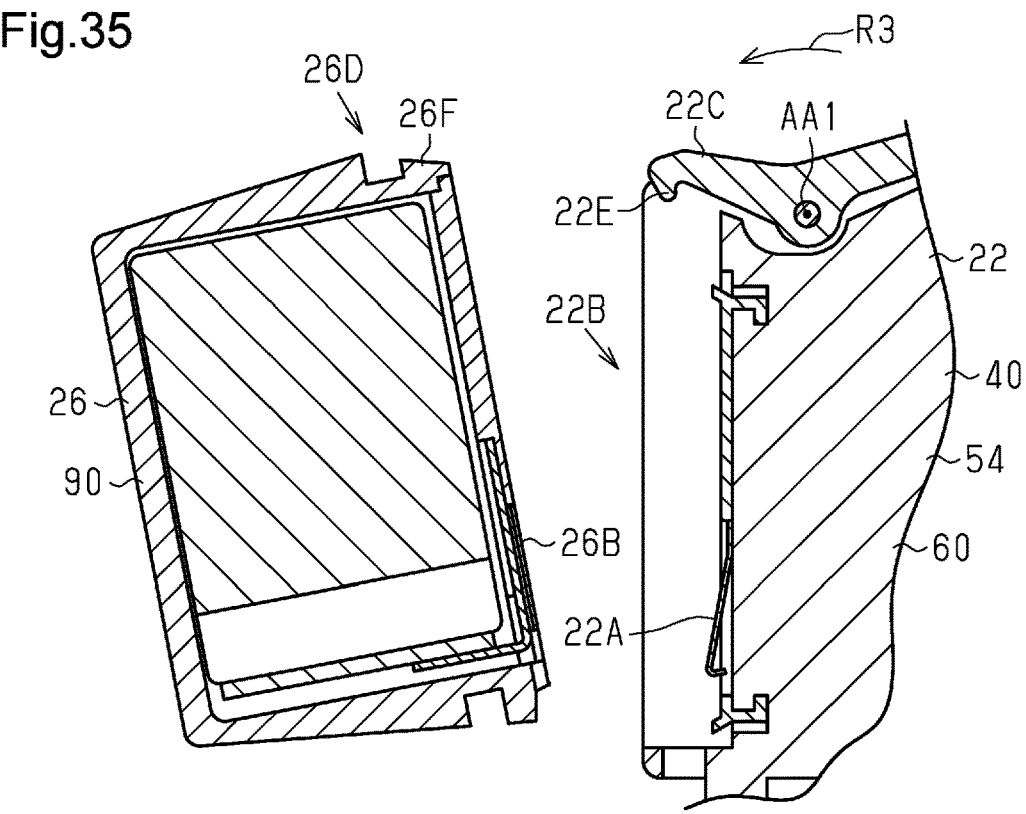
FIG. 35 is a cross-sectional view of a first power source and part of a first component in the twelfth embodiment of the component system for the human-powered vehicle.

As shown in FIG. 35, the first attachment engagement portion 22C is, for example, rotatably attached to the first component 22. The first housing engagement portion 26D includes, for example, a first projection 26F engageable with the first attachment engagement portion 22C. For example, the first attachment engagement portion 22C includes a first attachment end part 22E and engages with the first housing engagement portion 26D by engaging the first attachment end part 22E with the first projection 26F.

The first attachment engagement portion 22C is, for example, biased to rotate in a third rotational direction R3 about a first attachment rotational axis AA1. The first attachment engagement portion 22C is rotated in a direction opposite to the third rotational direction R3, so that the first power source 26 is disposed on the first attachment 22B. Then, the first attachment engagement portion 22C is rotated in the third rotational direction R3, so that the first attachment end part 22E engages with the first projection 26F.

Figure 36:
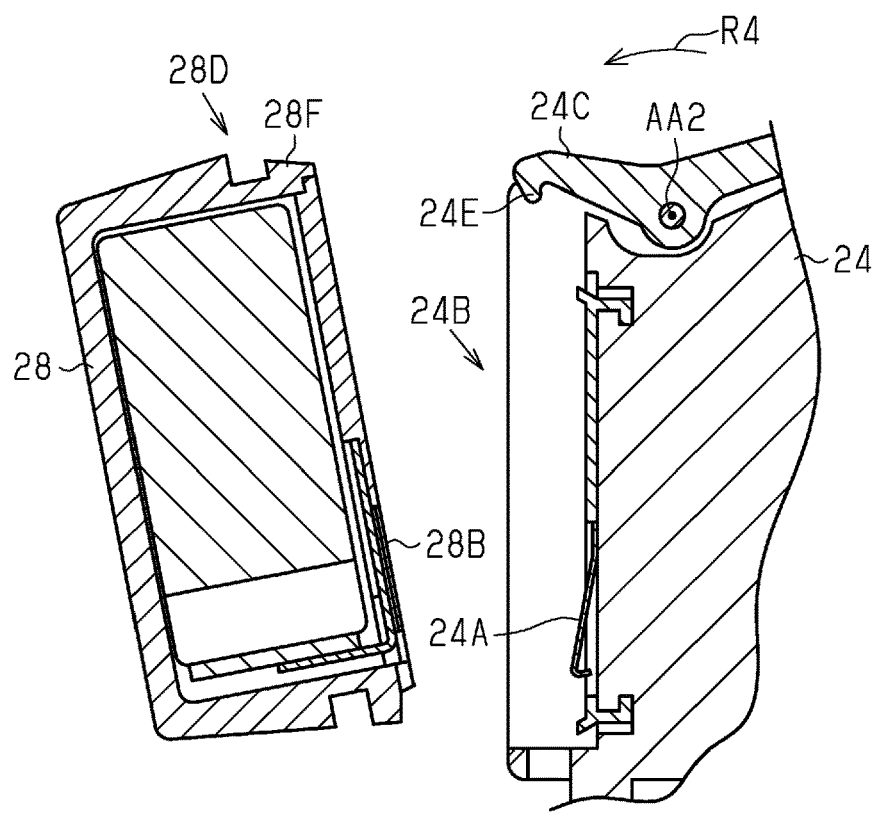
FIG. 36 is a cross-sectional view of a second power source and part of a second component in the twelfth embodiment of the component system for the human-powered vehicle.

As shown in FIG. 36, in the present embodiment, the second attachment engagement portion 24C is rotatably attached to the second component 24. The second housing engagement portion 28D includes, for example, a second projection 28F engageable with the second attachment engagement portion 24C. For example, the second attachment engagement portion 24C includes a second attachment end part 24E and engages with the second housing engagement portion 28D by engaging the second attachment end part 24E with the second projection 28F.

The second attachment engagement portion 24C is, for example, biased to rotate in a fourth rotational direction R4 about a second attachment rotational axis AA2. The second attachment engagement portion 24C is rotated in a direction opposite to the fourth rotational direction R4, so that the second power source 28 is disposed on the second attachment 24B. Then, the second attachment engagement portion 24C is rotated in the fourth rotational direction R4, so that the second attachment end part 24E engages with the second projection 28F. The second attachment 24B is, for example, formed in the same manner as the first attachment 22B.

Figure 37:
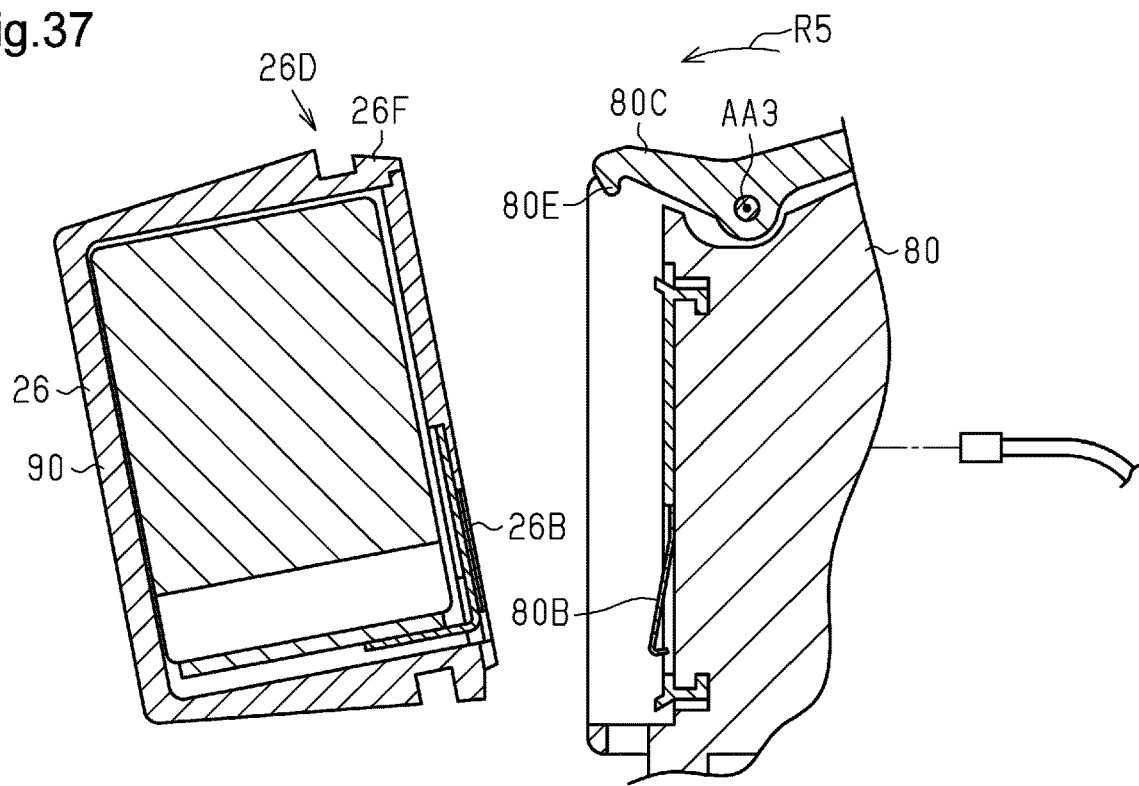
FIG. 37 is a schematic diagram of the first power source and a charger in the twelfth embodiment of the component system for the human-powered vehicle.
Figure 38:
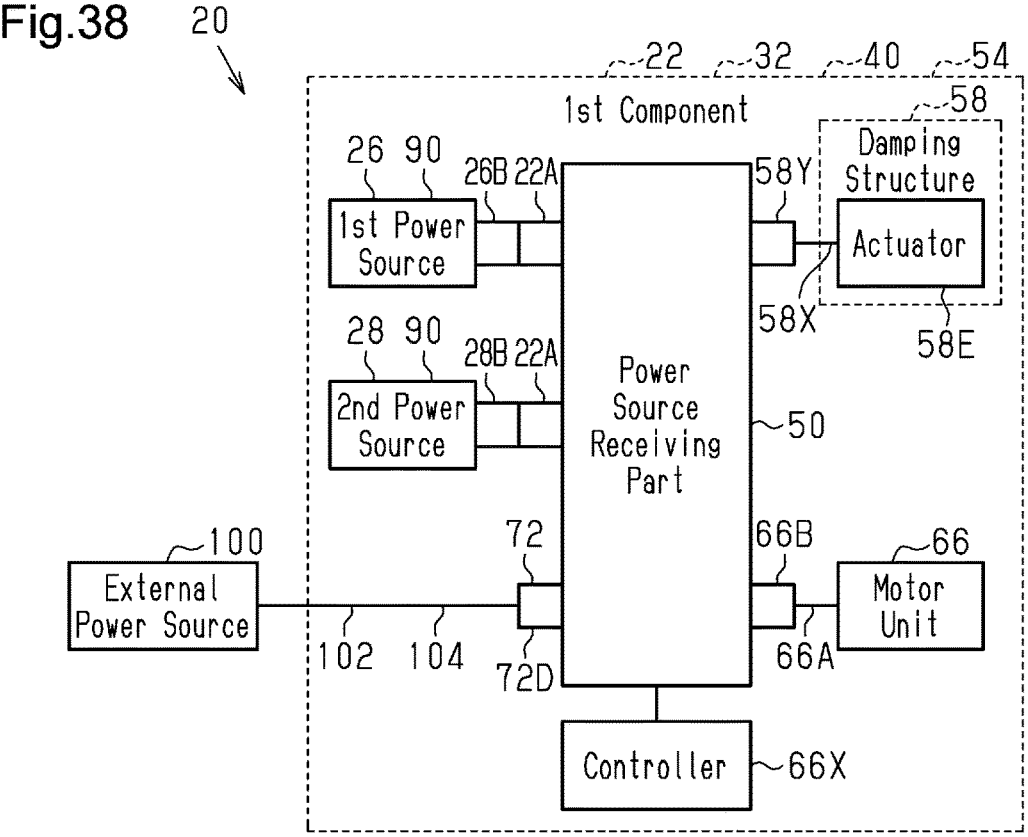
FIG. 38 is a block diagram showing the electrical configuration of a human-powered vehicle derailleur in a thirteenth embodiment of a component system for a human-powered vehicle.

As shown in FIGS. 35 to 37, for example, the charger engagement portion 80C is formed in the same manner as the first attachment engagement portion 22C and the second attachment engagement portion 24C. For example, the charger engagement portion 80C is biased to rotate in a fifth rotational direction R5 about a third attachment rotational axis AA3. The charger engagement portion 80C includes a charger engagement end portion 80E and engages with the first housing engagement portion 26D by engaging the charger engagement end portion 80E with the first projection 26F. The charger engagement portion 80C engages with the second housing engagement portion 28D by engaging the charger engagement end portion 80E with the second projection 28F.

A thirteenth embodiment of a rear derailleur 54 and a power source 90 will now be described with reference to FIGS. 1, 3 to 6, 38, and 39. The rear derailleur 54 and the power source 90 of the thirteenth embodiment are the same as the rear derailleur 54 and the power source 90 of the first embodiment except that the first power source 26 and the second power source 28 are used for at least one of the electric adjustable seatpost, the electric front suspension, the electric rear suspension, the electric front brake, the electric rear brake, the electric shift lever, the electric brake lever, the electric front derailleur 30, and the electric rear derailleur 32. Same reference characters are given to those components that are the same as the corresponding components of the first embodiment. Such components will not be described in detail.

As shown in FIGS. 1, 3 to 6, and 38, for example, the power source 90 includes the first power source 26 and the second power source 28. The first power source 26 is used for at least one of the electric adjustable seatpost, the electric front suspension, the electric rear suspension, the electric front brake, the electric rear brake, the electric shift lever, the electric brake lever, the electric front derailleur 30, and the electric rear derailleur 32. The first power source 26 includes, for example, the first housing 26A and the first power source electric terminal 26B. The first housing 26A has, for example, the first housing shape. The first power source electric terminal 26B has, for example, the first power source electric terminal shape. The second power source 28 is, for example, used for at least one of the electric adjustable seatpost, the electric front suspension, the electric rear suspension, the electric front brake, the electric rear brake, the electric shift lever, the electric brake lever, the electric front derailleur 30, and the electric rear derailleur 32. The second power source 28 includes, for example, the second housing 28A and the second power source electric terminal 28B. The second housing 28A has, for example, the second housing shape. The second power source electric terminal 28B has, for example, the second power source electric terminal shape. For example, the first housing shape is different from the second housing shape. For example, the first power source electric terminal shape is identical to the second power source electric terminal shape.

The electric adjustable seatpost, the electric front suspension, the electric rear suspension, the electric front brake, the electric rear brake, the electric shift lever, the electric brake lever, the electric front derailleur 30, and the electric rear derailleur 32 are configured in the same manner as those of the first embodiment. The first component electric terminal 22A includes, for example, a plurality of electric terminals. The electric terminals are, for example, configured in the same manner as the first power source electric terminal 26B and the second power source electric terminal 28B.

The second power source 28 and the first power source 26 are, for example, used for the same human-powered vehicle component. The human-powered vehicle component includes at least one of the electric adjustable seatpost, the electric front suspension, the electric rear suspension, the electric front brake, the electric rear brake, the electric shift lever, the electric brake lever, the electric front derailleur 30, and the electric rear derailleur 32.

Figure 39:
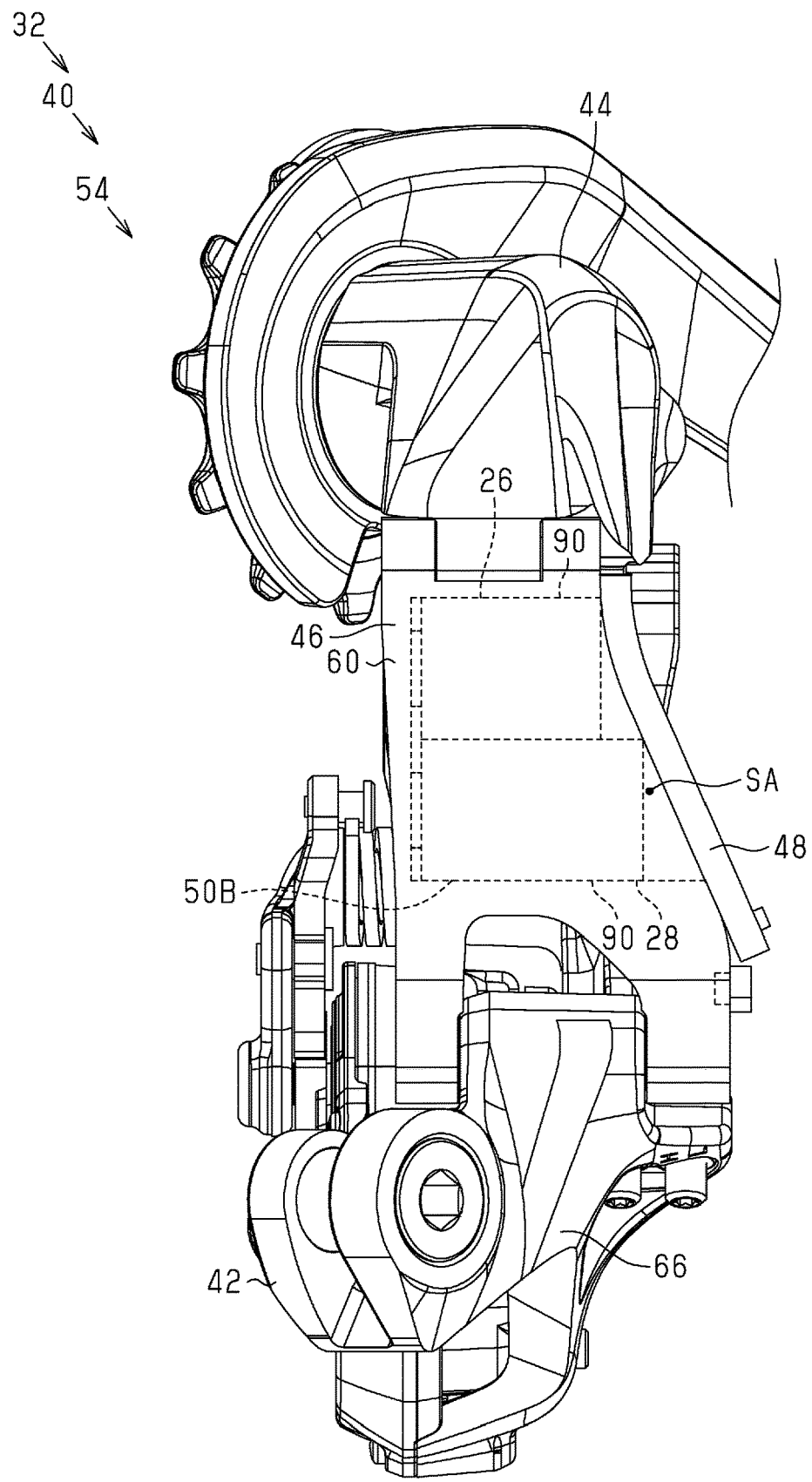
FIG. 39 is a partial side view of the human-powered vehicle derailleur shown in FIG. 38.

As shown in FIG. 39, for example, the human-powered vehicle component includes the electric rear derailleur 32. In the description, the derailleur 40 refers to the electric rear derailleur 32. In the description, the rear derailleur 54 refers to the electric rear derailleur 32. The first power source 26 and the second power source 28 are accommodated in the same accommodation cavity SA of the power source receiving part 50 of the rear derailleur 54.

The accommodation cavity SA can include a first accommodation cavity and a second accommodation cavity. The first accommodation cavity can be configured to accommodate the first power source 26. The second accommodation cavity can be configured to be arranged separately from the first accommodation cavity and accommodate the second power source 28.

The first accommodation cavity can be formed in the linkage assembly 46, and the second accommodation cavity can be formed in the base member 42 or the movable member 44. The first accommodation cavity can be formed in the base member 42, and the second accommodation cavity can be formed in the movable member 44. In a case where the human-powered vehicle component includes a plurality of human-powered vehicle components, the first accommodation cavity and the second accommodation cavity can be formed in different human-powered vehicle components.

The power source 90, for example, further includes the first power source element 26E and the second power source element 28E. The first power source element 26E is, for example, at least partially accommodated in the first housing 26A of the first power source 26. The first power source element 26E is, for example, electrically connected to the first power source electric terminal 26B. The second power source element 28E is, for example, at least partially accommodated in the second housing 28A of the second power source 28. The second power source element 28E is, for example, electrically connected to the second power source electric terminal 28B. The first power source element 26E and the second power source element 28E, for example, differ in battery capacity. The first power source element 26E and the second power source element 28E, for example, differ in shape.

A fourteenth embodiment of the charger 80 and the power source 90 will now be described with reference to FIGS. 40 to 43. The charger 80 and the power source 90 of the fourteenth embodiment are the same as the charger 80 and the power source 90 of the first embodiment except for the structures of the first charger engagement portion 80X, the second charger engagement portion 80Y, the first housing engagement portion 26D, and the second housing engagement portion 28D. Same reference characters are given to those components that are the same as the corresponding components of the first embodiment. Such components will not be described in detail.

Figure 40:
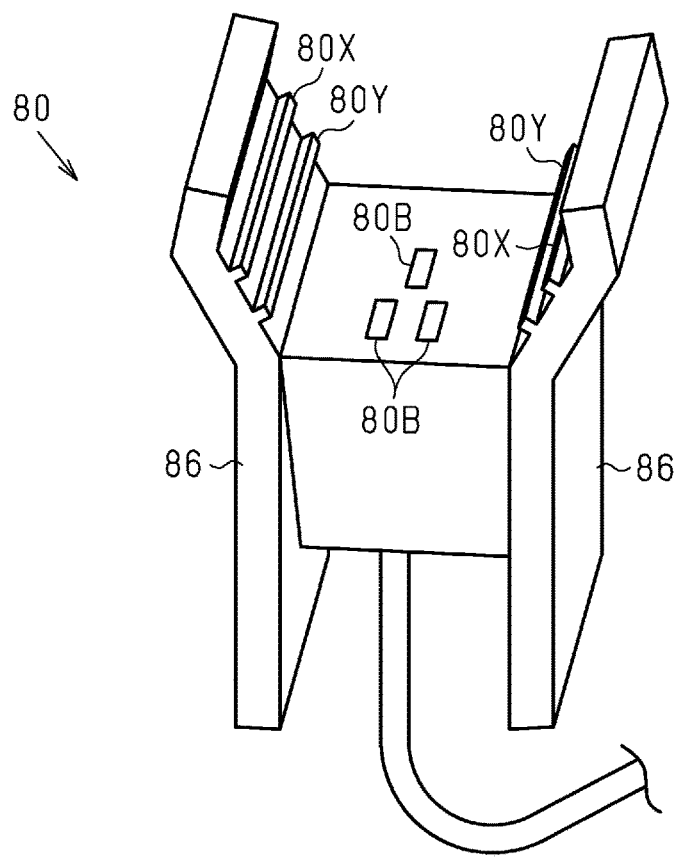
FIG. 40 is a perspective view of a charger for use with a fourteenth embodiment of a component system for a human-powered vehicle.

As shown in FIG. 40, the first charger engagement portion 80X and the second charger engagement portion 80Y differ in structure. The charger 80 is configured to clamp a battery with a clip 86. In the charger 80, each of the first charger engagement portion 80X and the second charger engagement portion 80Y is formed as the clip 86. Each of the first charger engagement portion 80X and the second charger engagement portion 80Y includes a rail.

The first charger engagement portion 80X and the second charger engagement portion 80Y extend parallel to a direction orthogonal to a direction in which the charger electric terminals 80B face. The first charger engagement portion 80X is located closer to the charger electric terminals 80B than the second charger engagement portion 80Y in the direction in which the charger electric terminals 80B face.

Figure 41:
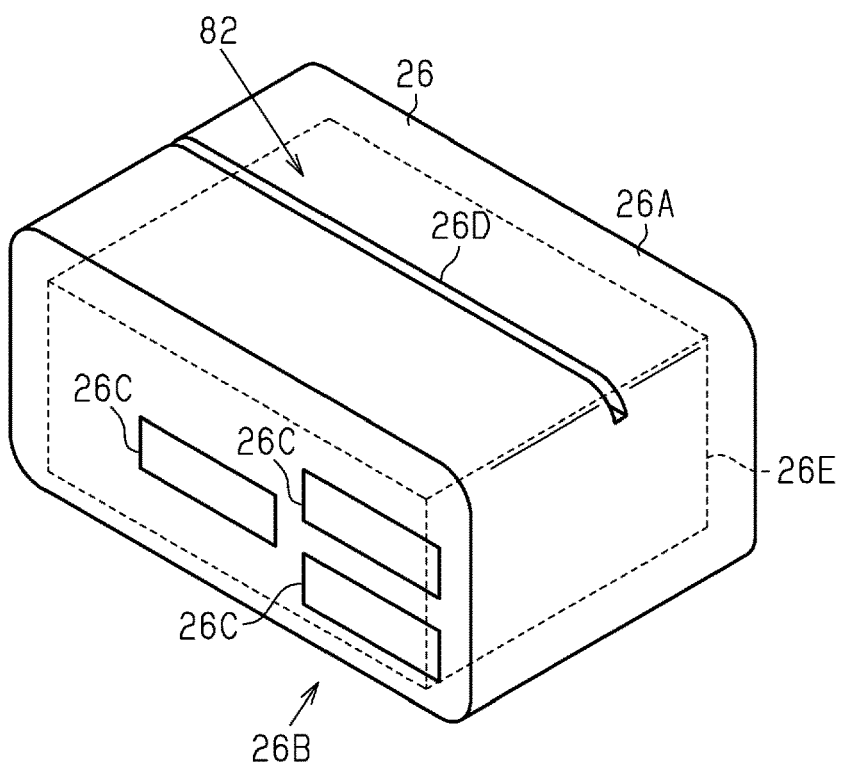
FIG. 41 is a perspective view of a first power source included in the fourteenth embodiment of the component system for the human-powered vehicle.

As shown in FIG. 41, the first housing engagement portion 26D of the present embodiment is a rail extending orthogonal to a direction in which the first terminals 26C face. Engagement of the first charger engagement portion 80X with the first housing engagement portion 26D brings the charger electric terminals 80B into contact with the first terminals 26C.

Figure 42:
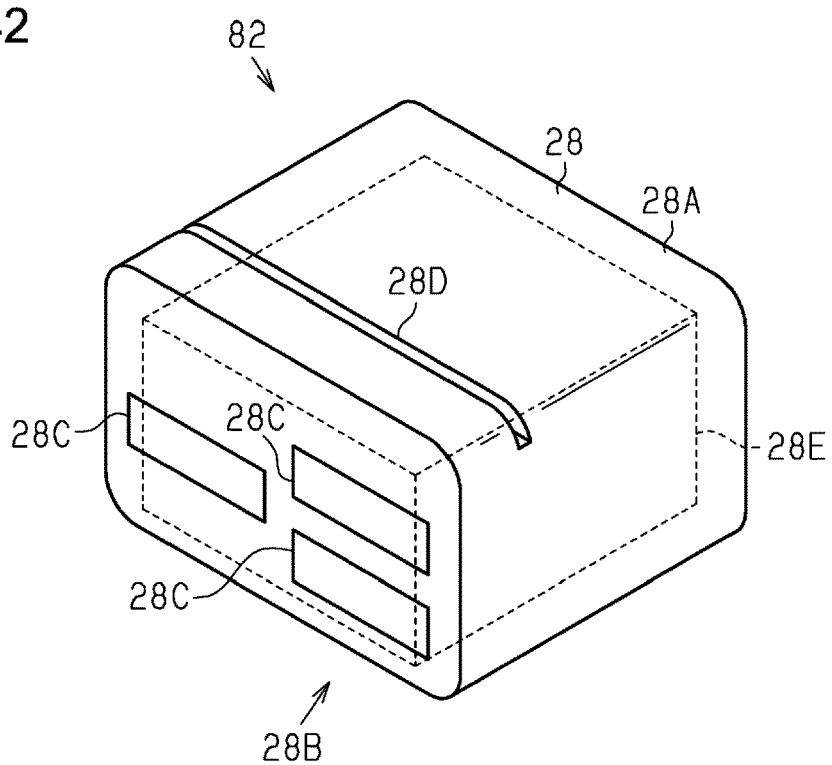
FIG. 42 is a perspective view of a second power source included in the fourteenth embodiment of the component system for the human-powered vehicle.

As shown in FIG. 42, the second housing engagement portion 28D of the present embodiment is a rail extending orthogonal to a direction in which the second terminals 28C face. Engagement of the second charger engagement portion 80Y with the second housing engagement portion 28D brings the charger electric terminals 80B into contact with the second terminals 28C.

Figure 43:
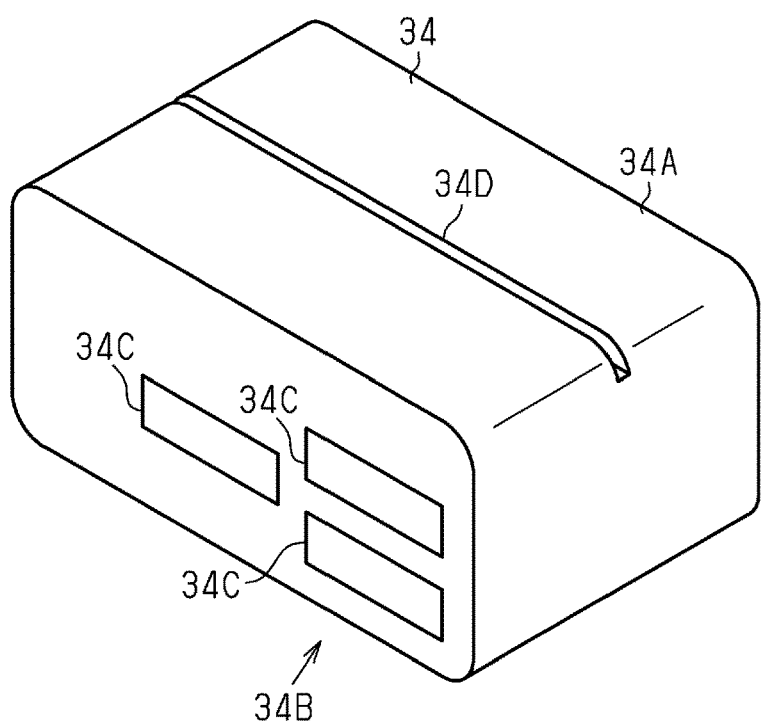
FIG. 43 is a perspective view of a third power source included in the fourteenth embodiment of the component system for the human-powered vehicle.

As shown in FIG. 43, the third housing engagement portion 34D of the present embodiment is a rail extending orthogonal to a direction in which the third terminals 34C face. Engagement of the first charger engagement portion 80X with the third housing engagement portion 34D brings the charger electric terminals 80B into contact with the third terminals 34C.

The description related to the above embodiments exemplifies, without any intention to limit, applicable forms of a component system for a human-powered vehicle, a derailleur for a human-powered vehicle, a rear derailleur for a human-powered vehicle, a charger for use with a component system for a human-powered vehicle, and a power source used for a human-powered vehicle component according to the present invention. The component system for a human-powered vehicle, the derailleur for a human-powered vehicle, the rear derailleur for a human-powered vehicle, the charger for use with a component system for a human-powered vehicle, and the power source used for a human-powered vehicle component according to the present invention can be applied to, for example, modified examples of the embodiments that are described below and combinations of at least two of the modified examples that do not contradict each other. In the following modified examples, same reference characters are given to those elements that are the same as the corresponding elements of the above embodiments. Such elements will not be described in detail.

Figure 44:
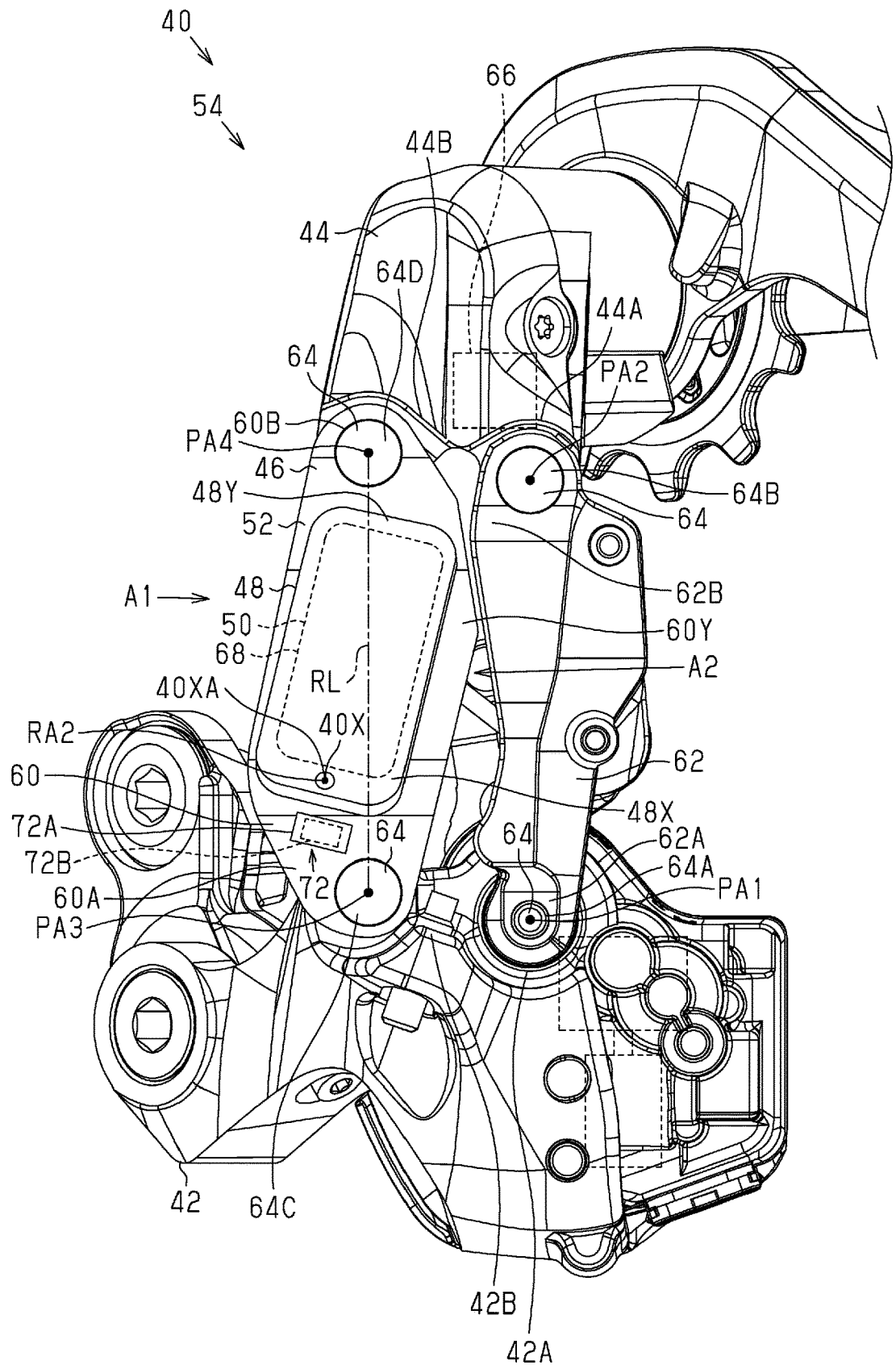
FIG. 44 is a partial plan view of a human-powered vehicle derailleur in a first modified example of a component system for a human-powered vehicle.

As shown in FIG. 44, the motor unit 66 can be arranged on the movable member 44. The motor unit 66 uses the electric motor to pivot the inner link member 62 about the second pivot axis PA2 and move the movable member 44 relative to the base member 42.

The power source receiving part 50 can be configured not to include the accommodation portion 68. In a case where the power source receiving part 50 is configured not to include the accommodation portion 68, for example, the structure of the cover member 48 can be changed as long as movement of the power source 90 disposed on the power source receiving part 50 is restricted.

Figure 45:
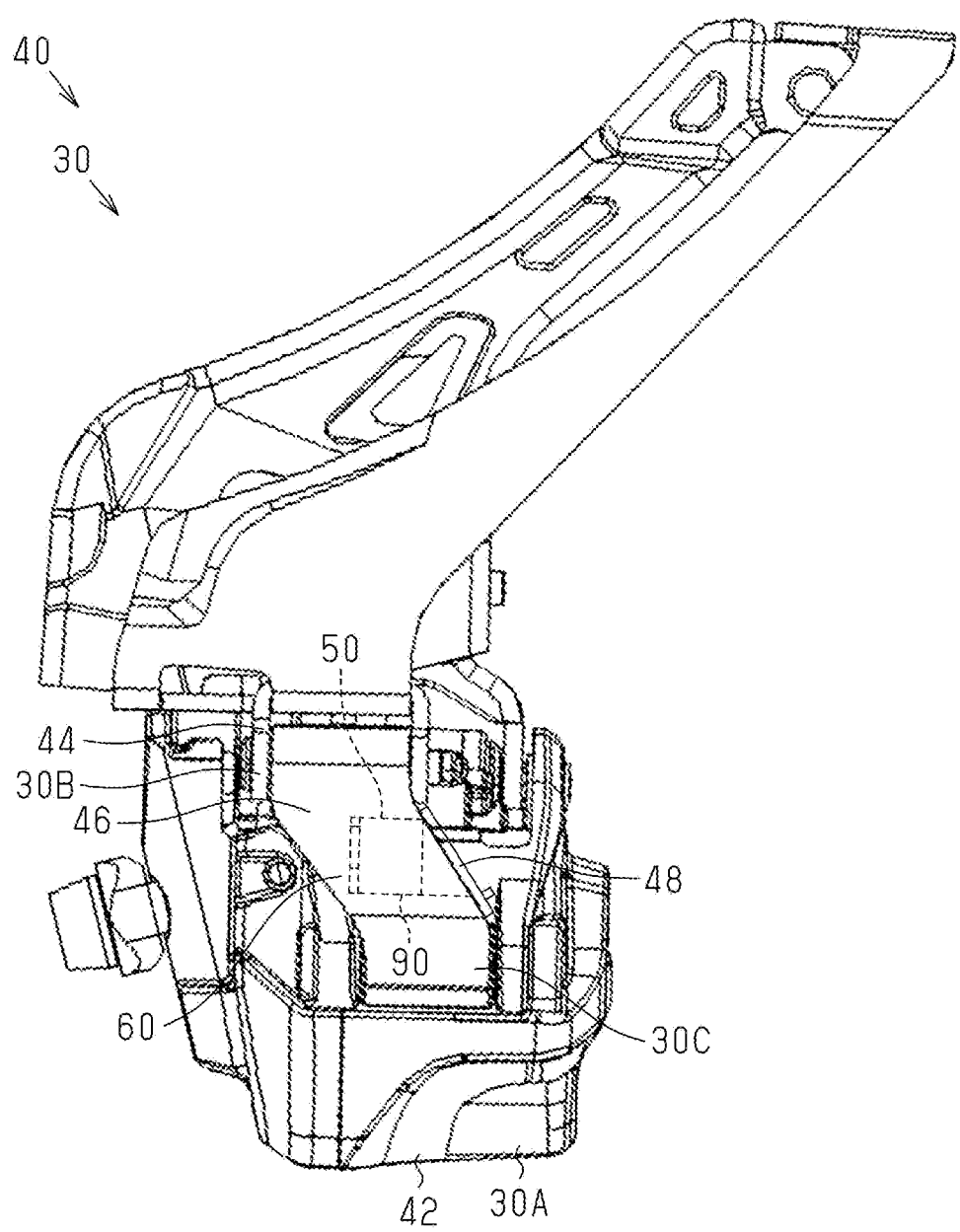
FIG. 45 is a side view of an electric front derailleur included in a second component of a second modified example of a component system for a human-powered vehicle.

As shown in FIG. 45, the derailleur 40 can include the electric front derailleur 30. The base member 30A, the movable member 30B, and the linkage assembly 30C are respectively referred to as the base member 42, the movable member 44, and the linkage assembly 46, in a case where the derailleur 40 includes the electric front derailleur 30. The electric front derailleur 30 includes, for example, the base member 42, the movable member 44, and the linkage assembly 46. The linkage assembly 46 includes, for example, a power source receiving part 50.

Figure 46:
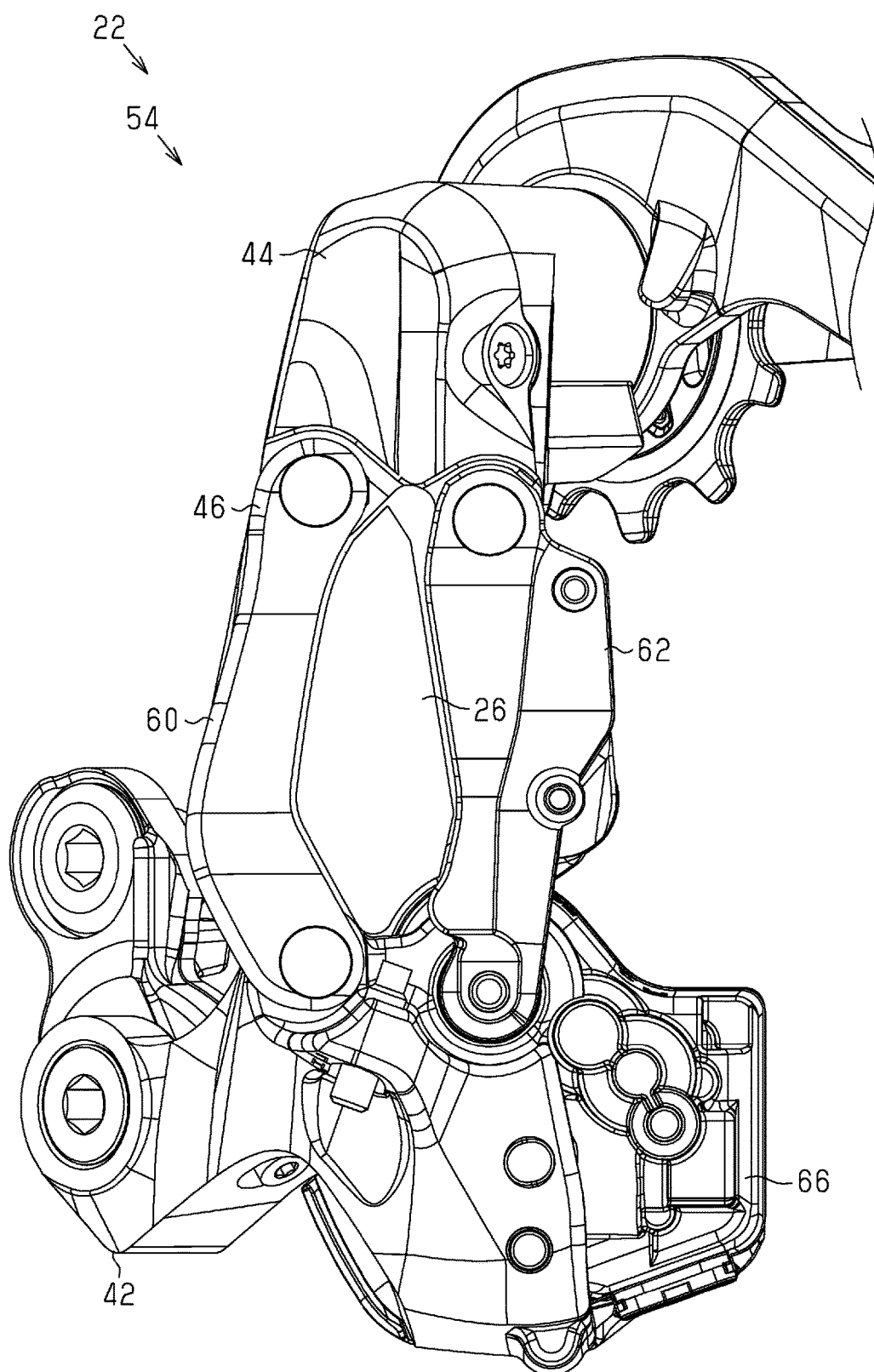
FIG. 46 is a partial plan view of a human-powered vehicle derailleur in a third modified example of a component system for a human-powered vehicle.

As shown in FIG. 46, the first power source 26 can be shaped in accordance with the shape of the first component 22. In FIG. 46, the first power source 26 is disposed between the outer link member 60 and the inner link member 62 of the rear derailleur 54.

Figure 47:
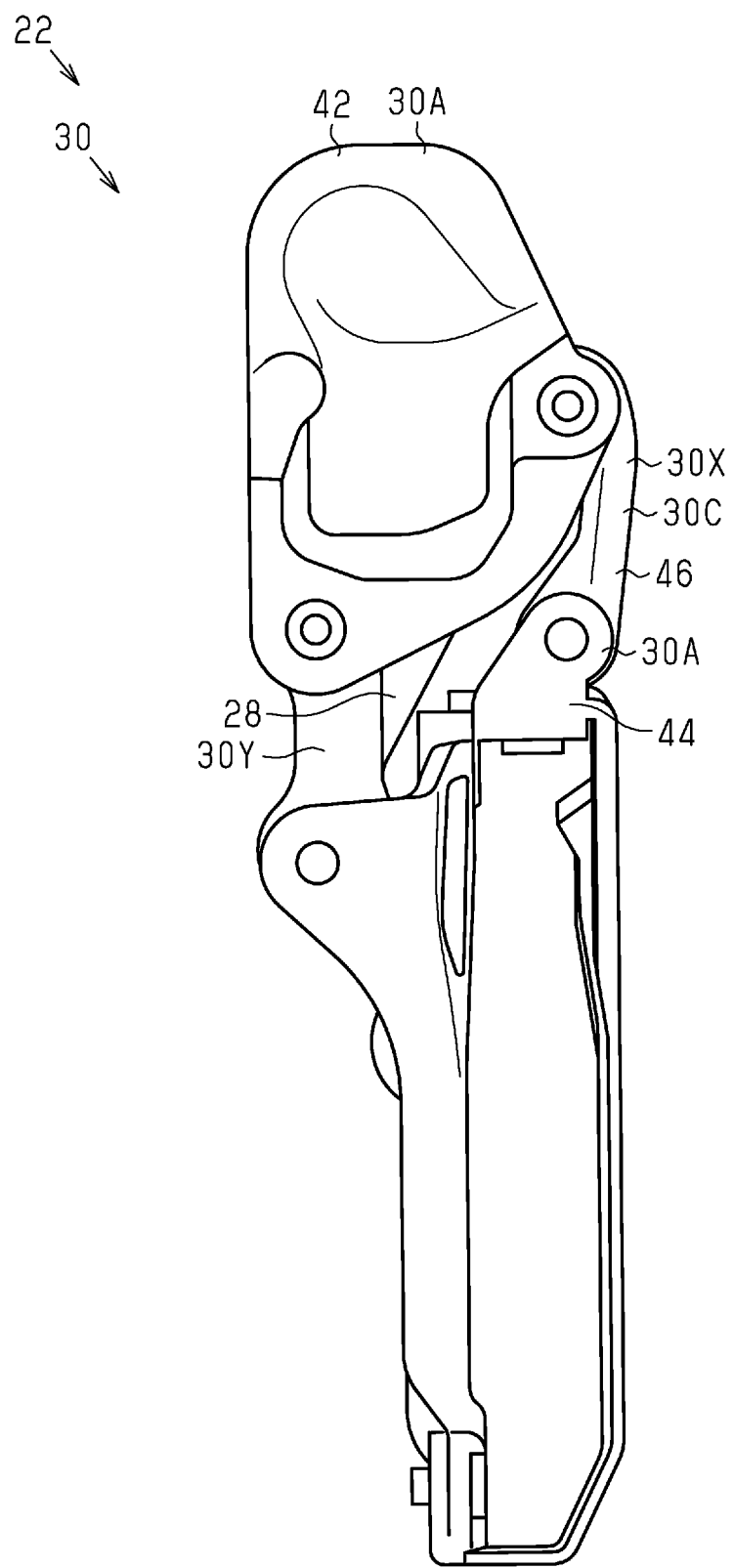
FIG. 47 is a plan view of an electric front derailleur included in a second component of a fourth modified example of a component system for a human-powered vehicle.

As shown in FIG. 47, the second power source 28 can be shaped in accordance with the shape of the second component 24. As shown in FIG. 47, the second power source 28 is disposed between an outer link member 30X and an inner link member 30Y of the electric front derailleur 30.

The linkage assembly 46 can be configured to include only the outer link member 60, and the at least one link pin 64 can be configured to include only the third link pin 64C and the fourth link pin 64D.

Figure 48:
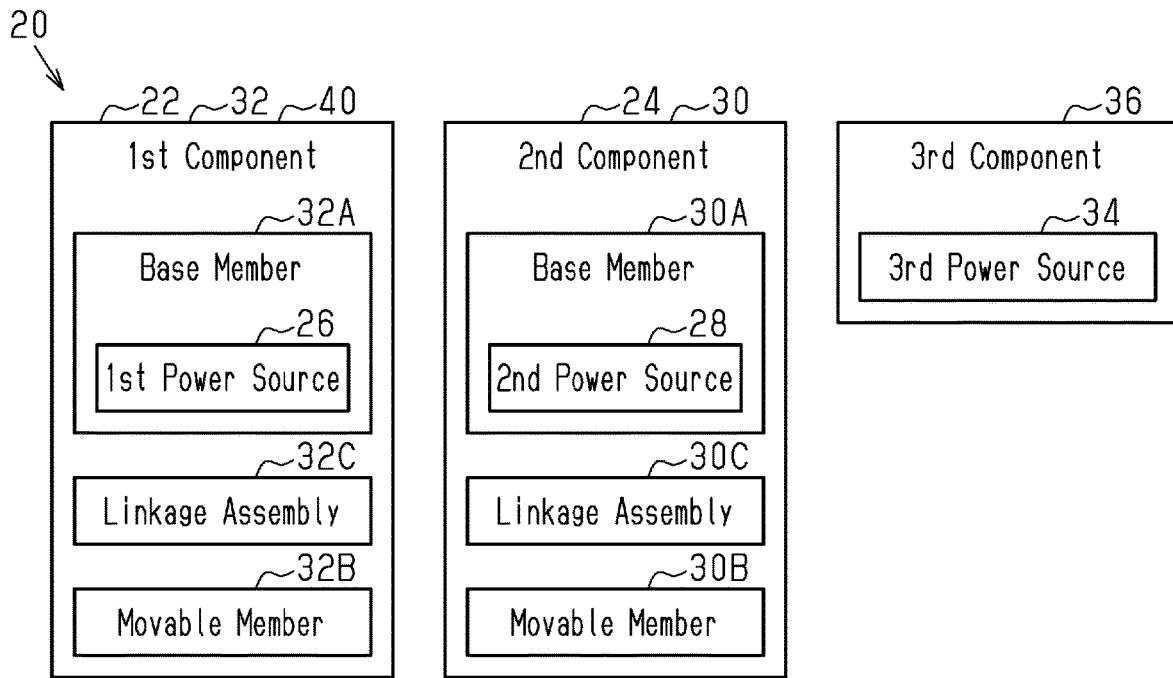
FIG. 48 is a first example of a block diagram showing the electrical configuration of a fifth modified example of a component system for a human-powered vehicle.

As shown in FIG. 48, the first power source 26 can be arranged on the base member 32A of the electric rear derailleur 32. The second power source 28 can be arranged on the base member 30A of the electric front derailleur 30.

Figure 49:
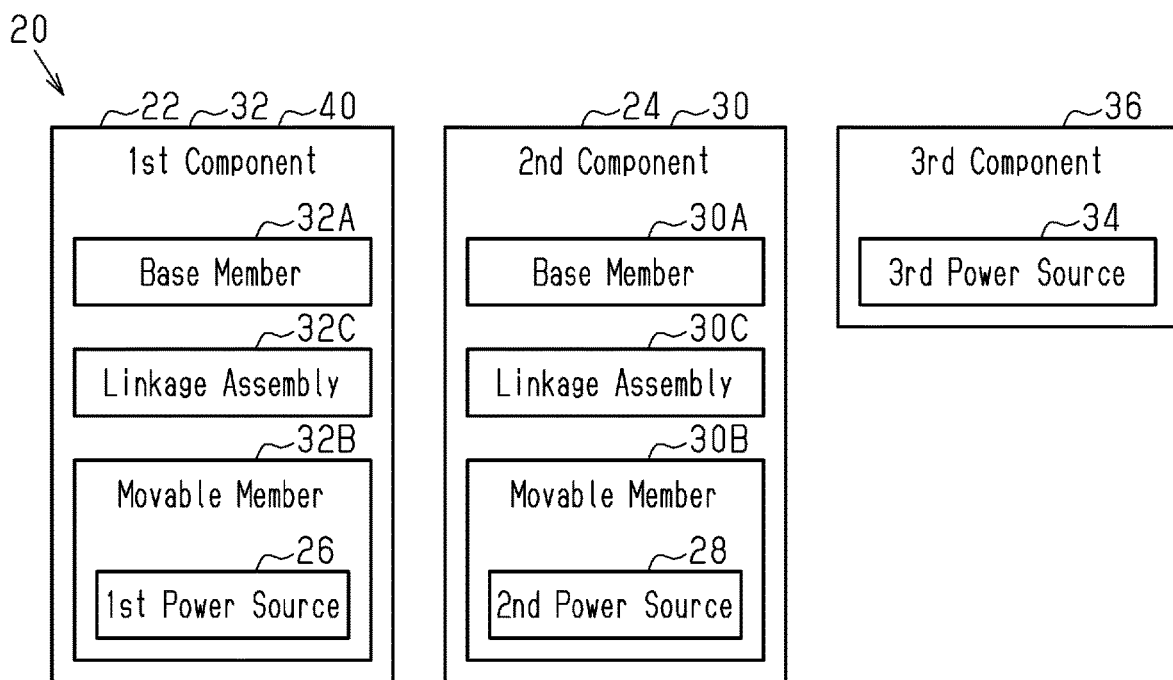
FIG. 49 is a second example of a block diagram showing the electrical configuration of a sixth modified example of a component system for a human-powered vehicle.

As shown in FIG. 49, the first power source 26 can be arranged on the movable member 32B of the electric rear derailleur 32. The second power source 28 can be arranged on the movable member 30B of the electric front derailleur 30.

In the first to fifth, seventh to eleventh, and thirteenth embodiments, the first end 48X can be configured to be arranged closer to the damping structure 58 than the second end 48Y in a state where the cover member 48 is coupled to the at least one link member 52.

The relationship between the power source receiving part 50 and the reference line RL can be changed. For example, as viewed in a direction parallel to at least one of the third pivot axis PA3 and the fourth pivot axis PA4, a first region A1 and a second region A2 are defined. The first region A1 includes one part of a region divided by the reference line RL as viewed in a direction parallel to at least one of the third pivot axis PA3 and the fourth pivot axis PA4. The second region A2 includes the other part of the region divided by the reference line RL as viewed in a direction parallel to at least one of the third pivot axis PA3 and the fourth pivot axis PA4. The power source receiving part 50 can include a portion located in the second region A2 and a portion located in the first region A1 that is smaller than the portion located in the second region A2

The power source receiving part 50 can be formed separately from the outer link member 60. The power source receiving part 50 can be, for example, formed so as to be detachably attached to a recess of the outer link member 60.

The power source receiving part 50 can include a material differing from that of the outer link member 60. In a case where the outer link member 60 is formed of a metal member, the power source receiving part 50 can include a resin member.

Figure 33:
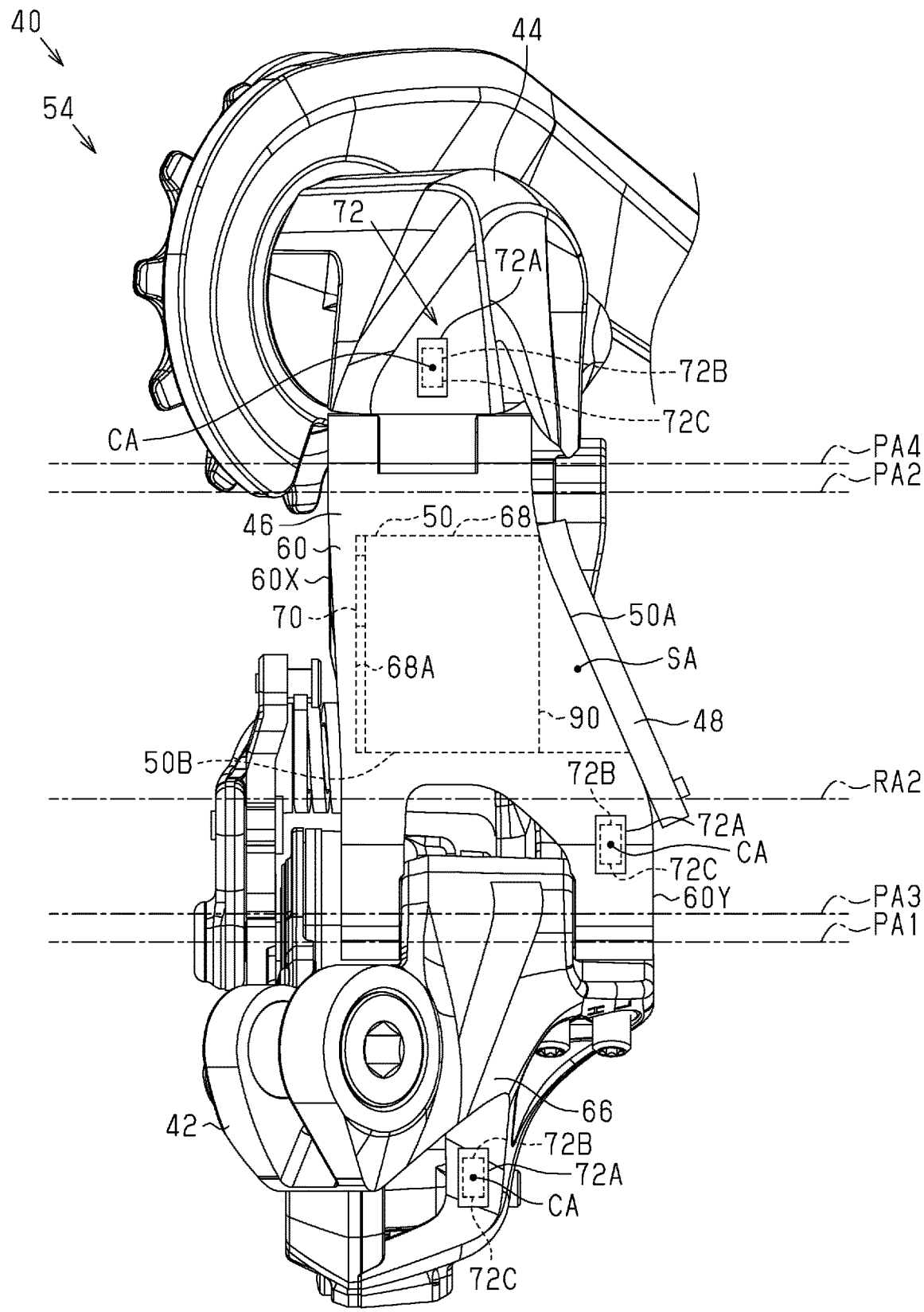
FIG. 33 is a partial side view showing an eleventh embodiment of a human-powered vehicle derailleur.

As shown in FIG. 33, in the first to ninth, twelfth, and thirteenth embodiments, the linkage assembly 46 can include at least one link pin 64 pivotally attaching the linkage assembly 46 to one of the movable member 44 and the base member 42. The electric port 72 can be arranged on the linkage assembly 46. In this modified example, the electric port 72 can be arranged on the linkage assembly 46, and the cable receiving opening axis CA can be inclined relative to the axis of the at least one link pin 64. The electric port 72 can be arranged on a side surface of the outer link member 60 so that the cable receiving opening axis CA is orthogonal to the axis of the at least one link pin 64. The electric port 72 can be arranged on an upward facing surface of the outer link member 60 so that the cable receiving opening axis CA is inclined relative to the axis of the at least one link pin 64. The electric port 72 can be arranged on a downward facing surface of the outer link member 60 so that the cable receiving opening axis CA is inclined relative to the axis of the at least one link pin 64.

Figure 50:
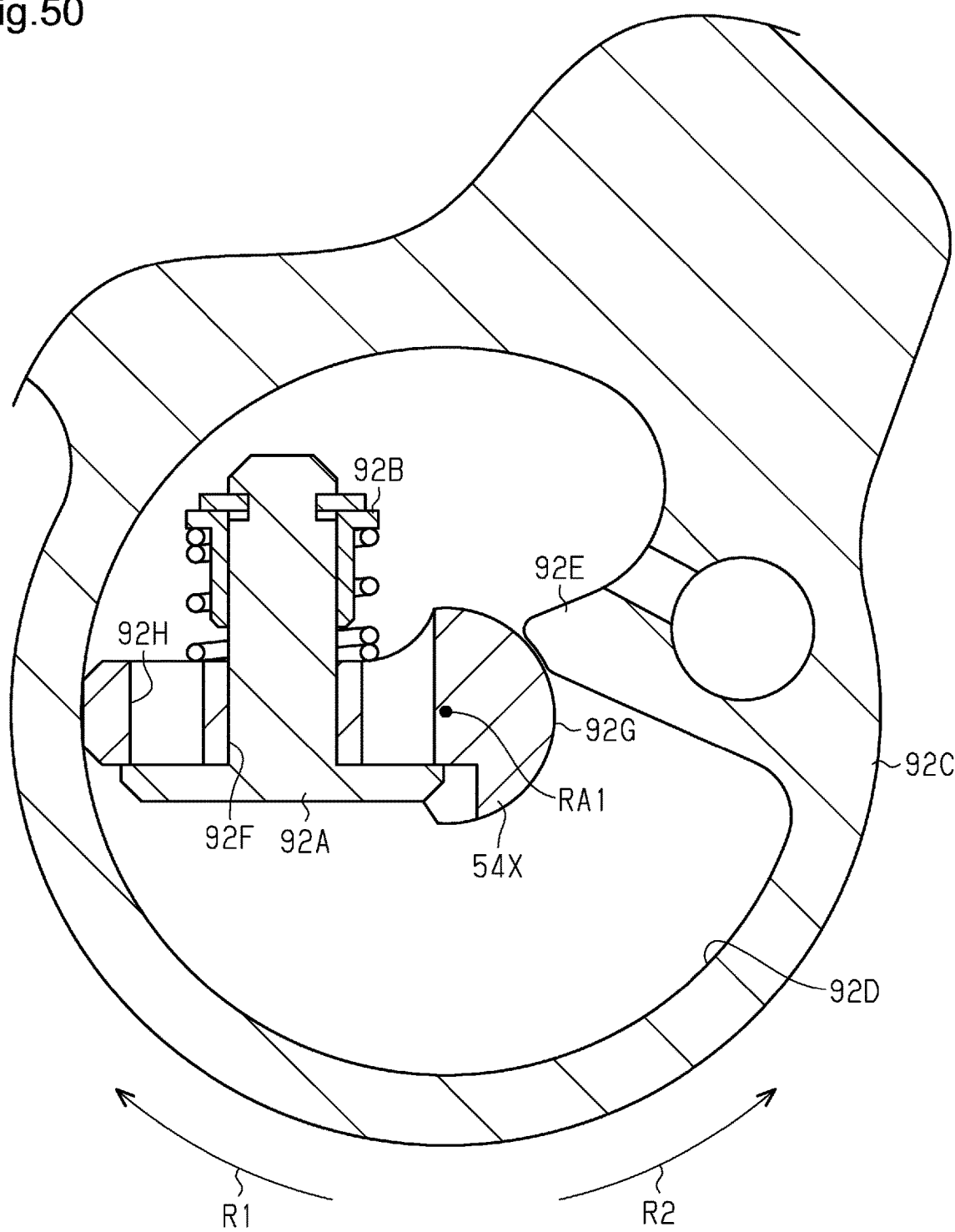
FIG. 50 is a cross-sectional view showing a damping structure including a fluid damper in a seventh modified example.
Figure 51:
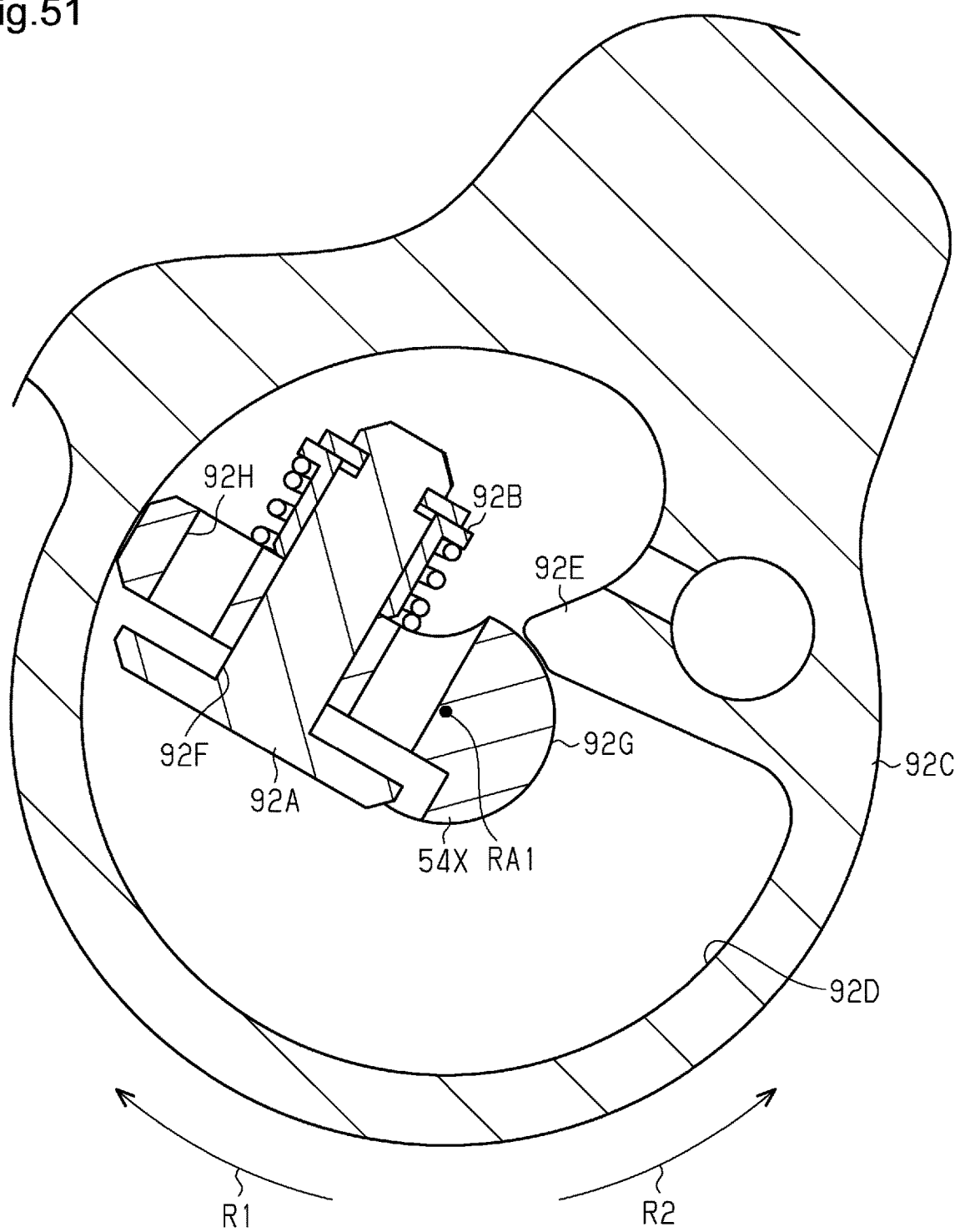
FIG. 51 is a cross-sectional view of the damping structure shown in FIG. 50 in a state where the rotation shaft is rotated in one of the rotational directions.

As shown in FIGS. 50 and 51, the damping structure 58 can include a fluid damper configured to apply fluid resistance to the pulley assembly 56 when the pulley assembly 56 rotates in the second rotational direction R2. The fluid is, for example, oil. The damping structure 58 is, for example, a hydraulic damper. In a case where the damping structure 58 is configured to apply fluid resistance, wear of the components is limited. This facilitates maintenance.

As shown in FIGS. 9 and 50, the damping structure 58 includes a piston 92A, a piston support 92B, and the rotational shaft 54X, and a housing 92C. The piston 92A is supported by the piston support 92B. The housing 92C includes a fluid chamber 92D and a protrusion 92E. The rotational shaft 54X includes a hole 92F into which the piston 92A is inserted, a semicircular portion 92G in contact with the protrusion 92E of the housing 92C, and a hole 92H through which the fluid flows. The semicircular portion 92G has a smooth surface. The protrusion 92E smoothly moves on the circumference of the semicircular portion 92G.

The housing 92C is connected to the movable member 44. The rotational shaft 54X is connected to the pulley assembly 56. The rotational shaft 54X rotates integrally with the pulley assembly 56 about the rotational axis RA2.

In a case where the pulley assembly 56 rotates relative to the movable member 44 in the second rotational direction R2, the fluid in the fluid chamber 92D moves the piston 92A in a direction in which a flange of the piston 92A closes the hole 92H. The flange of the piston 92A restricts movement of the fluid through the hole 92H. When the hole 92H is closed by the flange of the piston 92A, the fluid moves through the gap between the semicircular portion 92G and the protrusion 92E. The fluid resistance hinders movement of the pulley assembly 56.

As shown in FIG. 51, in a case where the pulley assembly 56 moves relative to the movable member 44 in the opposite direction of the pulley assembly 56, namely, the first rotational direction R1, the fluid in the fluid chamber 92D moves the piston 92A in a direction in which the flange of the piston 92A opens the hole 92H. This allows the fluid to move through the hole 92H, thereby reducing the fluid resistance to movement of the pulley assembly 56. As a result, the pulley assembly 56 readily moves in the first rotational direction R1.

The cover member 48 can be pivotally attached to and slidable on the outer link member 60. The cover member 48 can be configured to slide on the outer link member 60 and switch between a pivot allowed state and a pivot restricted state. For example, in the cover attachment state, the cover member 48 is configured to accommodate the pivot mechanism 40X in the recess of the outer link member 60 so that the pivot mechanism 40X does not function. The cover member 48 is configured to slide so that the pivot mechanism 40X projects out of the recess of the outer link member 60 when switching from the cover attachment state to the cover detachment state. The cover member 48 is configured to be rotatable about a pivot axis 40XA when the pivot mechanism 40X projects out of the recess of the outer link member 60.

As shown in FIG. 15, the electric port 72 can be arranged on the base member 42. The electric port 72 of the base member 42 is, for example, used to perform at least one of charging of the power source 90, wired communication with a component 14 that differs from the derailleur 40, and wired communication with the external device 106. The electric port 72 of the base member 42 is, for example, used to perform at least charging of the power source 90. For example, in a case where a power source 90 that is arranged on the power source receiving part 50 is a rechargeable battery, the electric port 72 of the base member 42 is used to perform charging of the power source 90 arranged on the power source receiving part 50. The electric port 72 of the base member 42 can be configured to be supplied with electric power from a power source arranged on the component 14 differing from the derailleur 40. The electric port 72 on the base member 42 is, for example, configured to supply the motor unit 66 with electric power supplied from the power source arranged on the component 14 differing from the derailleur 40. The electric port 72 of the base member 42 can be configured to supply the motor unit 66 with electric power supplied from the power source arranged on the component 14 differing from the derailleur 40 in a case where the power source 90 is not arranged on the power source receiving part 50. The electric port 72 on the base member 42 can be configured to supply the motor unit 66 with electric power supplied from the power source arranged on the component 14 differing from the derailleur 40 in a case where the voltage of the power source 90 is less than or equal to a predetermined value.

The first charger engagement portion 80X can be the charger engagement portion 80C of the first embodiment, and the second charger engagement portion 80Y can be the charger engagement portion 80C of the twelfth embodiment. The first charger engagement portion 80X can be the charger engagement portion 80C of the twelfth embodiment, and the second charger engagement portion 80Y can be the charger engagement portion 80C of the first embodiment.

Figure 52:
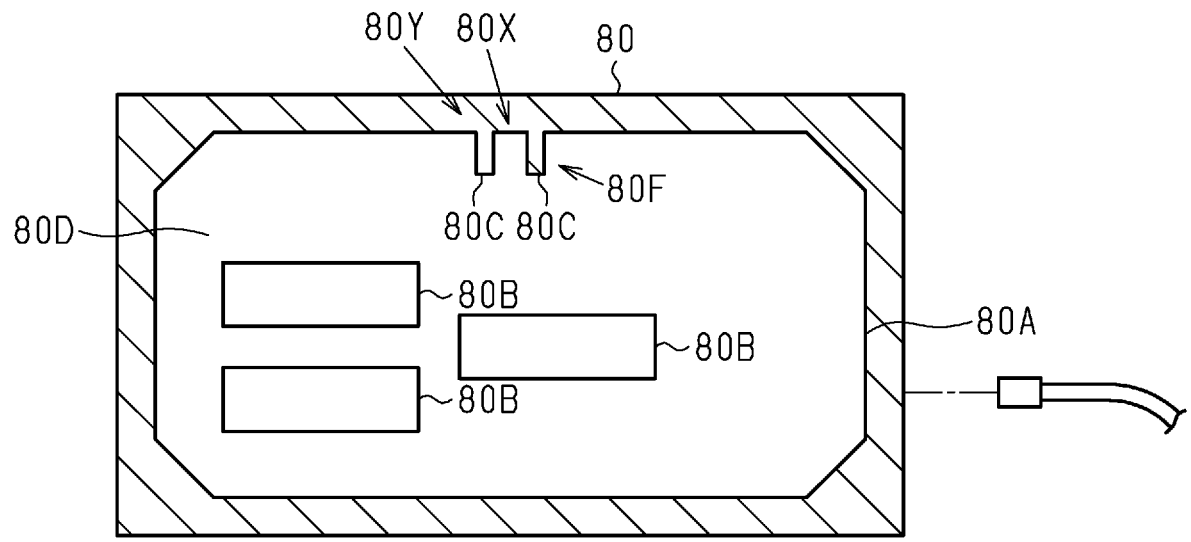
FIG. 52 is a schematic diagram of a charger for use with a component system for a human-powered vehicle in an eighth modified example.
Figure 53:
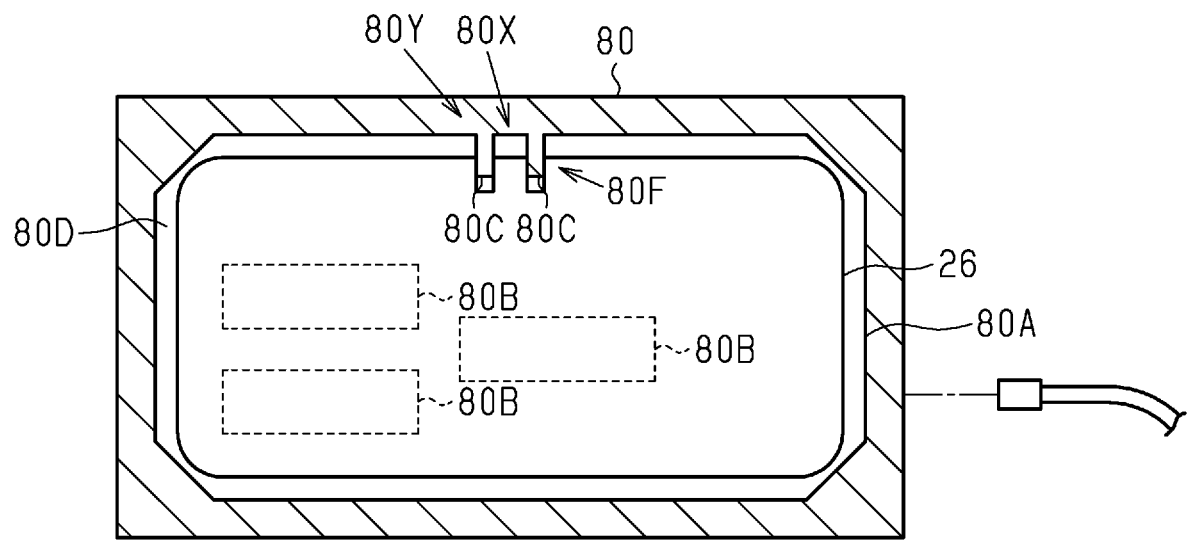
FIG. 53 is a schematic diagram of the charger shown in FIG. 52 into which the first power source is inserted.

As shown in FIGS. 52 to 55, the charger 80 can be configured to include one charger engagement portion 80C that engages with the first housing 26A of the first power source 26, the second housing 28A of the second power source 28, and the third housing 34A of the third power source 34. As shown in FIG. 52, the charger engagement portion 80C includes a charger rail 80F The positional relationship between the charger rail 80F of the charger engagement portion 80C and the charger electric terminal 80B is set in the same manner as the positional relationship between the rail of the first housing engagement portion 26D of and the first power source electric terminal 26B of the first power source 26. Thus, as shown in FIG. 53, the first housing 26A engages with the charger 80.

Figure 54:
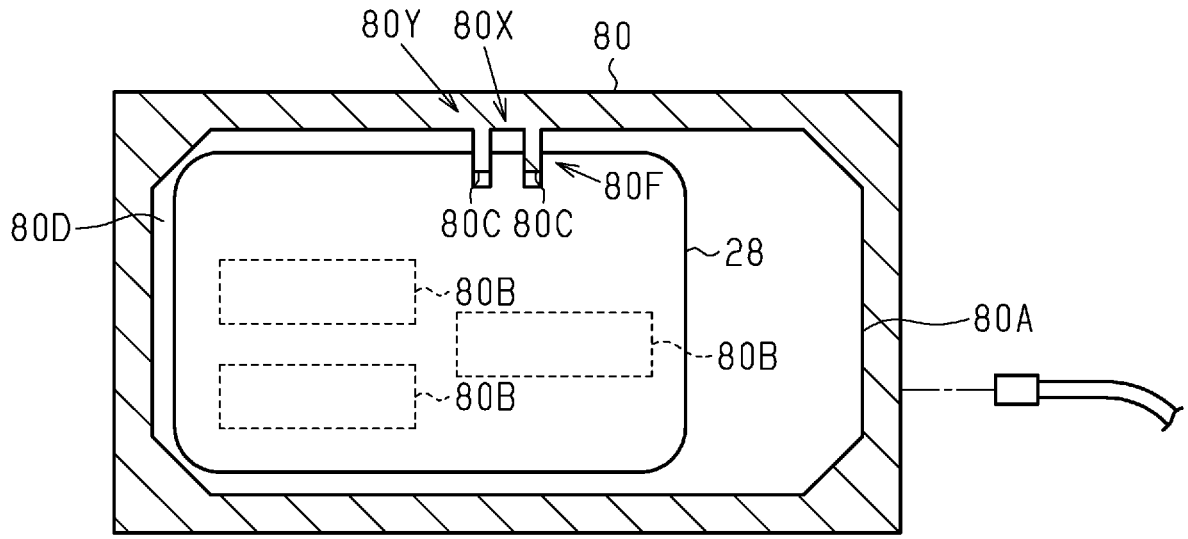
FIG. 54 is a schematic diagram of the charger shown in FIG. 52 into which the second power source is inserted.

The positional relationship between the rail of the second housing engagement portion 28D and the second power source electric terminal 28B of the second power source 28 is set in the same manner as the positional relationship between the rail of the first housing engagement portion 26D of and the first power source electric terminal 26B of the first power source 26. Thus, as shown in FIG. 54, the second housing 28A engages with the charger 80.

Figure 55:
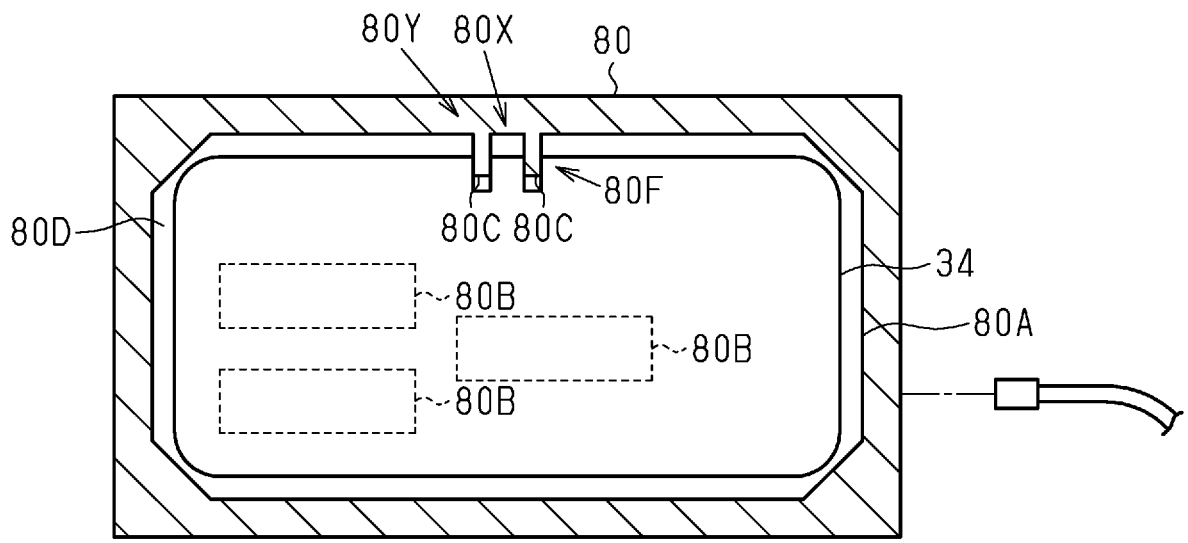
FIG. 55 is a schematic diagram of the charger shown in FIG. 52 into which the third power source is inserted.

The positional relationship between the rail of the third housing engagement portion 34D and the third power source electric terminal 34B of the third power source 34 is set in the same manner as the positional relationship between the rail of the first housing engagement portion 26D of and the first power source electric terminal 26B of the first power source 26. Thus, as shown in FIG. 55, the third housing 34A engages with the charger 80.

In the twelfth embodiment, the charger engagement portion 80C can be, for example, engaged with the first housing 26A by a mechanism differing from the first attachment engagement portion 22C and engaged with the second housing 28A by a mechanism differing the second attachment engagement portion 24C. The first attachment engagement portion 22C of the first component 22 can include, for example, the first rail 22D and the first attachment end part 22E. The second attachment engagement portion 24C of the second component 24 can include, for example, the second rail 24D and the second attachment end part 24E.

Figure 56:
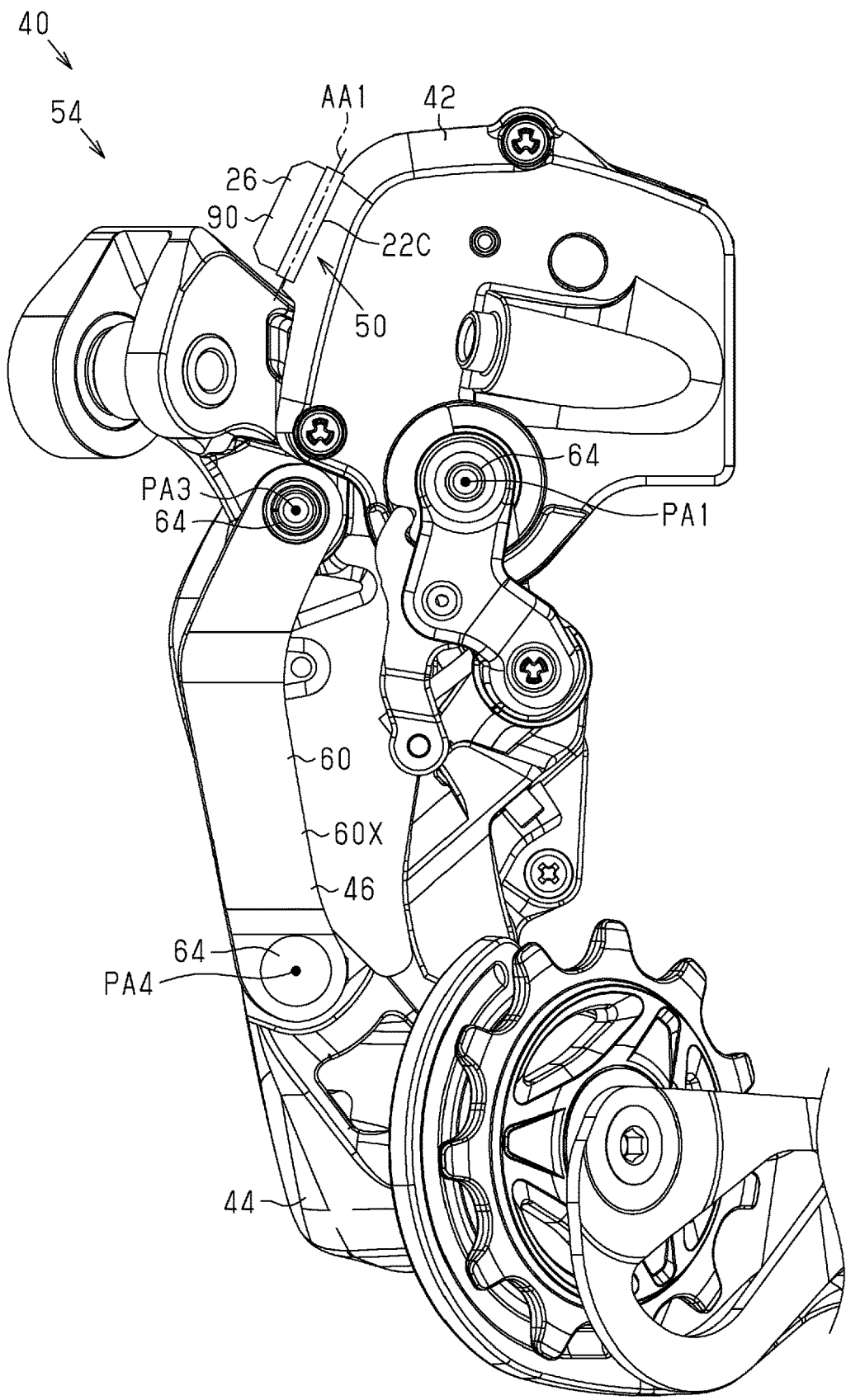
FIG. 56 is a partial plan view of a human-powered vehicle derailleur in a ninth modified example of a component system for a human-powered vehicle.

As shown in FIG. 56, in the twelfth embodiment, the power source receiving part 50 can be arranged on a side portion of the base member 42. The power source 90 is attached to the side portion of the base member 42.

Figure 57:
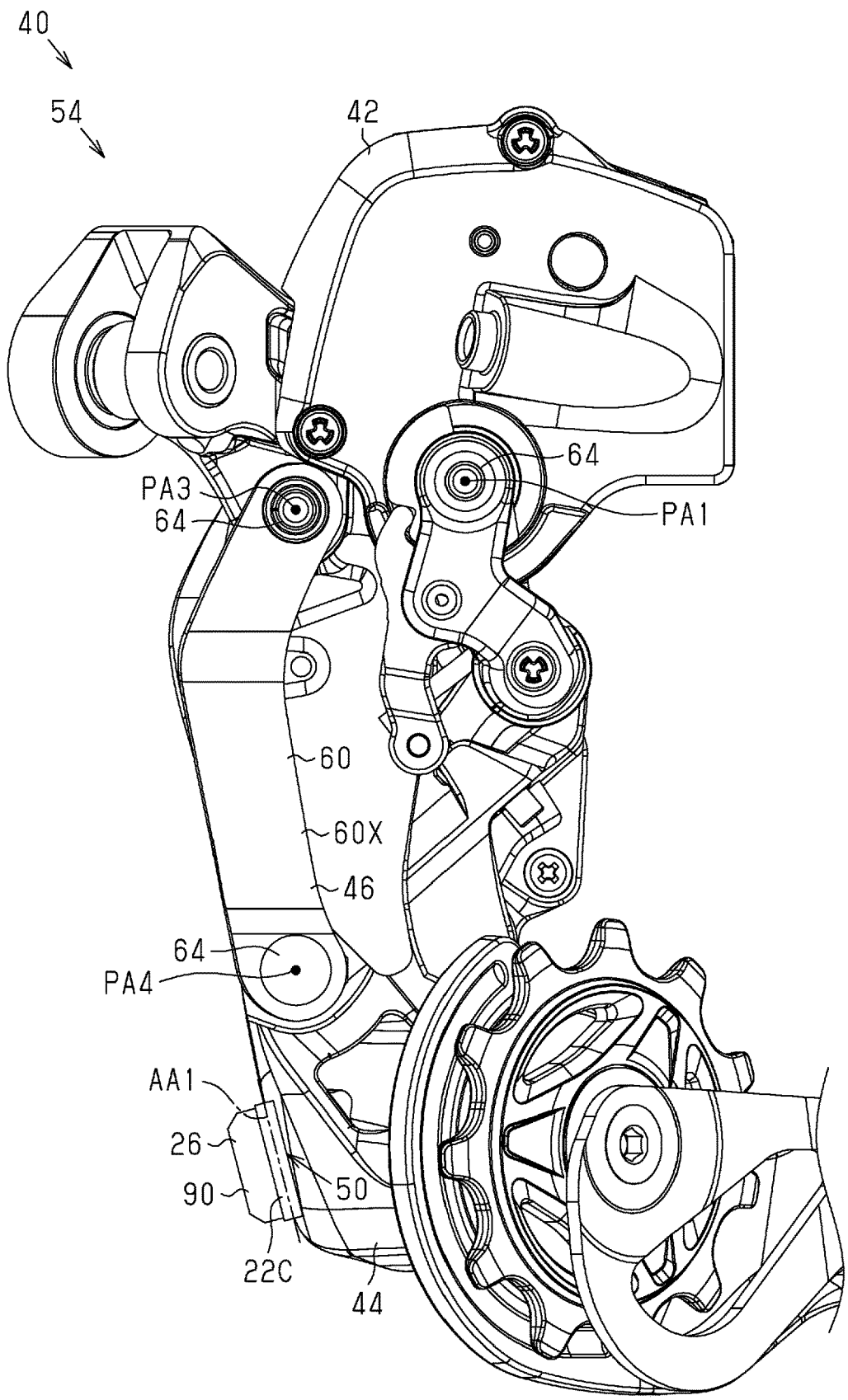
FIG. 57 is a partial plan view of a human-powered vehicle derailleur in a tenth modified example of a component system for a human-powered vehicle.

As shown in FIG. 57, in the twelfth embodiment, the power source receiving part 50 can be arranged on a side portion of the movable member 44. The power source 90 is attached to the side portion of the movable member 44.

Figure 58:
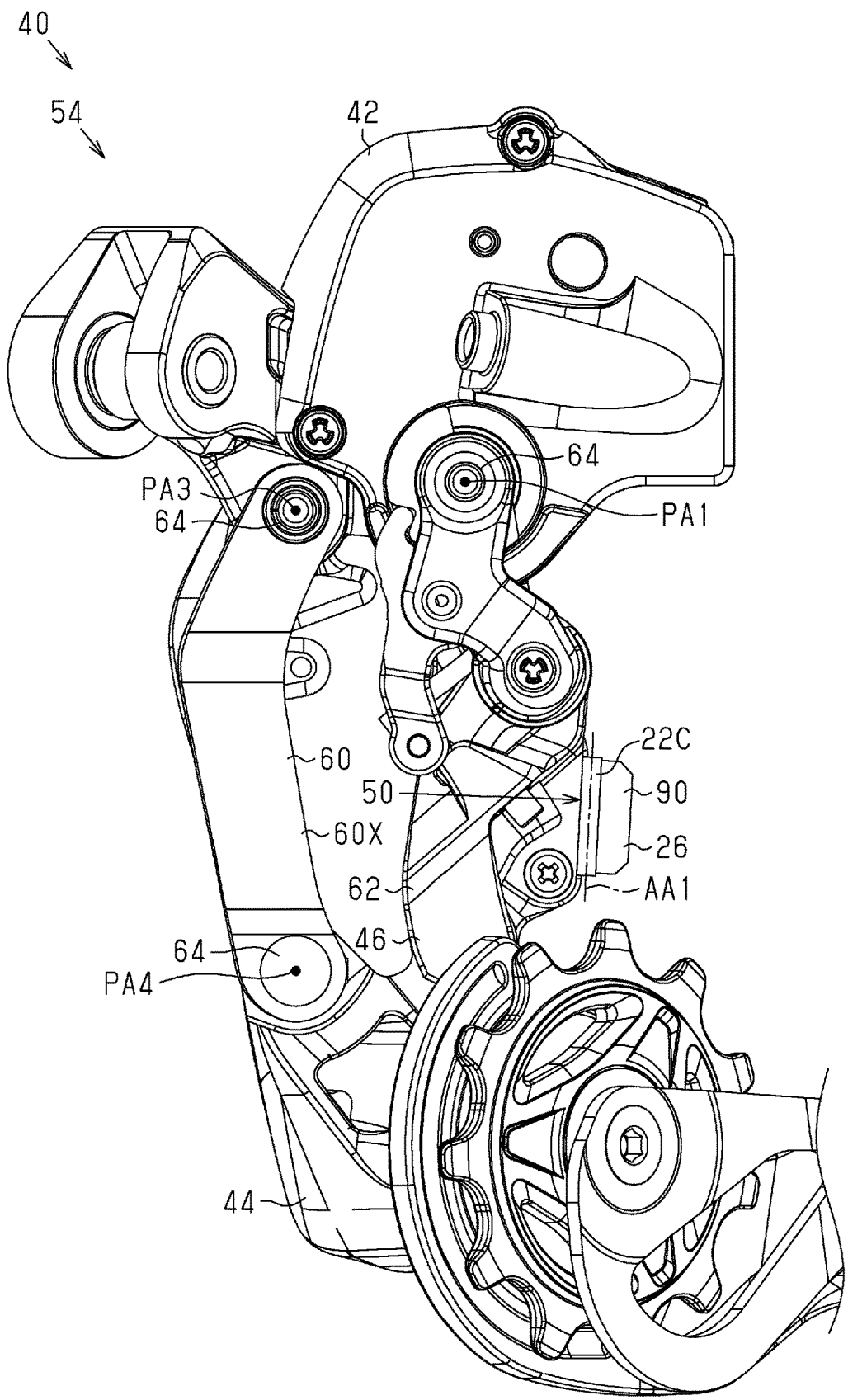
FIG. 58 is a partial plan view of a human-powered vehicle derailleur in an eleventh modified example of a component system for a human-powered vehicle.

As shown in FIG. 58, in the twelfth embodiment, the power source receiving part 50 can be arranged on a side portion of the linkage assembly 46 so as to be located between the linkage assembly 46 and the human-powered vehicle 10. The power source 90 is attached to a side portion of the inner link member 62 of the linkage assembly 46.

Figure 59:
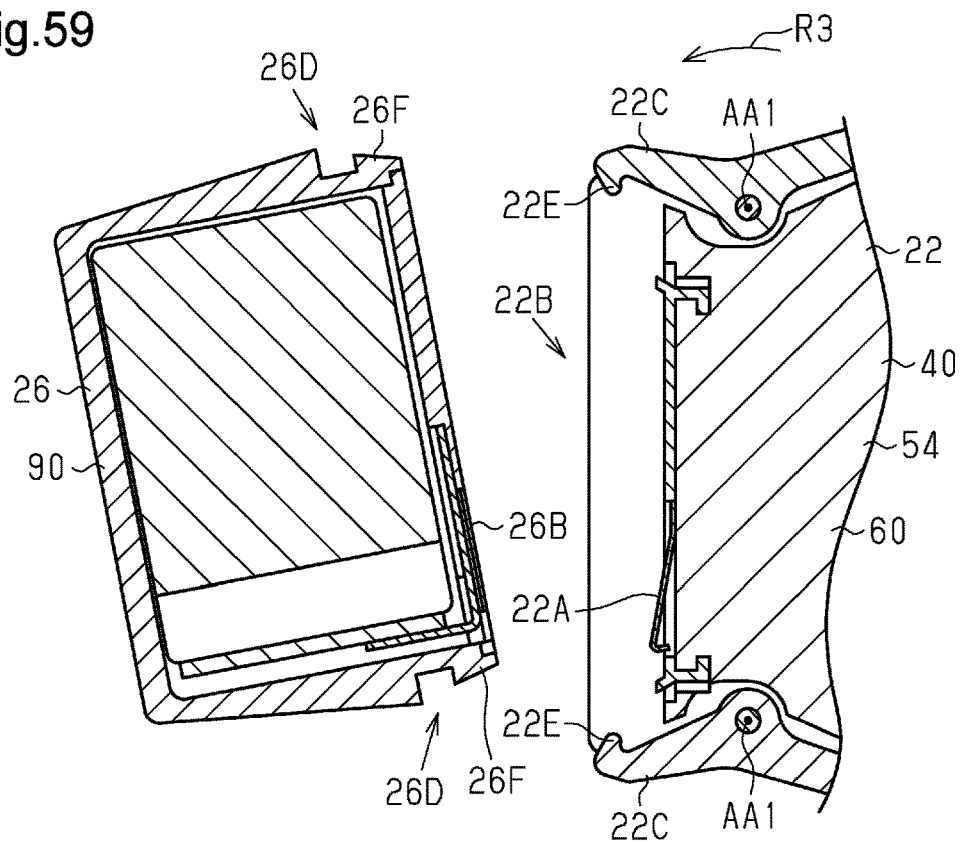
FIG. 59 is a cross-sectional view of a first power source and part of a first component in a twelfth modified example of a component system for a human-powered vehicle.

As shown in FIG. 59, in the twelfth embodiment, the first attachment engagement portion 22C can include a plurality of first attachment engagement portions 22C. For example, two first attachment engagement portions 22C are rotatably attached to the first component 22. The two first attachment engagement portions 22C clamp the first power source 26 so that the first power source 26 is arranged on the first attachment 22B.

Figure 60:
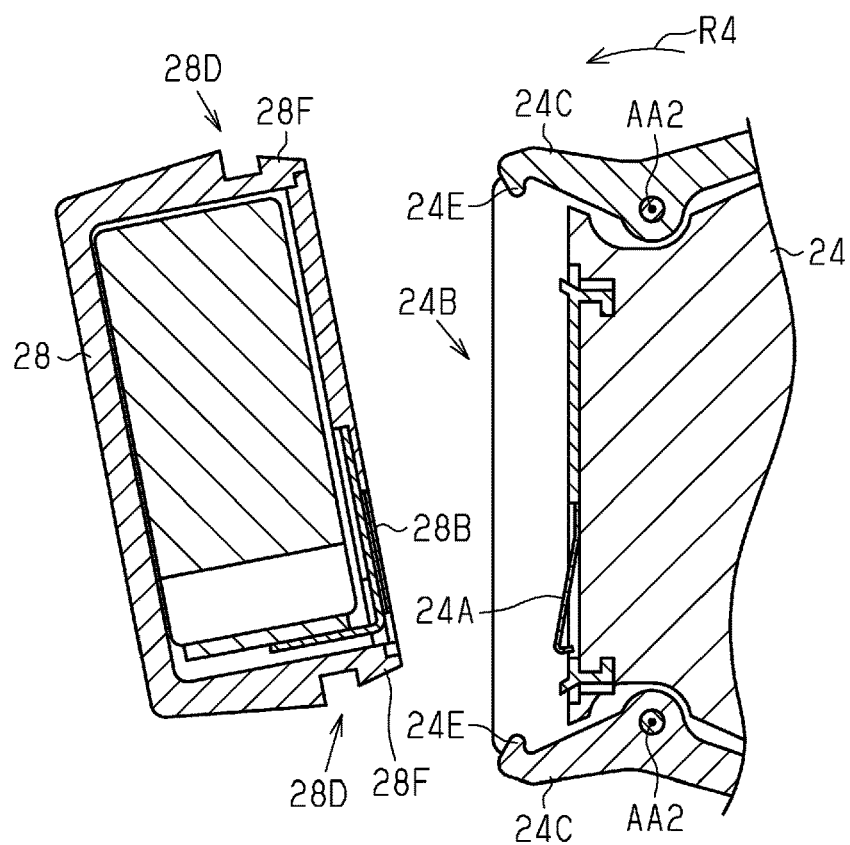
FIG. 60 is a cross-sectional view of a second power source and part of a second component in the twelfth modified example of the component system for the human-powered vehicle.

As shown in FIG. 60, in the twelfth embodiment, the second attachment engagement portion 24C can include a plurality of second attachment engagement portions 24C. For example, two second attachment engagement portions 24C are rotatably attached to the second component 24. The two second attachment engagement portions 24C clamp the second power source 28 so that the second power source 28 is arranged on the second attachment 24B.

Figure 61:
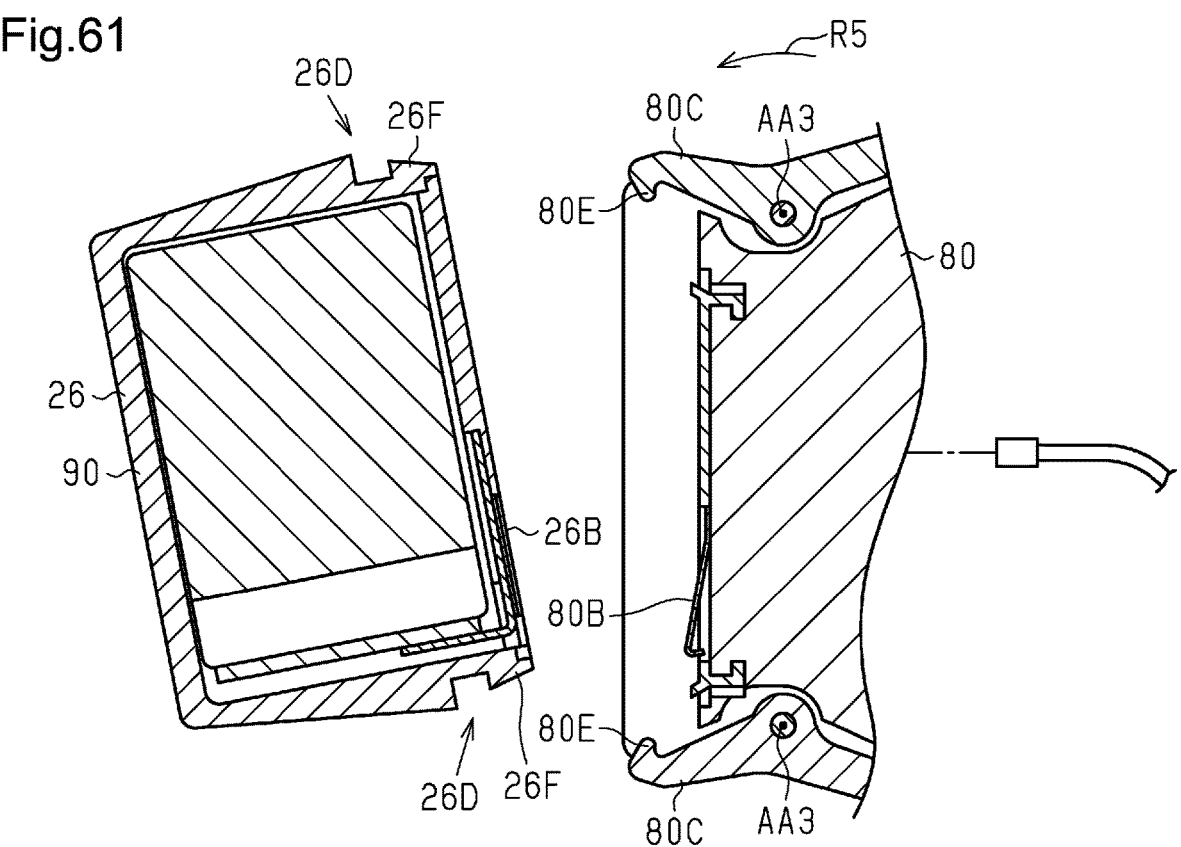
FIG. 61 is a schematic diagram of a first power source and a charger in the twelfth modified example of the component system for the human-powered vehicle.

As shown in FIG. 61, in the twelfth embodiment, the charger engagement portion 80C can include a plurality of charger engagement portions 80C. The two charger engagement portions 80C are, for example, rotatably attached to the charger 80. The two charger engagement portions 80C clamp the first power source 26 or the second power source 28 to hold the first power source 26 or the second power source 28.

In the thirteenth embodiment, for example, the battery capacity of the first power source element 26E can be the same as the battery capacity of the second power source element 28E.

In this specification, the phrase "at least one of" as used in this disclosure means "one or more" of a desired choice. As one example, the phrase "at least one of" as used in this disclosure means "only one choice" or "both of two choices" in a case where the number of choices is two. In another example, in this specification, the phrase "at least one of" as used in this disclosure means "only one single choice" or "any combination of equal to or more than two choices" if the number of its choices is equal to or more than three.

What is claimed is:

1. A derailleur for a human-powered vehicle, the derailleur comprising:
   a base member configured to be attached to a frame of the human-powered vehicle, the base member including a first base member connecting section and a second base member connecting section;
   a movable member movably arranged relative to the base member, the movable member including a first movable member connecting section and a second movable member connecting section; and
   a linkage assembly movably connecting the base member and the movable member, the linkage assembly including:
   an inner link member having a first inner link end portion and a second inner link end portion; and
   an outer link member at least partially overlying the inner link member as viewed in a direction facing toward the frame in a state where the base member is attached to the frame, the outer link member having a power source receiving part, a first outer link end portion, and a second outer link end portion;
   the first inner link end portion being pivotally coupled to the first base member connecting section about a first pivot axis,
   the second inner link end portion being pivotally coupled to the first movable member connecting section about a second pivot axis,
   the first outer link end portion being pivotally coupled to the second base member connecting section about a third pivot axis,
   the second outer link end portion being pivotally coupled to the second movable member connecting section about a fourth pivot axis, and
   the power source receiving part being configured to be arranged such that the power source receiving part traverses a reference line extending between the third pivot axis and the fourth pivot axis.

2. The derailleur according to claim 1, wherein:
as viewed in a direction parallel to at least one of the third pivot axis and the fourth pivot axis, one part of a region divided by the reference line defines a first region and the other part of the region divided by the reference line defines a second region; and
the power source receiving part includes a portion located in the second region and a portion located in the first region that is larger than the portion located in the second region.

3. The derailleur according to claim 1, wherein:
as viewed in a direction parallel to at least one of the third pivot axis and the fourth pivot axis, one part of a region divided by the reference line defines a first region and the other part of the region divided by the reference line defines a second region; and
the power source receiving part includes a portion located in the second region and a portion located in the first region that is smaller than the portion located in the second region.

4. The derailleur according to claim 1, further comprising:
a power source holder including an electric terminal, and arrangeable in the power source receiving part,
the power source holder being configured to traverse the reference line in a state arranged in the power source receiving part.

5. The derailleur according to claim 1, wherein:
the base member includes a base member attachment portion pivotally attached to the frame of the human-powered vehicle about an attachment portion pivot axis; and
the linkage assembly is configured to be arranged so that at least one of the first pivot axis, the second pivot axis, the third pivot axis, and the fourth pivot axis is orthogonal to the attachment portion pivot axis.

6. The derailleur according to claim 1, wherein:
the base member includes a base member attachment portion pivotally attached to the frame of the human-powered vehicle about an attachment portion pivot axis; and
at least one of the first pivot axis, the second pivot axis, the third pivot axis, and the fourth pivot axis is inclined relative to a direction orthogonal to the attachment portion pivot axis.

7. The derailleur according to claim 1, wherein
the power source receiving part includes an accommodation portion configured to accommodate a power source.

8. The derailleur according to claim 1, further comprising:
a cover member at least partially covering the power source receiving part.

9. The derailleur according to claim 8, wherein
the cover member is configured to traverse the reference line in a cover attachment state where the cover member at least partially covers the power source receiving part.

10. The derailleur according to claim 8, wherein
the cover member is pivotally attached to the outer link member.

11. The derailleur according to claim 1, wherein
the cover member is attached in a detachable manner to the outer link member.

12. The derailleur according to claim 11, wherein
the cover member is press-fitted in a detachable manner to the outer link member.

13. The derailleur according to claim 11, wherein:
the cover member includes a first rail;
the outer link member includes a second rail; and
the first rail is configured to slide on the second rail.

14. The derailleur according to claim 1, wherein
the power source receiving part is formed integrally with the outer link member.

15. The derailleur according to claim 1, wherein
the power source receiving part is formed separately from the outer link member.

16. The derailleur according to claim 15, wherein
the power source receiving part includes a material differing from that of the outer link member.

* * * * *